United States Patent
Kim et al.

(10) Patent No.: US 11,567,555 B2
(45) Date of Patent: Jan. 31, 2023

(54) SOFTWARE ASSISTED POWER MANAGEMENT

(71) Applicant: Intel Corporation, Santa Clara, CA (US)

(72) Inventors: Jason Seung-Min Kim, San Jose, CA (US); Sundar Ramani, Santa Clara, CA (US); Yogesh Bansal, Beaverton, OR (US); Nitin N. Garegrat, San Jose, CA (US); Olivia K. Wu, Los Altos, CA (US); Mayank Kaushik, San Jose, CA (US); Mrinal Iyer, Menlo Park, CA (US); Tom Schebye, San Carlos, CA (US); Andrew Yang, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 528 days.

(21) Appl. No.: 16/557,657

(22) Filed: Aug. 30, 2019

(65) Prior Publication Data
US 2019/0384370 A1 Dec. 19, 2019

(51) Int. Cl.
*G06F 1/324* (2019.01)
*G06F 1/08* (2006.01)
(Continued)

(52) U.S. Cl.
CPC .............. *G06F 1/324* (2013.01); *G06F 1/08* (2013.01); *G06F 1/12* (2013.01); *G06F 1/28* (2013.01);
(Continued)

(58) Field of Classification Search
CPC .............. G06F 1/324; G06F 1/08; G06F 1/12; G06F 1/28; G06F 9/28; G06F 9/3001;
(Continued)

(56) References Cited

U.S. PATENT DOCUMENTS 8,745,339 B2 * 6/2014 Son .................. G06F 9/5027
711/154
9,354,944 B2 * 5/2016 Gaster .................. G06F 9/52
(Continued)

OTHER PUBLICATIONS

Cardoso, Joao M.P., et al.. Excerpt from "High-performance embedded computing: Section 2.6.2 Dynamic Voltage and Frequency Scaling", Embedded Computing for High Performance, Elsevier, Inc., 2017, accessed at: https://www.sciencedirect.com/topics/computer-science/dynamic-voltage-and-frequency-scaling, 2 pages.

(Continued)

*Primary Examiner* — Aurel Prifti
(74) *Attorney, Agent, or Firm* — Alliance IP, LLC

(57) ABSTRACT

Embodiments include an apparatus comprising an execution unit coupled to a memory, a microcode controller, and a hardware controller. The microcode controller is to identify a global power and performance hint in an instruction stream that includes first and second instruction phases to be executed in parallel, identify a local hint based on synchronization dependence in the first instruction phase, and use the first local hint to balance power consumption between the execution unit and the memory during parallel executions of the first and second instruction phases. The hardware controller is to use the global hint to determine an appropriate voltage level of a compute voltage and a frequency of a compute clock signal for the execution unit during the parallel executions of the first and second instruction phases. The first local hint includes a processing rate for the first instruction phase or an indication of the processing rate.

22 Claims, 25 Drawing Sheets

(51) Int. Cl.
G06F 1/28 (2006.01)
G06F 1/12 (2006.01)
G06F 9/30 (2018.01)
G06F 9/28 (2006.01)
G06N 3/08 (2006.01)

(52) U.S. Cl.
CPC .............. G06F 9/28 (2013.01); G06F 9/3001 (2013.01); G06F 9/3004 (2013.01); G06F 9/30145 (2013.01); G06N 3/08 (2013.01)

(58) Field of Classification Search
CPC .............. G06F 9/3004; G06F 9/30145; G06F 9/3855; G06F 9/44; G06F 1/32; G06N 3/08

See application file for complete search history.

(56) References Cited

U.S. PATENT DOCUMENTS

| | | | | |
|---|---|---|---|---|
| 10,705,587 | B2* | 7/2020 | Greenhalgh | G06F 9/3848 |
| 10,705,589 | B2* | 7/2020 | Gu | G06F 8/41 |
| 2003/0163671 | A1* | 8/2003 | Gschwind | G06F 9/3838 |
| | | | | 712/214 |
| 2008/0201721 | A1* | 8/2008 | Little | G06F 9/5027 |
| | | | | 718/106 |
| 2008/0256330 | A1* | 10/2008 | Wang | G06F 9/3851 |
| | | | | 712/24 |
| 2008/0256521 | A1* | 10/2008 | O'Brien | G06F 8/45 |
| | | | | 717/133 |
| 2009/0307699 | A1* | 12/2009 | Munshi | G06F 9/5044 |
| | | | | 718/102 |
| 2011/0035737 | A1* | 2/2011 | Stefansson | G06T 1/20 |
| | | | | 717/149 |
| 2011/0161944 | A1* | 6/2011 | Cho | G06F 8/456 |
| | | | | 717/149 |
| 2011/0219357 | A1* | 9/2011 | Livshits | H03M 7/30 |
| | | | | 717/115 |
| 2013/0036408 | A1* | 2/2013 | Auerbach | G06F 8/456 |
| | | | | 717/140 |
| 2013/0046967 | A1* | 2/2013 | Fullerton | H03L 7/0802 |
| | | | | 713/100 |
| 2014/0067139 | A1* | 3/2014 | Berke | G06F 1/26 |
| | | | | 700/291 |
| 2014/0149769 | A1* | 5/2014 | Brock | G06F 1/3296 |
| | | | | 713/322 |
| 2014/0237276 | A1* | 8/2014 | Machnicki | G06F 1/324 |
| | | | | 713/323 |
| 2014/0258686 | A1* | 9/2014 | Fatemi | G06F 1/324 |
| | | | | 712/216 |
| 2015/0106595 | A1* | 4/2015 | Khot | G06F 9/3851 |
| | | | | 712/215 |
| 2017/0153849 | A1* | 6/2017 | Shen | G06F 3/0653 |
| 2017/0177064 | A1* | 6/2017 | Christensen | G06F 9/3836 |
| 2017/0308383 | A1* | 10/2017 | Espasa | G06F 9/30145 |
| 2017/0351318 | A1* | 12/2017 | Gu | G06F 9/30083 |
| 2017/0371401 | A1* | 12/2017 | Rotem | G06F 9/30145 |
| 2017/0371661 | A1* | 12/2017 | Sparling | G06F 1/3296 |
| 2018/0060123 | A1* | 3/2018 | Weissmann | G06F 9/4893 |
| 2018/0232935 | A1* | 8/2018 | Galazin | G06F 9/44 |
| 2018/0246703 | A1* | 8/2018 | Ren | G06F 8/313 |
| 2018/0349175 | A1* | 12/2018 | Andrus | G06F 1/3296 |
| 2019/0155605 | A1* | 5/2019 | Bui | G06F 9/3001 |
| 2019/0163487 | A1* | 5/2019 | Sadasivam | G06F 9/30189 |
| 2020/0073469 | A1* | 3/2020 | Sadowski | G06F 1/3237 |
| 2020/0142466 | A1* | 5/2020 | Naik | G06F 1/28 |
| 2020/0183476 | A1* | 6/2020 | Honnavara-Prasad | G06F 1/28 |
| 2020/0264879 | A1* | 8/2020 | Li | G06F 9/30098 |

OTHER PUBLICATIONS

Dehmelt, Frank, "Adaptive (Dynamic) Voltage (Frequency) Scaling—Motivation and Implementation", Texas Instruments, Mar. 2014, accessed at http://www.ti.com/lit/an/slva646/slva646.pdf?DCMP=fullyc&HQS=pwr-alps-lpdc-fullyc-fr59x69x-20140624-dvs-mcs-en, 10 pages.

Le Sueur, Etienne, et al., "Dynamic Voltage and Frequency Scaling: The Laws of Diminishing Returns", HotPower'10: Proceedings of the 2010 international conference on Power aware computing and systems, Vancouver, Canada, Oct. 2010, accessed at: https://www.researchgate.net/publication/228980660_Dynamic_voltage_and_frequency_scaling_The_laws_of_diminishing_returns, 6 pages.

Wolf, Marilyn, Excerpt from "CPUs: Section 2.5.1 Dynamic voltage and frequency scaling", High-Performance Embedded Computing, Second Edition, Elsevier, Inc., 2014, accessed at: https://www.sciencedirect.com/topics/computer-science/dynamic-voltage-and-frequency-scaling, 3 pages.

Wolf, Marilyn, Excerpt from "Processors and Systems: Section 5.6.3 Power Management", The Physics of Computing, Elsevier, Inc., 2017, accessed at: https://www.sciencedirect.com/topics/computer-science/dynamic-voltage-and-frequency-scaling, 1 page.

* cited by examiner

USER MODE DRIVER
300

// SETUP KCR ACCELERATION ENGINE
SETFLEX 4, 1|; ~ 302

// move data from Main Memory
// to HBM/MRB
MCOPY MEMx, HBMx
MCOPY HBMx, MRBx ~ 304

// Compute MRB data
MATMUL M1, M2, M3 ~ 306

// Process MRB data
ReLU M3, M4;
BN M4, M5;
MaxPool M5, M6; ~ 308

// move data from MRB/HBM
// to Main Memory
MCOPY MRBx, HBMx;
MCOPY HBMx, MEMx; ~ 310

FIG. 3A

SOFTWARE ASSISTED KERNEL CODE
305

{PMOP_SMC_mode, val} ~ 322A
SETFLEX 4, 1|; ~ 302'

{PMOP_HBM_start, rate} ~ 324A
MCOPY MEMx, HBMx
MCOPY MEMx, MRBx
{PMOP_HBM_stop, rate} ~ 324B — 304'

{PMOP_MPU_start, rate} ~ 326A
MATMUL M1, M2,
{PMOP_ALU_start, rate} ~ 328A
ReLU M3;
BN M4;
MaxPool M5;
{PMOP_ALU_stop, rate} ~ 328B
{PMOP_MPU_stop, rate} ~ 326B
⎫
⎬ ~ 306'
⎭
~ 308'

{PMOP_HBM_start, rate} ~ 330A
MCOPY MRBx, HBMx;
{PMOP_HBM_stop, rate} ~ 330B — 310'

FIG. 3B

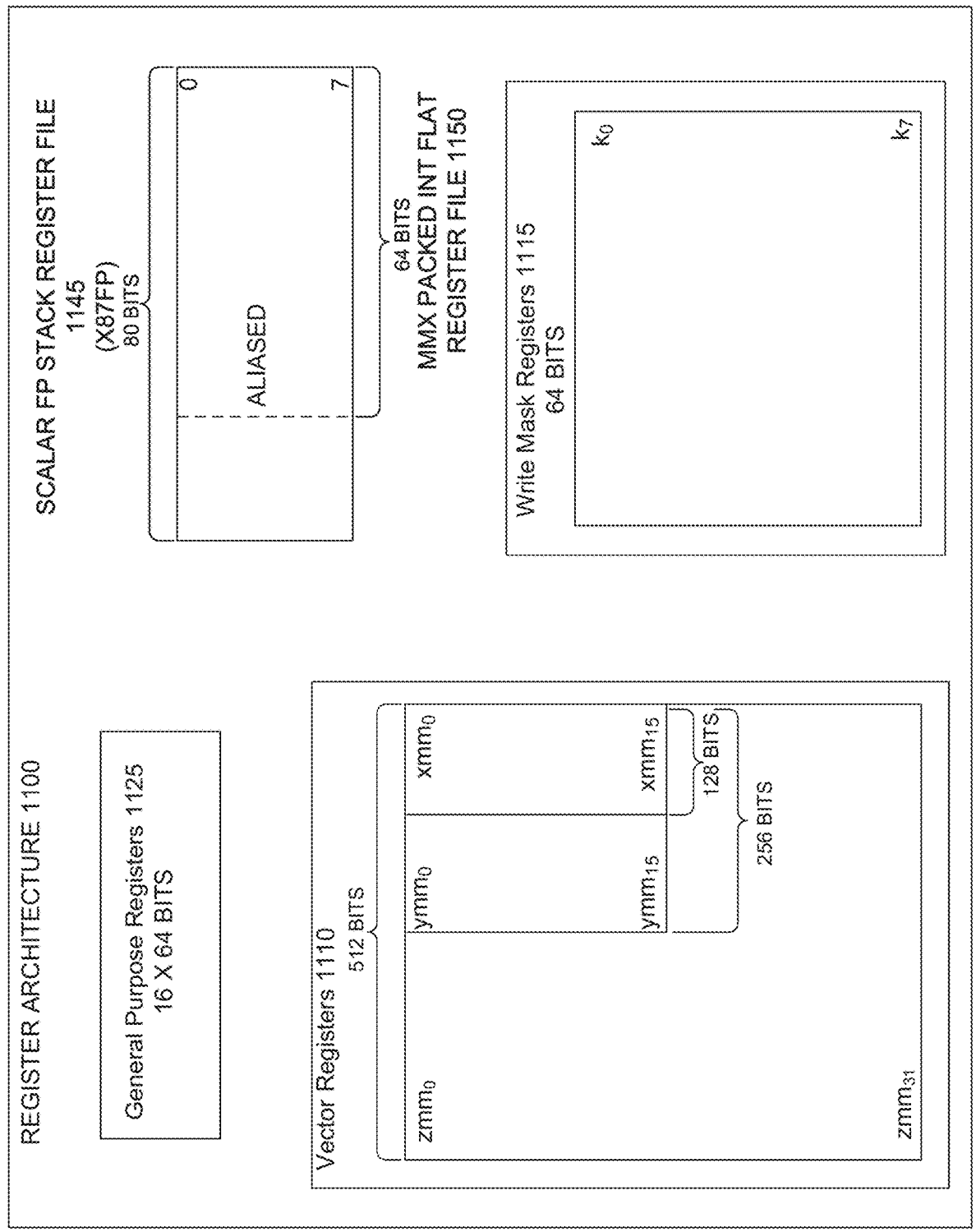

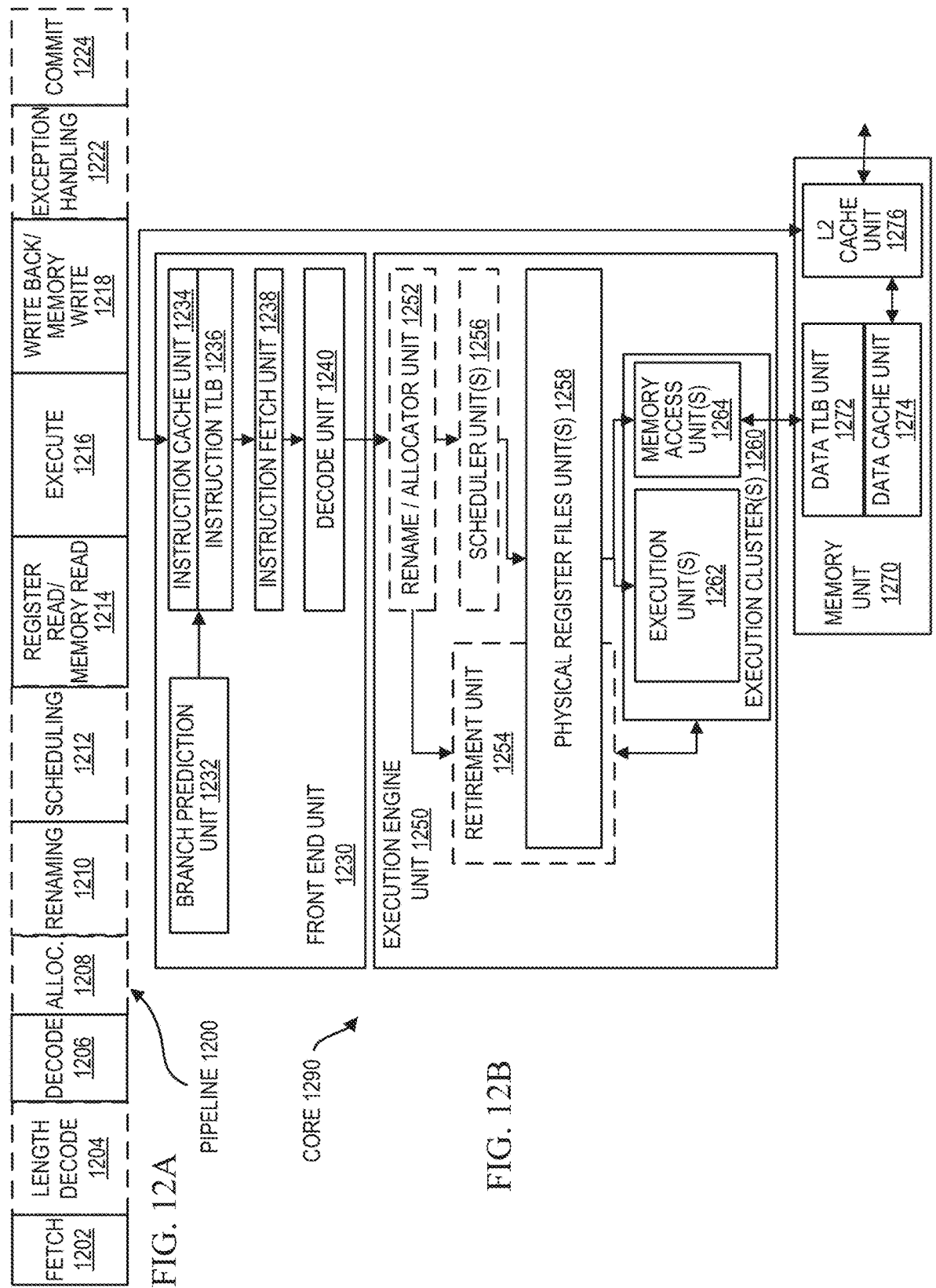

SOFTWARE ASSISTED POWER MANAGEMENT

TECHNICAL FIELD

This disclosure relates in general to the field of computers and, more particularly, to software assisted power management of computers.

BACKGROUND

The demand for artificial intelligence (AI) applications is growing exponentially. AI applications often involve deep learning, which is a type of machine learning that uses a layered structure of algorithms, known as deep neural networks (DNNs), to learn and recognize patterns from data representations. DNNs are generally presented as systems of interconnected "neurons" that can compute values from inputs. DNNs have emerged as an effective solution for intuitive human/device interactions that improve user experience, a new computation paradigm known as "cognitive computing." Among other usages, DNNs can be used for imaging processing, voice and object recognition or natural language processing. Applications using neural networks parse huge amounts of data and require powerful processing capabilities outside the reach of typical computer processing units (CPUs). Additionally, AI applications are often restricted by finite capability of system power supplies and associated thermal dissipation capabilities. Thus, solutions are needed to satisfy the insatiable appetite for higher and higher compute performance for AI applications within the power and thermal budgets.

BRIEF DESCRIPTION OF THE DRAWINGS

To provide a more complete understanding of the present disclosure and features and advantages thereof, reference is made to the following description, taken in conjunction with the accompanying figures, where like reference numerals represent like parts, in which:

FIG. 3A is an example of a possible user mode driver in a computing system implemented with an integrated circuit having a software assisted power management capability according to at least one embodiment;

FIG. 3B is an example of a possible kernel mode driver in a computing system implemented with an integrated circuit having a software assisted power management capability according to at least one embodiment;

FIG. 11 is a block diagram of a register architecture according to one embodiment;

FIG. 12A is a block diagram illustrating both an exemplary in-order pipeline and an exemplary register renaming, out-of-order issue/execution pipeline according to embodiments of the present disclosure.

FIG. 12B is a block diagram illustrating both an exemplary embodiment of an in-order architecture core and an exemplary register renaming, out-of-order issue/execution architecture core to be included in a processor according to embodiments of the present disclosure;

DETAILED DESCRIPTION OF EMBODIMENTS

Figure 1:
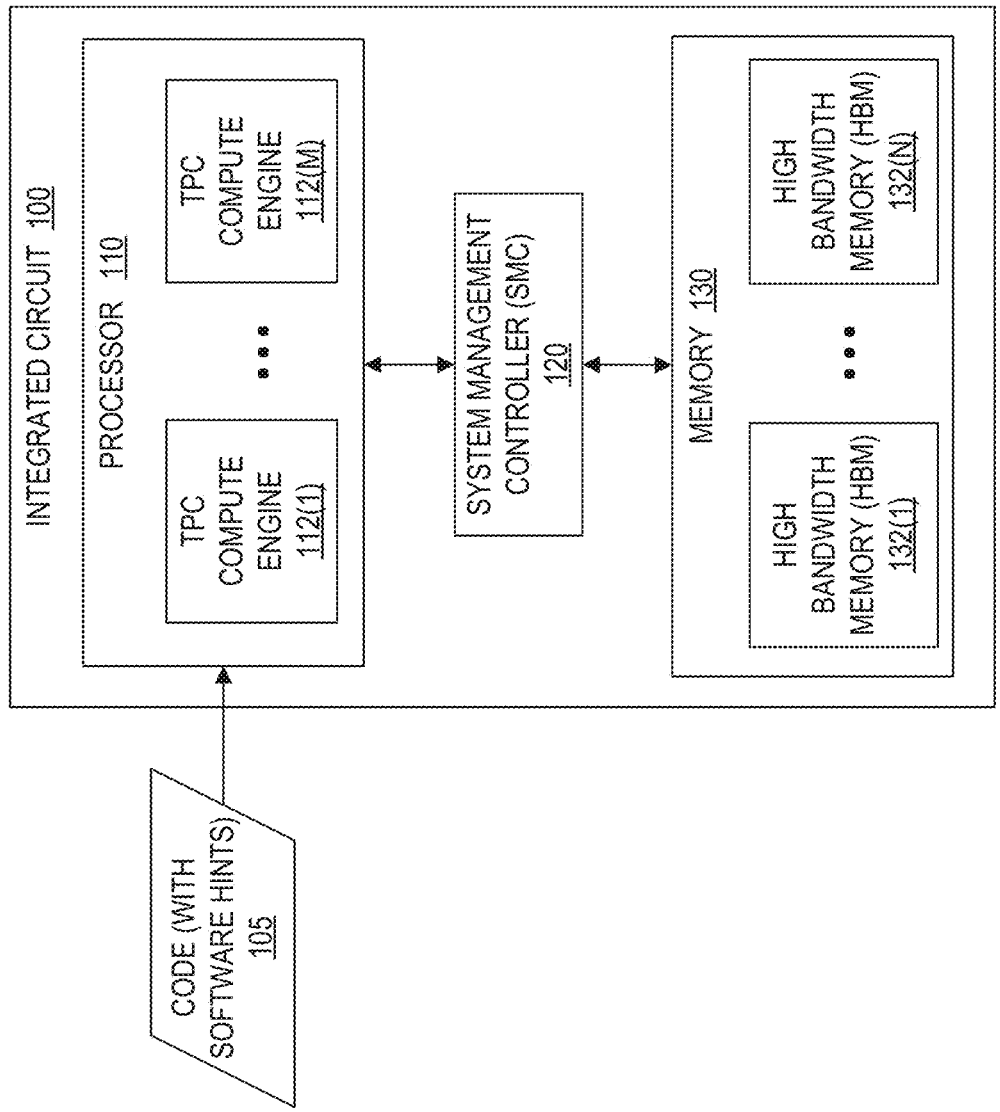
FIG. 1 is a simplified block diagram illustrating high level components of an integrated circuit with a software assisted power management capability that may be implemented in a computing system according to at least one embodiment of the present disclosure.

The following disclosure provides various possible embodiments, or examples, for implementing features disclosed in this specification. These features are related to software assisted power management for an integrated circuit. Software assisted power management can be implemented in integrated circuits that include one or more cores with multiple compute engines and load-store memory, such as high bandwidth memory (HBM) for example. Integrated circuits with software assisted power management may be particularly advantageous for computing systems running machine learning processes that involve multiple layers of computations. In an example, a software assisted proactive power performance management technique may be implemented to maximize accelerator performance within a total system power budget. This may be accomplished by pre-analyzing an actual instruction queue for a current workload to compute cycle-by-cycle allocation of power budgets among multiple subsystem components on a machine learning system, such as a specialized deep learning/artificial intelligence (DL/AI) accelerator. Potential compute or memory requirements of an incoming instruction queue may be analyzed and estimated by assigning specific power-performance weights (e.g., software hints) to instructions. Dynamic power-performance optimization techniques may be performed based on the analysis of the power-performance weights identified in the instructions. Such techniques can include configuring optimum power budgets across multiple subsystem domains (e.g., computes, memories, inter-connects, etc.).

For purposes of illustrating the several embodiments of a computing system with software assisted power management, it is important to first understand the operations and activities associated with neural network applications and power management of systems running such applications. Accordingly, the following foundational information may be viewed as a basis from which the present disclosure may be properly explained.

Most DL/AI workloads comprise networks or layers operating in a "stream" mode where specialized kernels (also referred to herein as "instruction streams") are downloaded to an accelerator. An accelerator is a type of microprocessor or computer system designed as hardware acceleration for machine learning applications. Hardware acceleration involves the use of computer hardware to perform certain functions more efficiently than typical software running on a general-purpose processor. Because these instruction streams in a DL/AI workload can be accelerator-specific, they can be compiled and optimized for the best performance.

Growing customer demand for ever higher compute performance for DL/AI applications is restricted by finite capabilities of system power supplies and associated thermal dissipation. Typically, the response is to reactively limit system performance within individual sub-component power and thermal presets. For example, when a current machine learning (ML) accelerator is designed to operate with a 300 Watts (W) power budget to achieve a certain performance (e.g., 150 trillions of operations per second (TOPS)), worst-case operating conditions are assumed in order to preset a nominal frequency and voltages. For example, the 300 W may divided such that compute engines get 150 W and memory gets 150 W regardless of the phase of operation (e.g., compute phase, memory phase) being executed at any given time. Consequently, when the actual workload is lighter than the preset conditions, the accelerator underperforms. Conversely, when the actual workload is heavier than the preset conditions, the accelerate over performs and can trigger a thermal overload condition. Typically in this scenario, the performance is quickly curbed to stay within the preset operating conditions.

Platform power management has traditionally been "reactive" on a subsystem level, rather than "proactive". In these systems, actions may be applied on subcomponents based on a previous sampling history or preset detection of monitoring events that happened in the past. One particular approach involves dynamic voltage frequency scaling (DVFS) technology, which is a technique aimed at reducing dynamic power consumption by dynamically adjusting voltage and frequency. Power consumption is the amount of energy used to operate a component per unit time and can be measure in Watts or kilo Watts (kW) for example. Power consumption and speed are a function of power supply voltage, where the speed of CMOS logic is proportional to the power supply voltage and where the power consumption of the CMOS is proportional to the square of the power supply voltage (VDD2). Thus, reducing the power supply voltage can reduce power consumption. DVFS, however, may be based on preset power consumption and thermal limit triggers from individual sub-system components. In this approach platform performance is reduced when a thermal or power consumption preset condition is triggered. Furthermore, because it is not entirely possible to accurately predict individual contribution of subsystems on total power consumption, individual performance is guard-banded for the worst-case operating conditions. Consequently, this solution provides sub-optimal operating benefits that sacrifice performance to operate within power and thermal preset conditions.

An integrated circuit with software assisted power management resolves many of the aforementioned issues (and more). Deep learning/artificial intelligence (DL/AI) workloads have predictable behavior across compute kernels, topologies, etc. One or more embodiments of an integrated circuit with software assisted power management described herein exploit this information to implement proactive power management policies to optimize performance (e.g., compute rates vs. memory access bandwidth) of the hardware by balancing power consumption between execution units (e.g., matrix processing units (MPUs)) and memory (e.g., high bandwidth memory (HBM)). This can be achieved by distinguishing different resources (e.g., compute or memory) needed for each processing phase of an instruction stream and by prioritizing their usages.

In one example, a DL/AI application can be compiled with power-performance optimization hints. These software hints can be used by hardware to assist dynamic voltage, frequency, and pipeline scaling, and bandwidth utilization control for the executing the DL/AI application. Dynamic voltage, frequency, and pipeline scaling hardware allows execution pipeline utilization, as well as the supply voltages and operating frequencies, to be changed dynamically. Pipelines can be modulated to control system utilization. Also, periodic sampling of performance, power, and temperature monitors may be performed. Collaboration of hardware, firmware, and software maximizes performance based on pre-knowledge of actual workloads and operating conditions.

These software hints can be embedded inline in an instruction stream (e.g., in kernel codes) and can help identify different resources needed for each processing phase or thread of an instruction stream. A command decoder can be configured to identify the embedded software hints and the hints can be used to limit or boost associated hardware utilization without exceeding a maximum amount of combined power allowed for an execution unit (e.g., MPU) and memory (e.g., HBM). In particular, software assisted power management can utilize power management hints embedded in an instruction stream to fine-tune independent pipelines for HBM accesses and MPU executions for just-in-time (JIT) completion by sub-tasks (or instruction phases) within a workload. Accordingly, pre-analysis of the workload and embedding of software hints to normal instruction streams can be used such that each execution pipeline is intentionally balanced for performance or efficiency. In one example, these software hints can enable the hardware to optimize specialized operations such as loops and just-in-time data pre-fetches that cannot otherwise be easily deduced. Such software-assisted hardware can execute these instruction streams from an instruction queue, providing visibility into the future actions of the instructions and hence, proactive abilities to plan for achieving appropriate power performance objectives.

One or more embodiments may also include power management (PM) control hardware configured as a power and thermal management state machine (PTM-STM) to switch between multiple operating points (e.g., voltage, frequency, pipeline) preprogrammed by PM software heuristics based on workload and operating conditions. This allows power management control hardware to quickly respond to any changes in the workload and operating conditions. This also allows PM heuristics software to proactively analyze the workload and preprogram appropriate responses to the changes in the environmental conditions. Thus, software can setup PM policy and hardware can execute that policy to minimize reaction time and to maximize power usage.

Embodiments of a software-assisted power management solution can provide higher performance, higher efficiency, and higher hardware utilization. First, a future compute resource requirement is derived from analyzing an actual instruction stream to be executed in a queue. Thus, estimates of compute resource requirements mirrors the actual workload, which minimizes guard-banding of performance. Second, the estimate window aligns with the instruction stream in the execution pipeline. Thus, it is possible for the hardware to perform cycle-specific tuning optimizations more often than typical coarse-grained monitoring algorithms. Accordingly, the hardware can take advantage of the cycle-by-cycle opportunities to optimize power and performance. Third, because the power performance optimization is based on individual power consumption trade-offs between multiple subcomponents, total power allocated to unrelated components could be diverted for current tasks for each component by each cycle. Thus, the effective performance could be maximized for the given total system power. Accordingly, the solution benefits users by lowering operating costs due to better utilization of their resources.

Turning to FIG. 1, a brief description is now provided about a possible integrated circuit 100 with software assisted power management. Integrated circuit 100 includes at least one processor 110, memory 130, a system management controller (SMC) 120 for facilitating control communication between the processor and memory. Processor 110 can include multiple tensor processing core (TPC) compute engines 112(1)-112(M), which may form a tensor processing cluster. Memory 130 can include multiple high bandwidth memory (HBM) units 132(1)-132(N) separate from the TPC compute engines. Memory 130 can include any suitable memory that accommodates memory access including, but not necessarily limited to a load-store memory. High bandwidth memory may be used in one or more embodiments and is intended to include memory designed to allow data to be read from or stored into the memory at a high rate (e.g., bytes/second, etc.). Integrated circuit 100 may be configured as a single die or may include additional compute engines and HBM units for a two-die configuration.

For machine learning applications, TPC compute engines 112(1)-112(M) can be used in clusters for deep neural network (DNN) acceleration. The TPC cluster can be used to perform multiple levels of work for a DNN application. Instructions of a DNN application can be provided to each of the TPC compute engines, and data from the appropriate HBM units can be distributed to each TPC compute engine so that each TPC compute engine can compute its own results. The results of the TPC compute engines are combined to generate a result for the particular level of work. The data can be returned to the HBM units, new data can be distributed to the TPC compute engines, and new results can be computed by each of the TPC compute engines based on the previous level's result and the new data. This process may be performed repeatedly until a final result is reached. Generally, this process involves two phases of operation including a compute phase and a memory phase. During a compute phase (e.g., when a compute cluster is executing), power consumption of the compute engines is significantly greater than power consumption of the HBM units. During a memory phase (e.g., when data is initially fetched for the instruction queue or being stored at the end of an instruction queue), power consumption of the HBM units is significantly greater than power consumption of the TPC compute engines.

In one or more embodiments, a machine learning application may be compiled into code 105 with software hints, fetched from memory, and stored in an instruction queue by integrated circuit 100. Code in the instruction queue can be decoded and analyzed by compute engines 112(1)-112(M). Global software hints identified from the code can be provided to system management controller 120 to control global voltage and frequency for the integrated circuit 100, and to adjust local processing rates of HBM units 132(1)-132(N) and compute engines 112(1)-112(M) based on environmental and/or operating conditions. Local software hints identified from the code can be provided to TPC compute engine (e.g., 112(1)-112(M)) to control local processing rates of HBM units 132(1)-132(N) and execution units of compute engines 112(1)-112(M).

Figure 2:
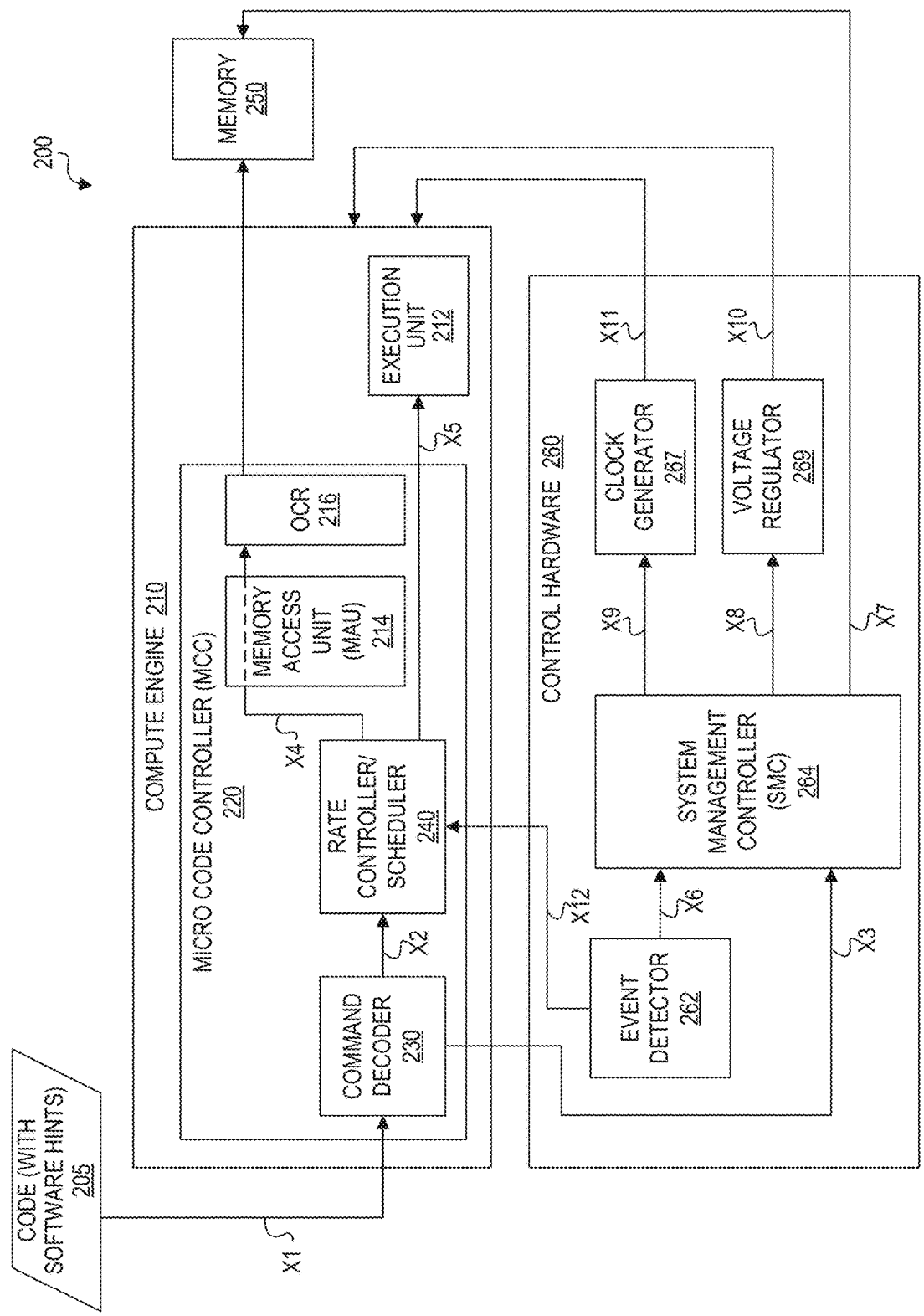
FIG. 2 is a simplified block diagram illustrating control flows in an integrated circuit with a software assisted power management capability according to at least one embodiment.

FIG. 2 is a simplified block diagram illustrating an integrated circuit 200 and control flows of a software assisted power management technique that may be implemented in a computing system. Integrated circuit 200 shows additional possible details of integrated circuit 100. Integrated circuit 200 includes a compute engine 210, a memory 250, and other hardware, such as control hardware 260. In at least one implementation, compute engine 210 may be configured as one of TPC compute engines 112(1)-112(M), and memory 250 may be configured as memory 130 with HBM units 132(1)-132(N).

Compute engine 210 can include a micro code controller (MCC) 220 and an execution unit 212. In at least one embodiment, execution unit 212 can be implemented as a matrix processing unit (MPU). A TPC compute engine can contain two execution units 212, but other implementations may include compute engines with a single execution unit or more than two execution units. The MCC 220 can include a command decoder 230 to decode instructions and a rate controller/scheduler 240 for scheduling decoded instructions for execution. MCC 220 can also include a memory access unit (MAU) 214, and an on-chip router (OCR) network 216. The OCT 216 may include an HBM interface to access memory 250. Control hardware 260 can include an event detector 262, a system management controller (SMC) 264, a clock generator 267 and a voltage regulator 269.

Control flows X1-X12 indicate possible flows that may occur in integrated circuit 200 in which a software assisted power management technique is performed. Control flows X1-X12 may represent control signals, data flows, any other communication used to produce a desired result, or any combination thereof. Additionally, each control flow may represent one or multiple control signals, data flows, or other communications. First, in control flow X1, software code 205 compiled with software hints is fetched from memory and stored in an instruction queue to be decoded by command decoder 230. The decoded software can be provided to rate controller/scheduler 240.

A software hint may be included in the code for one or more instructions, these one or more instructions are referred to herein as an "instruction phase." An instruction phase may include one or more instructions and each instruction may be performed a single time or multiple times (e.g., in a loop for a predetermined number of times). In control flow X2, the decoded code and its software hints are provided to rate controller/scheduler 240.

Rate controller/scheduler 240 determines the schedule for each instruction phase, including whether any instruction phases are to be scheduled in parallel. It should be noted that some compute (MPU) and memory (HBM) operations are staggered but can be run in parallel if dependencies between instruction phases are not violated. Rate controller/scheduler 240 analyzes the software hints for each instruction phase and determines which instruction phases are to be rate-controlled. In one example scenario, if a memory instruction phase is scheduled for execution in parallel with a compute instruction phase, the software hint of the compute instruction phase may indicate that the compute instruction phase is likely to consume twice as much power as the memory instruction phase. In this scenario, an appropriate number of rate control instructions may be added to the memory instruction phase in the instruction stream to effectively slow down the processing rate of the memory instruction phase. For example, one or more "no operation" or NOP instructions may be inserted in the memory instruction phase. Thus, the memory instructions are distributed over the period during which the parallel compute phase is to execute. By slowing down the processing rate of the memory instruction phase with one or more rate-controlled instructions, the memory instruction phase consumes less power, allowing more power to be allocated to the compute instruction phase. Thus, some of the power that would otherwise be allocated to the memory instruction phase can be diverted to the compute instruction phase.

If a memory instruction phase has been rate-controlled based on software hints, then the rate-controlled memory instruction phase is used via control flow X4 to limit memory access bandwidth of memory 250 (e.g., HBM) and OCR 216 via delayed memory access requests. Delayed memory access requests are memory access requests of a memory instruction phase that are distributed over a period during which a parallel instruction phase (memory or compute) is to execute. In at least one embodiment, memory access requests may be delayed by selectively inserting rate control instructions (e.g., NOP) in the memory instruction phase to force the memory instruction phase to finish executing at the same time or substantially the same time that the parallel instruction phase finishes executing.

If a compute instruction phase has been rate-controlled based on software hints, then the rate-controlled compute instruction phase is used via control flow X5 to limit instructions per cycle (IPC) of execution unit 212 via delayed instructions (e.g., NOP instructions inserted in the compute phase of the instruction stream). Limited compute instructions per cycle are compute instructions in a compute instruction phase that are distributed over a period during which a parallel instruction phase (memory or compute) is to execute. In at least one embodiment, compute instructions per cycle may be limited by selectively inserting rate control instructions (e.g., NOP) in the compute instruction phase to force the compute instruction phase to finish executing at the same time or substantially the same time that the parallel instruction phase finishes executing.

If a memory instruction phase has a greater processing rate than another instruction phase to be executed in parallel, the processing rate determined from the software hint of the memory instruction phase is used to control memory access bandwidth of memory 250 (e.g., HBM) and OCR 216. In one embodiment, the number of fetches and writes per a given time or cycles based on the processing rate of the memory instruction phase can be provided to MAU 214 to increase the HBM bandwidth.

If a compute instruction phase has a greater processing rate than another instruction phase to be executed in parallel, then the processing rate determined from the software hint of the compute instruction phase is used to control the compute pipeline rate (e.g., instructions per cycle (IPC)). In one embodiment, the processing rate of the compute instruction phase can be provided to execution unit 212 to increase the IPC.

A global hint may also be present in an instruction stream and may be identified by command decoder 230. The global hint can be provided to SMC 264 via control flow X3. SMC 264 can use the global hint to determine the appropriate frequency and voltage to be set for the instruction stream. SMC 264 can indicate the appropriate frequency to be set by clock generator 267 via control flow X9. SMC 264 can indicate the appropriate supply voltage to be set by voltage regulator 269 via control flow X8. The clock generator 267 generates a clock signal with the appropriate frequency for execution unit 212, memory access unit 214, and OCR 216 via control flow X11. Voltage regulator 269 adjusts the supply voltage for execution unit 212, memory access unit 214, and OCR 216 via control flow X10.

Event detector 262 detects thermal conditions and power consumption levels that meet or exceed respective thresholds set for the system. When power consumption is determined to meet or exceed a maximum power (Pmax) threshold in a compute engine or in memory, it is detected by event detector 262 and a control flow X12 alerts rate controller/scheduler 240 so that the processing rates indicated by software hints can be overridden and appropriate processing rates can be selected for compute engines and memory to prevent imminent failure. When a Pmax threshold is met or exceeded, SMC 264 may be notified via control flow X6, and memory 250 may be directly rate controlled from SMC 264 via X7. Rate control instructions may be inserted at the memory side to rate control the read and fetch instructions and limit power consumption by memory 250. In addition, suitable corrective measures can be applied via control flows X8-X11 to set new clock frequencies and operating voltages.

Power consumption and temperature levels may also be analyzed relative to other threshold levels associated with other compensation measures. When a temperature of the components meets or exceeds a critical temperature threshold or an alarm temperature threshold, it is detected by event detector 262 and a signal alerts SMC 264 via control flow X6 so that processing can be slowed by an appropriate amount depending on the particular threshold that is met. Similarly, if power used by the components meets a critical power threshold or an alarm power threshold, it is detected by event detector 262 and a signal alerts SMC 264 via control flow X6 so that processing can be slowed by an appropriate amount depending on the particular threshold that is met. An alarm setting may be used for gentler correction, while a critical setting may be used for more aggressive corrective measures. For example, an alarm setting could be used for lightly trimming clock frequencies, whereas a critical setting could be used for applying more aggressive slowing of clock frequency and lowering of voltages.

Turning to FIGS. 3A-3B, FIGS. 3A-3B show an example of possible system software instruction streams before being compiled with software hints (FIG. 3A) and after being compiled with software hints (FIG. 3B). A user mode driver 300 is an example of system software before it is compiled with software hints. An instruction phase 302 includes a SETFLEX instruction to set up the appropriate data format to use for the computations to be performed. An instruction phase 304 includes two MCOPY instructions to copy data from main memory to high bandwidth memory (HBM), and to then copy the data in the HBM to a local memory, which can be a memory resource block (MRB), for the subsequent computations in the instruction stream. Each of the MCOPY instructions may perform multiple (x) copy instructions until all of the data needed for subsequent computations has been copied to local memory.

An instruction phase 306 includes a MATMUL (matrix multiply) instruction to compute the data stored in the local memory. The MATMUL instruction is to perform matrix multiplication on M1, M2, and M3 vectors. An instruction phase 308 processes the MRB data by performing a ReLU operation (rectified linear activation function) using M3 and M4 vectors, a BN operation (batch normalization) using M4 and M5 vectors, and a MaxPool operation (pooling that is a sample-based discretization process) using M5 and M6 vectors. Generally, the ReLU, BN, and MaxPool operations perform different layers of machine learning using the data In one or more embodiments, software hints can be embedded in kernel code, which can be generated by compiling a user mode driver such as user mode driver 300. In example, software hints are defined as power/performance management operator codes (PMOPs) with the following format:

PMOP Target[x], Value[v]//Embedded Host-INTF command for PM hints Target[x]={SMC[x]/RCR[x]/MPU[x]/HBM[x]}

SMC[x] where x={0} to inform SMC of global operational modes

RCR[x] where x={0 . . . 7} to preload PM Rate Config Registers

MPU[x] where x={1/0} to preload PM Rate Config Registers

HBM[x] where x={0 . . . 7} to preload PM Rate Config Registers

Value[r]={Value[v]/Rate[r]/Wait[t]/Skip[c]}

Value[v] where v={0 . . . 15} to send immediate value to target[x]

Rate[r] where r={0 . . . 3} to insert # of NOP as predefined in rate register

Wait[t] where t={0 . . . 15} to insert # of Wait instructions into pipeline

Skip[c] where c={0 . . . 15} to insert # of Skip cycles into pipeline

In one possible implementation, a PM op code can be 24 bits, including a 9-bit opcode, an 8-bit target, and a 7-bit value. In other embodiments, a PM op code may use a different configuration of bits. In an embodiment in which PM op codes are 24 bits, the following chart provides an example of instruction names, bit format, and description of target agent or value:

| INSTRUCTION | BIT FORMAT | DESCRIPTION |
| --- | --- | --- |
| PMOP | 9'b111_011111 | 9-bit instruction opcode for PM hints |
| pmop_target[x] | | 8-bit target agent |
| PMOP_SMC | 4'b1111[0000] | Send PM hints to SMC[x] mailbox register |
| PMOP_RCR | 4'b1110[xxxx] | Send PM hints to PM[x] Rate Config reg |
| PMOP_MPU | 4'b1101[x000] | Send PM hints to MPU[x] command queue |
| PMOP_HBM | 4'b1100[xxx0] | Send PM hints to HBM[x] command queue |
| PMOP_MRB | 4'b1011[xxxx] | Send PM hints to MRB[x] command queue |
| PMOP_CSE | 4'b1010[0000] | Send PM hints to CSE[x] command queue |
| PMOP_CPU | 4'b1001[0000] | Send PM hints to CPU[x] command queue |
| PMOP_C2C | 4'b1000[xx00] | Send PM hints to C2C[x] command queue |
| PMOP_DDR | 4'b0111[xx00] | Send PM hints to DDR[x] command queue |
| PMOP_HIF | 4'b0110[xx00] | Send PM hints to HIF[x] command queue |
| PMOP_ALU | 4'b0101[xx00] | Send PM hints to ALU[x] command queue |
| PMOP_NOP | 4'b0000[xxxx] | NOP |
| pmop_value[v] | | 7-bit target values |
| PMOP_VAL | 3'b111[vvvv] | Use immediate value[v] for target[x] |
| PMOP_RATE | 3'b110[00rr] | Use Rate value set for the [r] mode |
| PMOP_WAIT | 3'b101[tttt] | Use [t] number of WAIT/NOP instructions |
| PMOP_SKIP | 3'b100[cccc] | Use [c] number of skip cycle into pipeline |
| PMOP_NIL | 3'b000[xxxx] | Use NIL value | copied into the local memory. Instruction phase 310 includes two MCOPY instructions to copy data from local memory (or MRB) to high bandwidth memory, and to then copy the data in the HBM back to the main memory. Each of the MCOPY instructions may perform multiple (x) copy instructions until all of the data computed and stored in local memory by the instruction stream has been copied back to main memory.

It should be noted that generally, the description herein refers to software hints for memory network pipelines (e.g., HBM) and compute execution pipelines (e.g., MPU). The concepts disclosed in this specification, however, are not so limited and may be applied to other execution pipelines. For example, software assisted power management may also be applied to execution pipelines such as memory access engine (MES), register control router (RCR), Convolution Slicing Engine (CSE), chip-to-chip (C2C), master control CPU (MCC), HOST interface (HIF), and any other execution engines.

In FIG. 3B, a software assisted kernel 320 is an example of system software in an instruction queue that is compiled with software hints. Compiled instruction phases 302', 304', 306', 308', and 310' in software assisted kernel code 320 correspond respectively to instruction phases 302, 304, 306, 308, and 310 in user mode driver 300. Instruction phase 302' includes a global software hint 322A, which demarcates the SETFLEX instruction and indicates the frequency and voltage for the system during the execution of (e.g., kernel 320. In one example, software hint 322A includes an indication (e.g., PMOP_SMC_mode) that the software hint is a global hint to set a mode for the SMC. In addition, software hint 322A also includes a value parameter ("val") that indicates the type of workload that is in the instruction queue. The type of workload can provide guidance to a system management controller to determine the optimal speed (e.g., clock frequency) at which the system is to run for the instruction queue and the voltage setting to be used for the instruction queue. In other embodiments, the value parameter may be explicitly defined to include a voltage value and/or a frequency value.

Instruction phase 304' includes a local software hint for memory instructions. A software hint beginning 324A and a corresponding software hint end 324B demarcate the MCOPY memory instructions to which the software hint applies. In one example, the software hint beginning 324A and the software hint end 324B each include an indication (e.g., PMOP_HBM_start, PMOP_HBM_end) that the software hint is a local hint for memory instructions. Software hint beginning 324A also includes a rate parameter ("rate") that indicates a processing rate or amount of time that the memory instruction phase (e.g., "MCOPY MEMx, HBMx" and "MCOPY HBMx, MRBx") is expected to run. In one embodiment, the rate parameter is a percentage of time that represents how long the memory instruction phase is to run. The percentage of time can be a percentage of the total time the kernel is to run. In other embodiments, the rate parameter may be any other suitable measure such as number of clock ticks, fast cycles, etc.

Instruction phase 306' includes a local software hint for compute instructions. A software hint beginning 326A and a corresponding software hint end 326B demarcate a MATMUL compute instruction for a matrix processing unit (MPU) to which the software hint applies. Additionally, software hint beginning 326A and software hint end 326B also demarcate RELU, BN, and MaxPool compute instructions for an arithmetic logic unit (ALU). In one example, software hint beginning 326A and software hint end 326B each include an indication (e.g., PMOP_MPU_start, PMOP_MPU_stop) that the software hint is a local hint for compute instructions performed by the MPU. Software hint beginning 326A also includes a rate parameter ("rate") that indicates a processing rate or amount of time that the compute instruction phase (e.g., "MATMUL M1, M2") is expected to run. In one embodiment, the rate parameter is a percentage of time that represents how long the compute instruction phase is to run. The percentage of time can be a percentage of the total time the kernel is to run. In other embodiments, the rate parameter may be any other suitable measure such as number of clock ticks, fast cycles, etc.

Instruction phase 308' includes a local software hint for compute instructions. A software hint beginning 328A and a corresponding software hint end 326B demarcate RELU, BN, and MaxPool compute instructions for an arithmetic logic unit (ALU) to which the software hint applies. In one example, software hint beginning 328A and software hint end 328B each include an indication (e.g., PMOP_ALU_start, PMOP_ALU_stop) that the software hint is a local hint for compute instructions performed by an ALU. Software hint beginning 326A also includes a rate parameter ("rate") that indicates a processing rate or amount of time that the compute instruction phase (e.g., "Relu M3", "BN M4", and "MaxPool M5") is expected to run. In one embodiment, the rate parameter is a percentage of time that represents how long the compute instruction phase is to run. The percentage of time can be a percentage of the total time the kernel is to run. In other embodiments, the rate parameter may be any other suitable measure such as number of clock ticks, fast cycles, etc.

Instruction phase 310' includes a local software hint for memory instructions. A software hint beginning 330A and a corresponding software hint end 330B demarcate an MCOPY memory instruction to which the software hint applies. In one example, the software hint beginning 330A and the software hint end 330B each include an indication (e.g., PMOP_HBM_start, PMOP_HBM_end) that the software hint is a local hint for memory instructions. Software hint beginning 330A also includes a rate parameter ("rate") that indicates a processing rate or amount of time that the memory instruction phase (e.g., "MCOPY MRBx, HBMx") is expected to run. In one embodiment, the rate parameter is a percentage of time that the memory instruction phase is to run. The percentage of time can be a percentage of the total time the kernel is to run. In other embodiments, the rate parameter may be any other suitable measure such as number of clock ticks, fast cycles, etc.

It should also be noted that in some embodiments, the rate parameter may indicate a type of instruction or workload rather than an actual percentage of time, clock ticks, etc. The type of instruction or workload for a particular instruction phase can be used to determine an appropriate preprogrammed processing rate for that instruction phase.

Figure 4A:
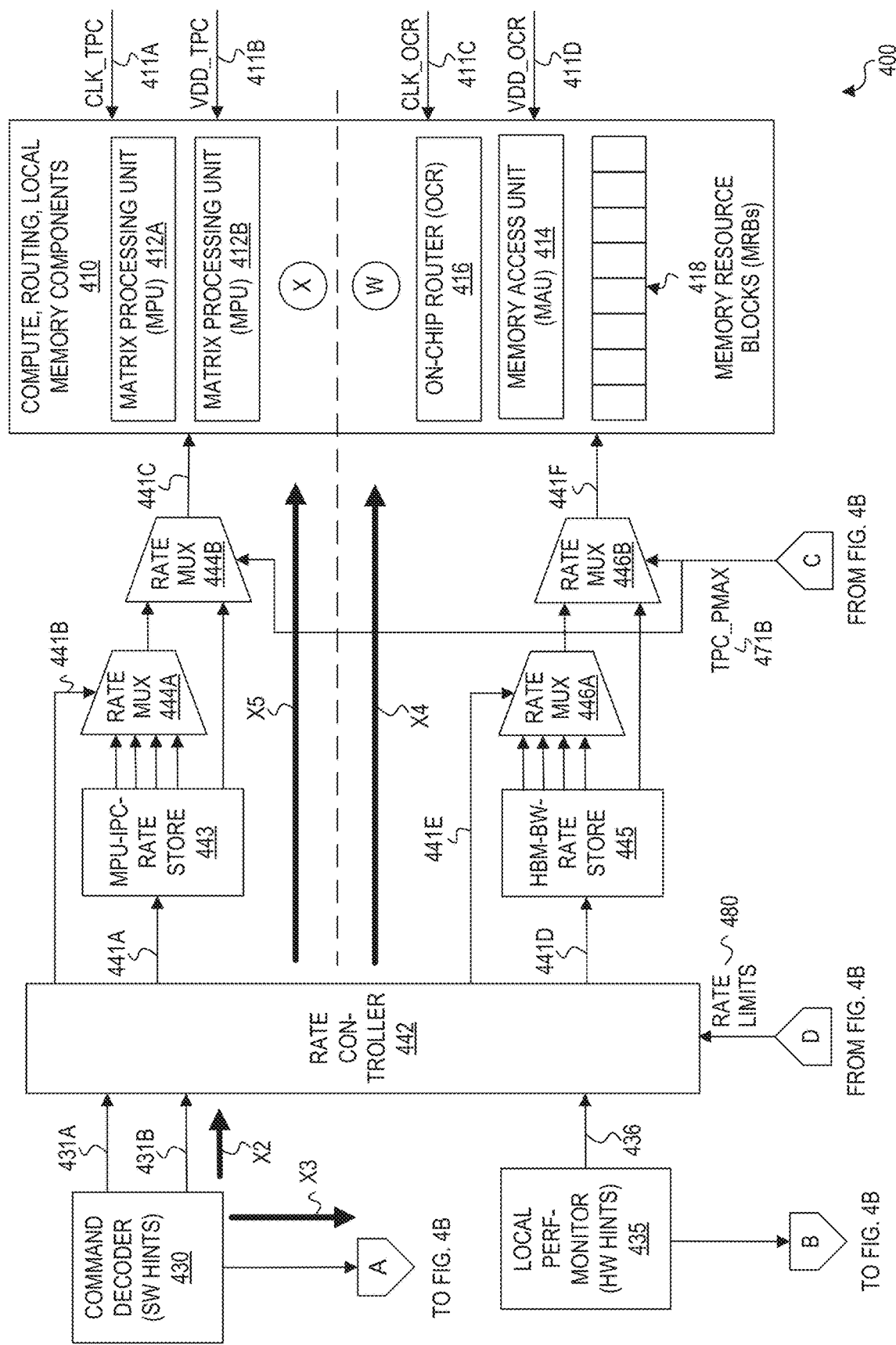
FIGS. 4A-4B show a high level functional block diagram of an integrated circuit with a software assisted power management capability and its control flows according to at least one embodiment.
Figure 4B:
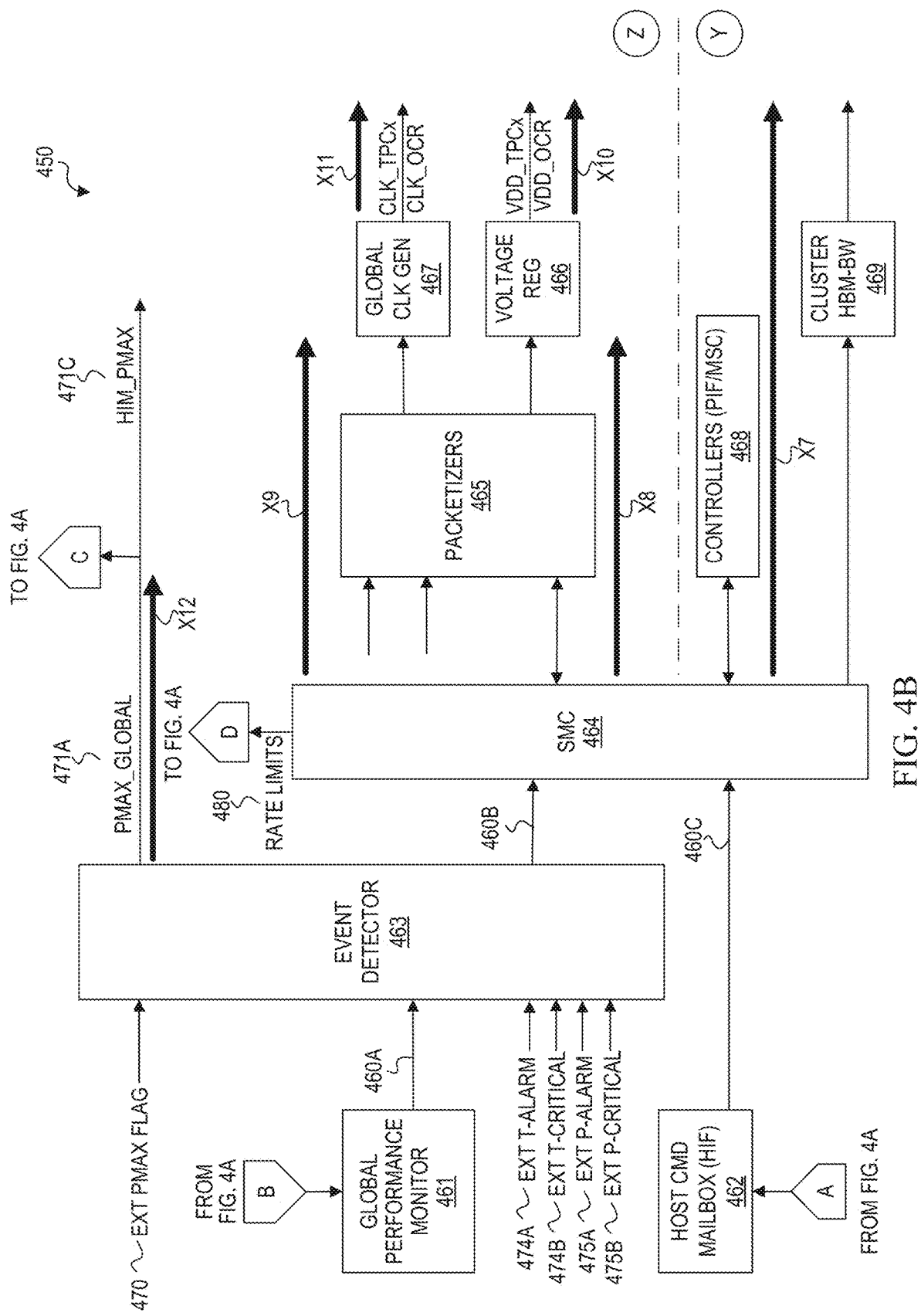

Turning to FIGS. 4A-4B, FIGS. 4A-4B together show a high-level functional block diagram of a system with software assisted power management. FIGS. 4A-4B depict how software could be used to proactively control the power-performance of an accelerator by allowing cycle-by-cycle balancing of the instructions per cycle (IPC) and memory bandwidth (BW) requirements. One or more embodiments utilize software assisted dynamic voltage frequency pipeline scaling (DVFPS) hardware to implement proactive power performance management techniques to optimize system performance over fixed power and thermal operating conditions. Embodiments with software assisted DVFPS overcome the weaknesses of traditionally reactive dynamic voltage frequency (DVFS) scaling technology.

FIG. 4A is a high level functional block diagram of a TPC compute engine 400 (e.g., 112(1)-112(M), 210) and the control flows of the software assisted power management technique within the TPC compute engine. TPC compute engine 400 can include a command decoder 430, a local performance monitor 435, a rate controller 442, an MPU-IPC-RATE (matrix processing unit-instructions per cycle rate) store 443 and corresponding rate multiplexers 444A and 444B, an HBM-BW-RATE (high bandwidth memory-bandwidth rate) store 445 and corresponding rate multiplexers 446A and 446B, and compute, routing, and local memory components 410. Compute, routing, and local memory components 410 can include matrix processing units (MPUs)

412A and 412B, a memory access unit (MAU) 414, an on-chip router (OCR) 416, and local memory resource blocks (MRBs) 418.

Embedded Kernel mode PMOP (power/performance management operator) codes allow MPU (matrix processing unit) execution time and HBM (high bandwidth memory) preload setup time to be scheduled to optimize overall power and performance of tensor processing clusters. FIG. 4A depicts TPC compute engine 400 in which embedded PMOP codes within kernel code (e.g., 105, 205, 305) are decoded and distributed to associated execution units (e.g., MPUs 412A, 412B) such that effective dynamic capacitance (Cdyn) of the compute cluster for the workload can be optimized with just-in-time delivery of next data that is synchronized to just-in-time completion of the current tasks.

Kernel code with software hints is first downloaded from high bandwidth memory (e.g., 132(1)-132(N), 250) to the TPC compute engine 400. The kernel code is also referred to herein as an "instruction stream." In at least one embodiment, the kernel code may be downloaded via an appropriate host interface. A command decoder 430 decodes the kernel code and identifies software hints for memory instruction phases (e.g., HBM) and compute instruction phases (e.g., MPU, ALU, CPU) in the kernel code. The command decoder allows balancing of multiple computational resources for optimizing power and performance needs of an application. This is achieved by software assisted hardware scheduling of multiple independent instruction pipelines (e.g., HBM, MPU, ALU, etc.) for "just-in-time" completion of memory accesses and compute executions. Thus, by using software hints in the kernel code, software can proactively request which parallel tasks should be prioritized to use the limited available energy.

In at least one embodiment, a local software hint includes a type of workload via its "rate" parameter for its corresponding instruction phase. For example, different instruction phases may be different types of workloads (e.g., Type A, Type B, Type C, Type D, etc.), which correspond to different processing rates (e.g., 90%, 70%, 30%, 10%, etc. of the total execution time of the kernel code). Accordingly, the rate parameter in a software hint (e.g., 324A-324B) may indicate the appropriate workload type (e.g., Type A, Type B, Type C, etc.) for its demarcated instructions (e.g., memory instruction phase 304', compute instruction phase 306').

In some scenarios, certain instruction phases may have the same type even if they contain different instructions. This can occur, for example, when two different compute instruction phases run for the same, or close to the same, amount of time. In this scenario, the kernel code may be configured to include the same software hint for each of the two different compute instruction phases. In at least one embodiment, a workload type for a memory instruction phase and a workload type for a compute instruction phase can be provided to rate controller 442 by command decoder via 431A and 431B, which correspond to control flow X2.

In other embodiments, local software hints can be programmed with a particular processing rate rather than a type of workload. In this scenario, however, additional programming time may be needed as the processing rate is not a pre-programmed state.

Rate controller 442 controls the processing rate of execution units (e.g., MPUs 412A, 412B). In at least one embodiment, rate controller 442 implements software assisted proactive power performance management by allowing kernel mode drivers to embed rate control instructions, along with the usual accelerator instructions. Rate controller 442 also performs per cluster task scheduling to control instruction-per-cycle (IPC) computing rates and input/output (IO) bandwidth (BW) utilization of the an on-chip router (e.g., OCR 415) network and high bandwidth memory (e.g., HBMs 132(1)-132(N), memory 250) subsystems.

In one embodiment, rate controller 442 may send a signal 441A to MPU-IPC-RATE store 443 to initiate selection of a preprogrammed processing rate based on a rate parameter of the compute software hint received from command decoder 430. Preprogrammed processing rates stored in MPU-IPC-RATE store 443 may be provided to rate mux 444A. Rate controller 442 may send the rate parameter of the compute software hint to rate mux 444A via 441B to select the appropriate processing rate.

Rate controller 442 may also send a signal 441D to HBM-BW-RATE store 445 to initiate selection of a preprogrammed processing rate based on a rate parameter of the memory software hint received from command decoder 430. Preprogrammed processing rates stored in HBM-BW-RATE store 445 may be provided to rate mux 446A. Rate controller 442 may also send the rate parameter of the memory software hint to rate mux 446A via 441E to select the appropriate processing rate. As further described herein with reference to FIG. 4B, if rate controller 442 receives rate limits 480 from a system management controller (e.g., shown in FIG. 4B), then the rate limits may be provided to rate mux 444A via 441B and to rate mux 446A via 441E to force selection of respective processing rates based on a global hint and expected workload.

Examples of preprogrammed processing rates include but are not necessarily limited to (or required to include) a trillions of operations per second (TOPS) rate, a generic matrix multiply (GEMM) rate, a convolution (CONV) rate, and an element wise (ELEM) vector processing rate. By way of example, MPU utilization may be the following: TOPS=100%; GEMM=80%; CONV=40%, and ELEM=20%. A maximum power rate (Pmax) can also be stored in MPU-IPC-RATE store 443 and HBM-BW-RATE store 445 and can be used to override the other rates based on the system meeting or exceeding a maximum power threshold. In an embodiment, MPU-IPC-RATE store 443 and HBM-BW-RATE store 445 may be configured as different registers that contain the preprogrammed rates. In this example, where five different preprogrammed rates are used, five different registers may contain the rates. It should be apparent, however, that any number of preprogrammed rates, and a corresponding number of registers to hold the rates, may be used in one or more embodiments. In at least one embodiment, these preprogrammed rate values may have corresponding shadow registers that can store minimum rate limits set by rate limits 480, when the rate limits are received from a system management controller (shown in FIG. 4B). Rate limits can be based on global hints and expected workloads.

In one embodiment, rate mux 444B and rate mux 446B determine whether to use the selected preprogrammed processing rate or the Pmax rate. A TPC_PMAX signal received by rate MUXes 444B and 446B can indicate that the maximum power threshold has been met or exceeded by the MPUs 412A, 412B and/or HBM memory. In this scenario, the preprogrammed rate that is selected based on a local software hint may be overridden and the appropriate Pmax rate may be selected instead. Control flows X4 and X5 represent the processing in rate controller 442, MPU-IPC-RATE store 443, HBM-BW-RATE store 445, and rate MUXes 444A, 444B, 446A, and 446B.

In at least one embodiment, the selected preprogrammed processing rate for a compute instruction phase (also referred to herein as "compute rate") represents the amount of time the compute instruction phase is to run. This compute rate can be sent via signal 441C to MPUs 412A and 412B to control the amount of time (or cycles) the MPUs run. In one or more embodiments, the compute rate may be expressed as a number of clock cycles that the compute instruction phase is to run, as a percentage of the total time the instruction stream is to run, or as an amount of time that the compute instruction is to run, or any other suitable expression to allow a determination of IPCs for the compute instruction phase.

In at least one embodiment, the selected preprogrammed processing rate for a memory instruction phase (also referred to herein as "memory rate") represents the amount of time the memory instruction phase is to run (e.g., the amount of time it will take to move data from one area to another area). This memory rate can be sent via signal 441F to a memory access unit 414 to control the bandwidth utilization of OCR 416 and HBM subsystems. In one or more embodiments, the memory rate may be expressed as a number of clock cycles that the memory instruction phase is to run, as a percentage of the total time the instruction stream is to run, or as an amount of time that the compute instruction is to run, or any other suitable expression to allow a determination of bandwidth utilization for the memory instruction phase.

Rate controller 442 can also rate control a memory instruction phase by inserting rate control instructions in the memory instruction pipeline. For example, No Operation (NOP) instructions can be inserted to slow down the read and write operations performed by the memory instruction phase when its memory rate is less than the compute rate for a compute instruction phase that is to be executed in parallel. In at least one embodiment, the number of rate control instructions to be inserted is selected to synchronize the memory instruction phase to the compute instruction phase such that the instruction phases finish at the same (or substantially the same) time. In at least some scenarios, this synchronization allows the memory instruction to finish executing just-in-time (JIT) for a memory-dependent instruction phase to begin executing. A memory-dependent instruction phase is any instruction phase that is dependent on a memory instruction phase because the memory-dependent instruction phase uses the data manipulated (read and/or written) by the memory instruction phase.

Rate controller 442 can also rate control a compute instruction phase by inserting rate control instructions in the compute instruction pipeline. For example, No Operation (NOP) instructions can be inserted to slow down the computations performed by the compute instruction phase when its compute rate is less than the memory rate for a memory instruction phase that is to be executed in parallel. In at least one embodiment, the number of rate control instructions to be inserted is selected to synchronize the compute instruction phase to the memory instruction phase such that the instruction phases finish at the same (or substantially the same) time. In at least some scenarios, this synchronization allows the compute instruction phase to finish executing just-in-time (JIT) for a compute-dependent instruction phase to begin executing. A compute-dependent instruction phase is any instruction phase that is dependent on a compute instruction phase because the compute-dependent instruction phase uses the data manipulated (computed) by the compute instruction phase.

FIG. 4B depicts example control hardware 450 in which a system management controller (SMC) 464 helps to set DVFS operating conditions based on PMOP code with a global software hint that is embedded in kernel code (e.g., 105, 205, 305). The inline insertion of a PMOP code can be used to synchronize the actual TPC command execution with the associated HBM fetch operations. As previously explained herein, synchronization can be accomplished by the rate controller 442 inserting rate control operations (e.g., NOP) in the appropriate instruction phase based on the PMOP code. This allows a Kernel mode driver to accurately set effective dynamic capacitance (Cdyn) of the workload such that SMC firmware can dynamically adjust to the best operating frequency and voltage for each TPC compute engine.

Control hardware 450 can include a command decoder 430, a global performance monitor 461, a host command mailbox 462, an event detector 463, a system management controller (SMC) 464, a global clock generator 467, a cluster voltage regulator (VDDTPC) 466, and a cluster HBM-BW regulator 469. In at least one embodiment, a single synchronous global clock is used for all TPC compute engines (e.g., 400) and on-chip routers (e.g., 416). Control hardware 450 may also include other components such as packetizers 465 and controllers 468.

Global software hints and other information are fed into control hardware 450 to perform dynamic voltage scaling and dynamic frequency scaling. Dynamic voltage scaling can change voltage levels supplied to execution units (e.g., MPUs 412A, 412B) for different instruction streams and dynamic frequency scaling can change processor speed for different instruction streams. Thus, power consumption levels in system components, such as in MPUs 412A, 412B and OCR 416, can be adjusted. Such scaling can be achieved by leveraging a global software hint in an instruction stream that indicates the type of workload associated with the instruction stream. For example, the type of workload of the instruction stream may be associated with image recognition, language translation, etc. Host command mailbox 462 can provide the global software hint to SMC 464 via signal 460C. SMC 464 can use a global software hint to configure settings including a speed (e.g., clock frequency) at which to run the MPUs 412A, 412B and OCR 416 and a voltage setting to be used to help the execution units and OCR run. In addition to receiving the global software hint, SMC 464 may also receive information from event detector 463 via signal 460B.

SMC 464 uses global software hints from the instruction stream and other environmental information signals that it receives to determine optimum conditions at which the system components can run during execution of the instruction stream and to cause control signals to be generated to configure the instruction pipeline. The global software hint can indicate the type of workload (e.g., image recognition, language translation, etc.) to be executed in the instruction stream. Based, at least in part, on the type of workload of the instruction stream, SMC 464 can determine an optimum speed (e.g., clock frequency) and voltage level to be provided to system components (e.g., MPUs 412A, 412B and OCR 416) to execute the instruction stream.

Consider a first example of a language translation machine learning application. In this example, vocabularies are searched and computations are performed to generate a translation of a given text to another language. The compute engine may be very busy, running at 90-95% of the time. Memory accesses, however, may only run 20-25% of the time. Accordingly, rate control instructions can be inserted between the read and write instructions in the instruction stream to effectively slow down the effective processing rate to 20%. For the compute side, the frequency can be increased (e.g., by SMC 464 and clock generator 467) to run the compute clusters (e.g., MPUs 412A and 412B) as fast as possible. The voltage level can also be increased (e.g., by SMC 464 and voltage regulator 466) to run the compute clusters as fast as possible by diverting power that is not being used on the memory side and putting it in the compute side.

Consider another example of an image processing machine learning application. In this example, fetching image data from memory and writing image data to memory make up a significantly higher percentage of the processing than performing compute functions on the data. Thus, the compute functions are bound by how fast the system delivers the data in and out of HBM memory. The voltage level of the HBM memory cannot be changed if the HBM memory runs at a fixed clock frequency. However, the clock frequency on the compute side (e.g., MPU and OCR) can be lowered. When the clock frequency on the compute side is lowered, then the voltage level for the compute side can also be lowered. Accordingly, the execution of the memory instructions and the compute instructions can be balanced by lowering the clock frequency and the voltage such that the MPUs are active only 40% of the time, while the HBM memory may be active 100% of the time. In this scenario, there will not be a decrease in performance because HBM memory is the limiter and its processing speed does not change. In addition, CPU power consumption can be reduced due to the lowered clock frequency and voltage on the compute side.

SMC 464 may also consider environmental information received from event detector 463 to determine whether to adjust the speed and/or voltage provided to system components. As further described herein, environmental information may include, for example, thermal conditions and/or power consumption.

The dynamic frequency scaling can be implemented with a centralized or global clock generator, such as clock generator 467, which can be used to set core operating clock frequencies. As indicated by control flow X9, SMC 464 sends instructions to clock generator 467 via packetizers 465 to specify the frequency at which to set the core operating clock. The dynamic voltage scaling can be implemented with per cluster voltage regulators, such as voltage regulator 466, which can be used to set iso-frequency operating voltages. As indicated by control flow X8, SMC 464 sends instructions to voltage regulator 466 via packetizers 465 to specify the level at which to set the iso-frequency operating voltages. Packetizers 465 are components that provide appropriate input to clock generator 467 and voltage regulator 466 to ensure that specified clock frequencies and voltage levels are generated. In at least one embodiment, packetizers 465 may use a system-on-chip (SOC) interconnect to communicate to clock generator 467 and voltage regulator 466.

Clock generator 467 generates clock signals at a frequency specified by SMC 464 and sends the signals to MPUs 412A and 412B via 411A and to OCR 416 via 411C to control the speed of execution of compute instruction phases and memory instruction phases. Clock signals CLK_TPCx and CLK_OCR are represented by control flow X11. If the clock frequency is increased, then the voltage level may also be increased. If the clock frequency is decreased, then the voltage level may also be decreased. Voltage regulator 466 generates a voltage signal at a level specified by SMC 464 and sends the voltage signals to MPUs 412A and 412B via 411B and to OCR 416 via 411D to help achieve the desired speed of execution. Voltage signals VDD_TPCx and VDD_OCR are represented by control flow X10.

SMC 464 obtains a global assessment of other TPC compute engines based on information received from global performance monitor 461. Global performance monitor 461 may collect performance information from multiple local performance monitors (e.g., 435) associated with respective compute engines. The global assessment indicates the global memory activity, which is based on the activity level of other TPC compute engines accessing HBM memory. Because HBM bandwidth is linearly proportional to HBM read/write operations per a unit of time, activity level may be measured as a utilization percentage of HBM memory or a bandwidth percentage of HBM memory. If memory activity of another TPC compute engine meets a threshold amount, then SMC 464 may rate control the HBM memory. In particular, SMC 464 may limit the memory consumption of other TPC compute engines by allocating the memory that TPC compute engine 400 is expected to consume (i.e., memory utilization) for its instruction stream. This enables SMC 464 to control power consumption globally. As indicated by control flow X7, SMC 464 sends a control signal to HBM memory to allocate the expected bandwidth for its instruction stream.

SMC 464 may also send rate limits 480 to rate controller 442 to control the processing rate selected by rate controller 442, if needed, by forcing minimum rate limits based on global hints and expected workloads. In one example, rate limits 480 may be safety limits to compensate for different clock frequency operations and different power budgets in different environments. Thus, SMC 464 can control compute resources (e.g., instructions per second) and memory resources (e.g., memory access bandwidth) by adjusting processing rate values based on rate limits. By way of example, consider that power consumption is linearly proportional to frequency and utilization activity ($P=\%*C*V^2*F$), where C=capacitance switched per clock cycle, V=voltage, and F=frequency (e.g., clock cycles per second). The effective power consumption can be the same for one system running at one times the frequency for 100% of time versus another system running at two times the frequency for 50% of time. Accordingly, rate limits can be used to set a compensation limit when a higher clock frequency is set that may operate more efficiently and visa versa.

Event detector 463 may provide information to SMC 464 related to power consumption, thermal events, and/or system performance. Global performance monitor 461 may collect information from local performance monitor 435 related to how fast the system is running. Event detector 463 can receive this information via signal 460A. For example, information indicating the speed at which instructions are being executed relative to the speed at which memory instructions are performed (e.g., fetches and writes) can be collected. This information can be provided to event detector 463 via signal 460A and used to better optimize control flows X8-X10 at control area Z.

Event detector 463 can also receive external sensor data related to thermal events and power events so that adjustments to the power consumption levels have a platform dependency from the sensor data in addition to a workload dependency from global software hints. For example, thermal and power levels may be detected by respective sensors. Thresholds may correspond to a thermal alarm setting, a thermal critical setting, a power alarm setting, and a power critical setting, one or more of which may be evaluated based on the sensor data. In a possible embodiment, an alarm threshold could be used for gentler correction while a critical threshold could be used for more aggressive corrective measures. In one implementation, the alarm thresholds could be used for lightly trimming the clock frequencies, whereas the critical thresholds could be used for more aggressively slowing clock frequency and lowering voltages.

For example, a thermal alarm signal 474A and/or a thermal critical signal 474B may be received from an external sensor to indicate environmental thermal conditions. Setting the optimum power consumption levels for systems running a particular workload in a very cold environment such as an arctic data center for example, may require a different adjustment to the clock frequency and voltage levels than servers running the same workload in a tropical environment. Thermal thresholds may be used to determine whether a thermal condition reaches an alarm or critical stage. Thermal condition thresholds may be set for both hot environments and cold environments.

In another example, a power alarm signal 475A and/or a power critical signal 475B indicating power consumption of the system components (e.g., execution units and memory) may be received from an external sensor by event detector 463. Power thresholds may be used to determine whether power consumption reaches an alarm or critical stage. If power consumption reaches an alarm threshold or a critical threshold, then clock frequency and voltage level of the system components may be reduced as appropriate, given the other sensor information and global software hints.

Event detector 463 may also detect power consumption by the by the system components that meets or exceeds a maximum power threshold. A sensor may generate a power maximum (Pmax) signal when power consumption reaches a maximum power threshold. In at least one embodiment, the maximum power threshold represents the maximum power the device is designed to consume for a short duration of time. The maximum power detection can be used to apply emergency braking of the instruction pipeline to avoid imminent failure and to apply suitable corrective measures that include setting new clock frequencies and operating voltages In this scenario, the sensor may send an external power maximum signal (or Pmax flag 470) to event detector 463. If the detected power level meets or exceeds the maximum power threshold, then the power consumption may be lowered by a certain percentage to prevent damage or failure of the system.

In one example, upon detecting that power consumption meets or exceeds the maximum power threshold, event detector 463 can send a Pmax global signal 471A to TPC compute engine 400 as TPC_PMAX signal 471B and to HBM memory as HIM_PMAX signal 471C. TPC-PMAX signal 471B can be sent to rate mux 446B and rate mux 444B, where processing rates are selected for compute and memory instruction phases. In at least one embodiment, a preprogrammed Pmax value is stored in MPU-IPC-RATE store 443 and HBM-BW-RATE store 445. Receipt of a TPC_PMAX signal 471B can override a processing rate that has been selected or that would otherwise be selected by the rate controller based on a local software hint. For example, a preprogrammed Pmax value may represent the number of cycles to idle before each matrix multiply (MM) compute instruction cycle. If the MM instruction takes 32 cycles and rate store 443 is preprogrammed with a Pmax value of 32, then when the power consumption level hits the maximum power threshold and a TPC_PMAX signal is received, 50% power braking is applied to cause the MPU to perform only 50% of the time (e.g., 32 cycles to compute and 32 cycles to wait).

HIM_PMAX signal 471C may be provided to HBM memory (e.g., via an HBM interface module (HIM). An HBM controller may have a rate controller similar to rate controller 442. The HBM rate controller may insert rate control instructions at the memory side to rate control the HBM instruction pipeline and therefore, limit power consumption by the HBM memory. In one example, NOP instructions may be inserted to reduce the HBM bandwidth utilization by 50%.

Figure 5:
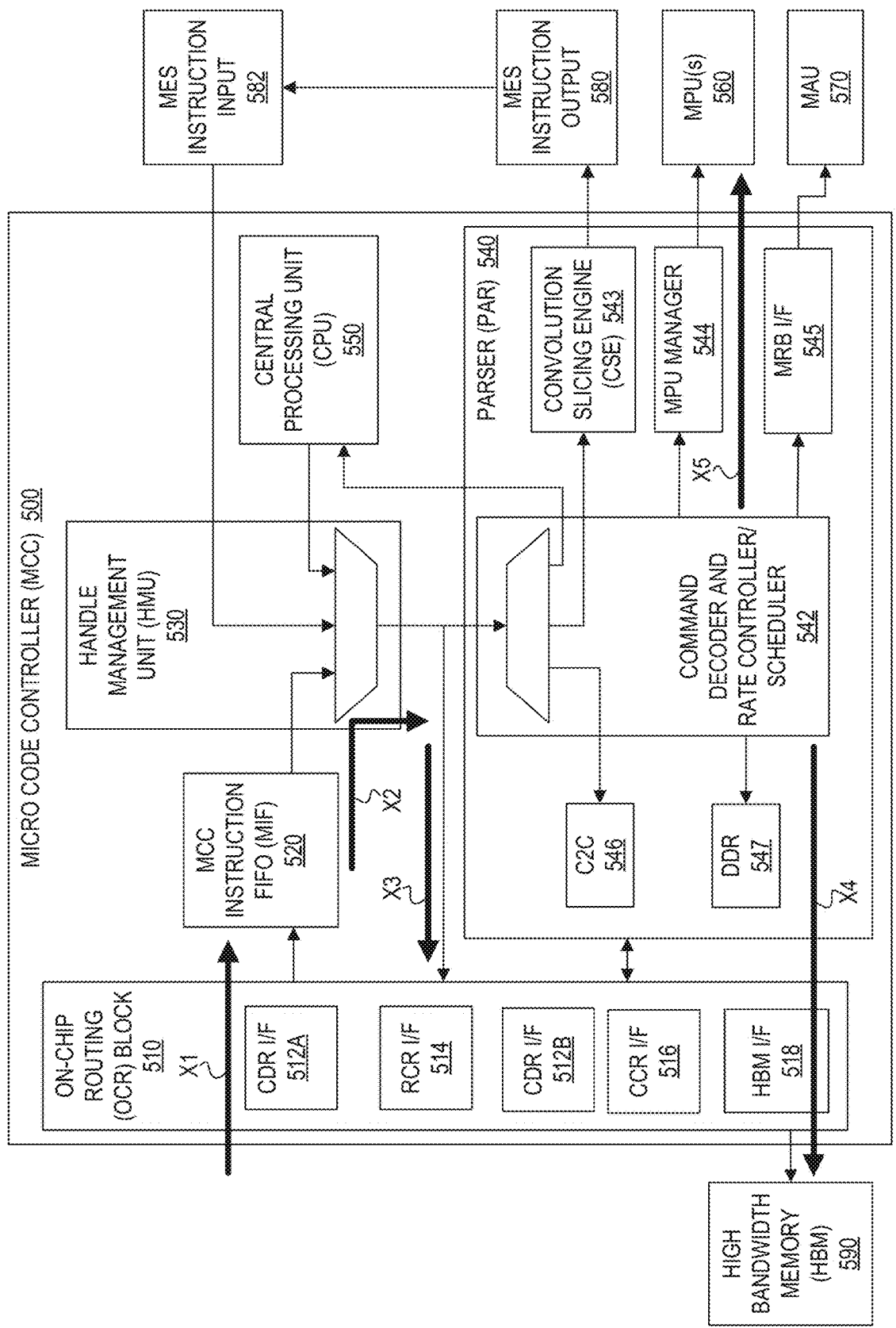
FIG. 5 is a simplified block diagram illustrating a possible implementation of a portion of an integrated circuit with a software assisted power management capability and its control flows according to at least one embodiment.

Turning to FIG. 5, FIG. 5 is a block diagram illustrating an example implementation of a microcode controller (MCC) 500 in a TPC compute engine with software assisted power management such as TPC compute engines 112(1)-112(M), 210, and 400. MCC 500 includes an on-chip routing (OCR) block 510, an MCC instruction first in first out (MIF) 520, a handle management unit (HMU) 530, a parser (PAR) 540, and a central processing unit (CPU) 550. OCR block 510 can include cluster-to-cluster data routing (CDR) interfaces (I/F) 512A and 512B, a register control router (RCR) interface (I/F) 514, a cluster command routing (CCR) bus interface (I/F) 516, and a high bandwidth memory (HBM) interface module (HIM) 518. Parser 540 can include an command decoder and rate controller/scheduler 542, a convolution slicing engine (CSE) 543, a matrix processing unit (MPU) manager 544, a memory resource block (MRB) interface (I/F) 545, a cluster-to-cluster (C2C) router 546, and double data rate (DDR) memory 547.

First, in control flow X1, kernel codes embedded with software hints are downloaded to a buffer such as MCC instruction first in first out (MIF) 520. The kernel codes can be loaded in the MIF on each TPC compute engine (e.g., 112(1)-112(M)). In control flow X2, HMU 530 obtains the kernel codes from MIF 520 and identifies a global hint. In control flow X3, the global hint is sent to a system management controller (SMC) (e.g., 120, 264, 464) to be used to set dynamic voltage and frequency scaling operating conditions. HMU 530 may also receive kernel codes that have received additional software hints from CSE 543 and kernel codes that have been pre-processed by CPU 550.

Command decoder and rate controller/scheduler 542 receives the kernel codes with software hints from HMU 530. Software hints received by command decoder and rate controller/scheduler 542 include rate control hints (local software hints) that indicate the amount of time (e.g., percentage, clock cycles, etc.) that a memory instruction phase or execution instruction phase is expected to run. Certain instructions, such as convolution instructions may need pre-processing. Such instructions can be provided to CSE 543 so that CSE 543 can expand the instruction (e.g., by manipulating a matrix) and insert power management hints when the instruction is expanded. CSE 543 can generate an MES instruction output 580 based on the expanded instruction with inserted power management hints. The MES instruction output 580 can be provided as an MES instruction input 582 to HMU 530 to be fed back into command decoder and rate controller/scheduler 542.

Command decoder and rate controller/scheduler 542 may also determine that some complex instructions contained in the kernel codes need pre-processing to be simplified. In this scenario, the instruction can be fed into CPU 550 to generate a simpler instruction or instructions. The one or more instructions generated by CPU 550 can be provided to HMU 530 to be fed back into decoder and rate controller/scheduler 542.

Command decoder and rate controller/scheduler 542 can decode the kernel codes received from HMU 530, including kernel codes that are pre-processed by CSE 543 and/or by CPU 550. The rate control hints in the kernel codes are parsed for compute instruction phases to be executed by MPUs 560 and for memory instruction phases to be executed by a memory access unit 570 on a high bandwidth memory (HBM) 590. Memory rate control hints can be used to limit HBM bandwidth via less frequent HBM interface router (HIR) requests. For example, NOP instructions can be inserted in the HBM memory network pipeline to slow down the read and write operations performed by the memory instruction phase. Memory accesses are indicated by control flow X4. Compute rate control hints can be used to limit MPU instructions per cycle (IPC) by no operation (NOP) delay requests. For example, NOP instructions can be inserted in the MPU execution pipeline to slow down the calculation operations performed by the execution instruction phase. Compute requests are indicated by control flow X5.

Figure 6:
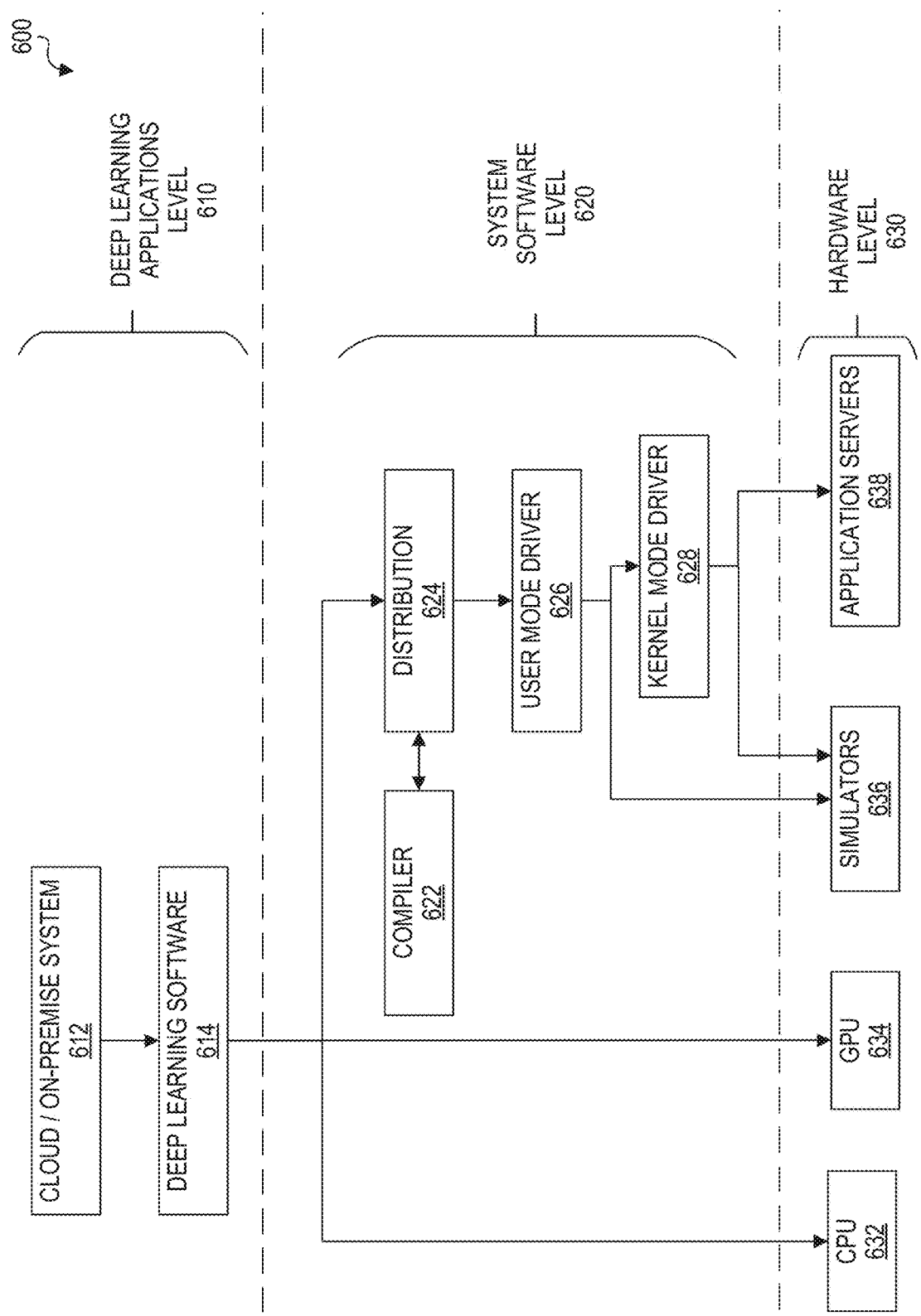
FIG. 6 is a simplified software flow of software for a computing system with an integrated circuit having a software assisted power management capability according to at least one embodiment.

Turning to FIG. 6, FIG. 6 illustrates a software flow 600 from a high level to low level where kernel code with software hints are analyzed and executed. Software flow 600 can include a deep learning applications level 610, a system software level 620, and a hardware level 630. Deep learning applications level 610 includes a cloud or on-premise system 612. Deep learning software 614 may be developed and/or stored in the cloud or in an on-premise system (e.g., 612).

System software level 620 may include a compiler 622, distribution 624, a user mode driver 626, and a kernel mode driver 628. Distribution 624 may receive deep learning software 614 and compiler 622 may compile deep learning software 614 with global and local software hints. Compiler 622 passes power-performance optimization hints to hardware for optimizing specialized operations like loops and just-in-time data pre-fetches that could not otherwise be easily deduced. In at least one embodiment, these hints may be provided based on evaluation and testing of instructions included in the deep learning software. A user mode driver 626 may be produced to run the deep learning software application. Kernel mode driver 628 may be produced, at least in part, to apply global and software hints to hardware during execution of the deep learning software.

Hardware level 630 may include a CPU 632, a graphics processing unit (GPU) 634, simulators 636, and application servers 638. The kernel mode driver 628 may be provided to application servers 638 to manage power during execution of deep learning software 614. CPU 632 and/or GPU 634 are also included in hardware and may perform pre-processing of instructions to be executed.

Figure 7:
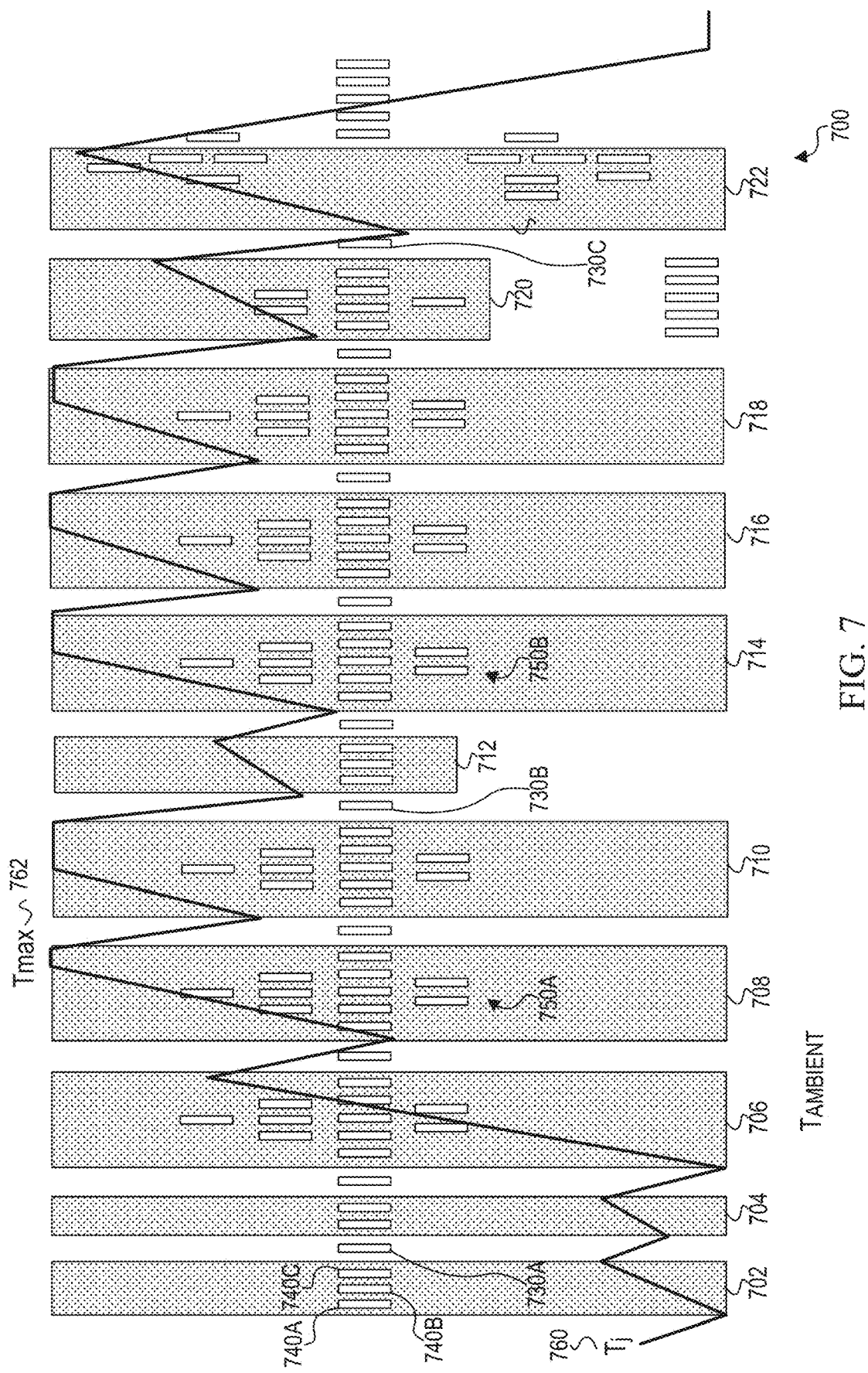
FIG. 7 is a graph illustrating power consumption of example machine learning workloads running on a computing system.

FIG. 7 is a graph 700 depicting an example scenario of possible benefits of using an embodiment described herein to obtain maximum performance by proactive management of compute resources on cycle-by-cycle pipeline management. It should be noted that different machine learning algorithms utilize different resources (e.g., TPC compute engine, HBM memory via OCR), and the same machine learning algorithm utilizes different resources at different times (e.g., TPC compute engine versus HBM memory via OCR). Graph 700 illustrates that by using independent clock cycles for a TPC compute engine and an on-chip router (OCR), cooling can be maximized for a next burst of TPC compute engine and OCR utilization.

In graph 700, an example execution of an image recognition deep learning application in which a picture is used as input and the application outputs a determination of what the picture represents. Each execution bar of execution bars 702-722 represents the execution of one or more instruction phases. Bubbles in an execution bar represent operations performed by instructions in one of the one or more instruction phases executed in the bar. Each line of bubbles represents a different instruction phase being executed in parallel with the other instruction phases. For example, bar 702 represents the execution of one instruction phase that is not executed in parallel with any other instruction phase. Bubbles 740A, 740B, and 740C represent different operations that were performed by the instructions in the instruction phase. Bubbles 750A and 750B are examples of instruction phases running in parallel in execution bars 708 and 714, respectively.

Bubbles between the execution bars represent the output of the prior execution bar. For example, bubble 730A represents the output of operations performed in execution bar 702, bubble 730B represents the output of operations performed in execution bar 710, and bubble 730C represents the output of operations performed in execution bar 720.

A thermal graph line Tj 760 illustrates the temperature fluctuation as the application is executing. A maximum temperature Tmax 762 represents the highest temperature at which the system is allowed to run in the given conditions. Tmax is used to prevent an integrated circuit from tripping maximum allowed thermal conditions, because a higher temperature can cause the electrons to slow down such that execution units cannot run at the desired speed. In addition, silicon may start to melt. Tmax 762 may depend on Tambient, which represents the air temperature. For example, a server in the arctic may have a higher Tmax margin than a server in warmer climates.

Some of the execution bars in graph 700 appear to have similar workloads as indicated by the bubbles and similar thermal conditions. For example, execution bars 708, 710, 714, 716, and 718 have similar workloads, execution bars 702 and 704 have similar workloads, and execution bars 706, 712, and 720 have similar workloads. In at least one embodiment, control rates to optimize performance for memory instruction phases in execution bars with similar workloads can be configured to have the same values, and control rates to optimize performance for execution instruction phases in execution bars with similar workloads can be configured to have the same values. For example, execution instruction phases in 708, 710, 714, 716, and 718 may be optimized using the same control rate, and memory instruction phases in 708, 710, 714, 716, and 718 may be optimized using the same control rate.

Local software hints can designate the type of workload (e.g., Type A, Type B, Type C, etc.) rather than programming the actual control rate in the software hint of a PMOP code. A TPC compute engine that downloads software code with embedded software hints can identify the type of workload in the software hint and then determine the control rate by finding the type of workload in a control rate store. In other examples, the actual control rates of instruction phases can be pre-programmed into software hints for the respective instruction phases.

Figure 8A:
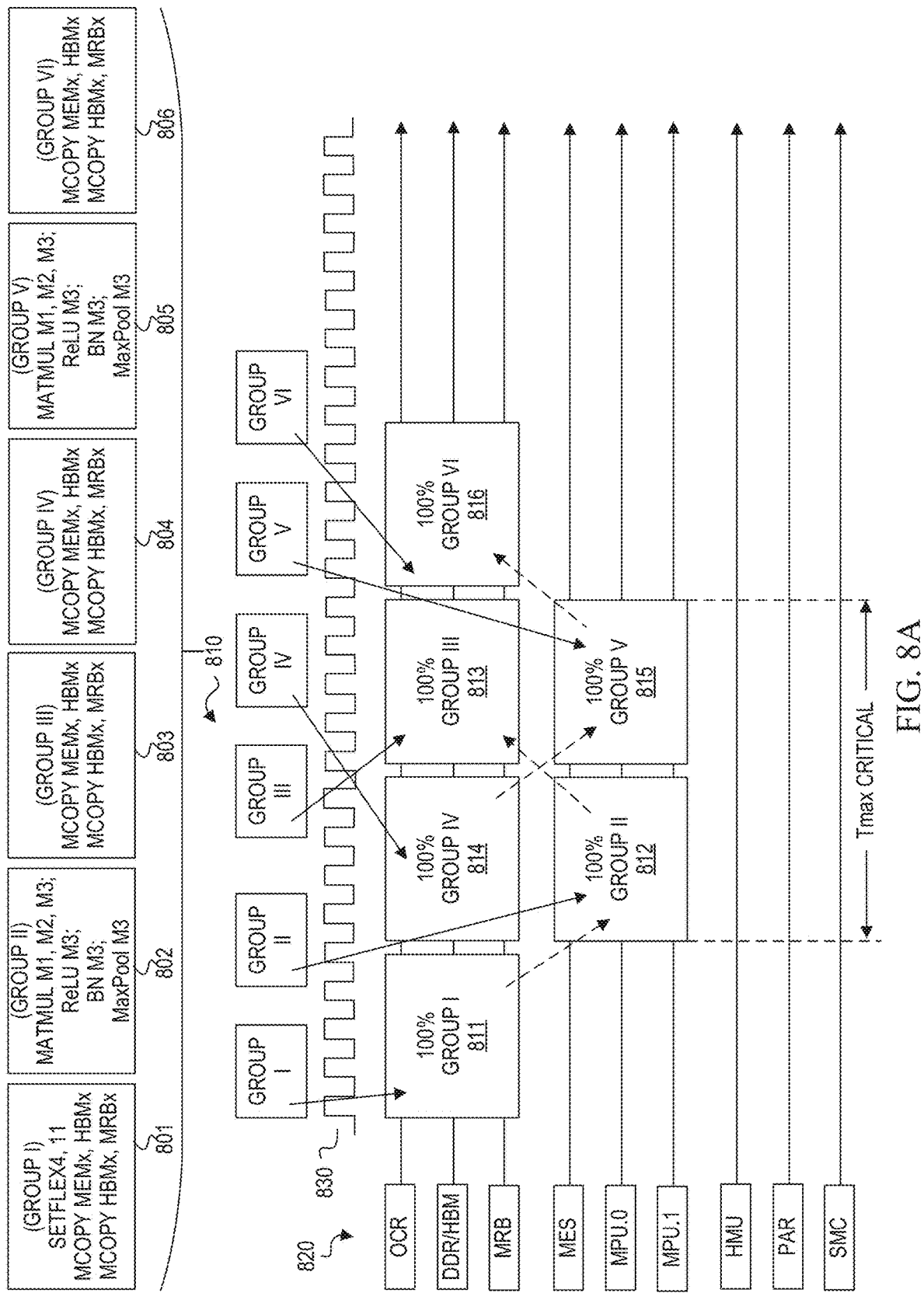
FIG. 8A is a graph illustrating rate controller instruction pipeline scaling of an example machine learning application running on a computing system without a software assisted power management capability.
Figure 8B:
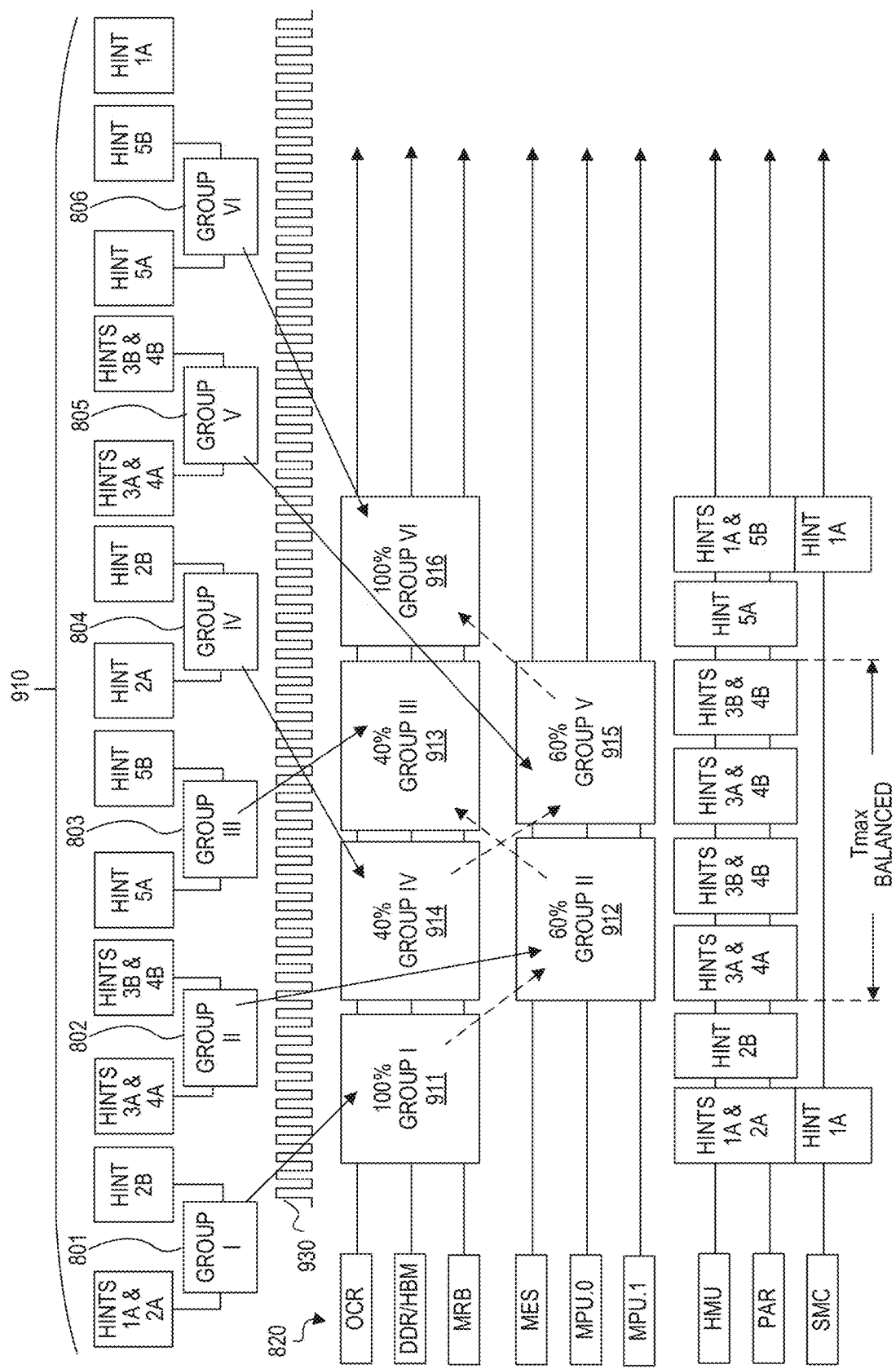
FIG. 8B is an is a graph illustrating rate controller instruction pipeline scaling of an example machine learning application running on a computing system with a software assisted power management capability according to at least one embodiment.

FIGS. 8A and 8B are graphs illustrating rate controller instruction pipeline scaling of an example instruction stream of a machine learning process running on an integrated circuit in a computing system. FIG. 8A shows the execution of an instruction stream 810 on an integrated circuit that is configured without software assisted power management. FIG. 8B shows the execution of instruction stream 810 on an integrated circuit that is configured with software assisted power management according to one or more embodiments described herein. An example clock rate 830 for the execution is illustrated. Resources 820 used for compute instructions and for memory instructions are illustrated. For example, resources 820 comprise OCR, DDR/HBM, and MRB, which are used by memory instruction phases. Resources 820 further comprise MES, a first MPU (MPU.0), and a second MPU (MPU.1), which are resources used by execution instruction phases. Resources such as HMU, PAR, and SMC are not utilized in the example of FIG. 8A as software hints are not embedded in the instruction stream 810. The instruction phases of instruction stream 810 include Group I 801 (initialization and memory), Group II 802 (compute), Group III 803 (memory), Group IV 804 (memory), Group V 805 (compute), and Group VI 806 (memory).

Some dependencies exist where data needs to be fetched before a compute instruction phase is executed. For example, Group I 801 needs to be executed before Group II 802, Group II 802 needs to be executed before Group III, Group IV 804 needs to be executed before Group V 805, and Group V 805 needs to be executed before Group VI 806. In order to compress the execution, instruction phases may be stacked to run in parallel as long as the dependencies are not violated. Without software assisted power management, however, each of the instruction phases tries to run at 100% power consumption, as shown by execution blocks 811-816. Thus, the parallel execution of instruction phases attempting to run at 100% power consumption can cause excessive power. Clock rate 830 can be slowed to 50% frequency to allow 100% power consumption by each instruction phase. However, this impacts performance because the pipeline runs at only 50% according to the slowed clock signal. In addition, the thermal conditions can be critical as it exceeds the maximum temperature during the parallel execution of instructions.

FIG. 8B shows the execution of an instruction stream 810 on an integrated circuit that is configured with software assisted power management according to one or more embodiments described herein. Instruction stream 810 includes the same instruction phases Group I-VI 801-806 as in instruction stream 810 of FIG. 8A. Resources 820 utilized in the execution of instruction stream 810 of FIG. 8A are also utilized in the execution of instruction stream 810 of FIG. 8B. However, additional resources such as HMU, PAR, and SMC are utilized in the execution of instruction stream 810 of FIG. 8B. These additional resources are used to analyze and apply software hints that are embedded in instruction stream 810 in accordance with one or more embodiments. Additionally, a different clock rate 830 is applied to MPU.0 and MPU.1, which execute compute instruction phases, Group II 802 and Group V 805, of instruction stream 810.

Unlike instruction stream 810, one global software hint and several local software hints are embedded in instruction stream 810. In one example, hints embedded in instruction stream 810 can include the following:

Hint 1A—{PMOP_SMC_mode, val} (first occurrence)
Hint 1A—{PMOP_SMC_mode, val} (second occurrence)
Hint 2A—{PMOP_HBM_start, rate}
Hint 2B—{PMOP_HBM_stop, rate}
Hint 3A—{PMOP_MPU_start, rate}
Hint 3B—{PMOP_MPU_stop, rate}
Hint 4A—{PMOP_ALU_start, rate}
Hint 4B—{PMOP_ALU_stop, rate}
Hint 5A—{PMOP_HBM_start, rate}
Hint 5B—{PMOP_HBM_stop, rate}

Hint 1A is a global hint that can be applied globally for the entire instruction stream 810. Hints 2A and 2B can be identified for Groups IV. Hints 3A, 3B, 4A, and 4B can be identified for Groups II and V. Hints 5A and 5B can be identified for Groups III and VI. As shown in the graph, resources HMU, PAR, and SMC are used for identifying, analyzing and applying global hint 1A. In contrast, resources HMU and PAR are used for identifying analyzing, and applying local software hints 2A-2B, 3A-3B, 4A-4B, and 5A-5B. As shown by execution block 814, hints 2A and 2B are not applied to Group IV. As shown by execution block 813, hints 5A and 5B are not applied to Group III. This is because these groups are memory instruction phases running in parallel with compute instruction phases that have greater rate processing values in their local hints.

In the example execution of instruction stream 810 shown in FIG. 8B, Group I is allowed to executed at full power (e.g., 100%) to fetch the first data sets needed for the computations. For the second data set to be retrieved, memory instructions of Group IV do not need to run at 100% power. Accordingly, rate control instructions may be inserted into the pipeline to slow down the processing rate of Group IV to 40% power consumption. Compute instructions of Group II can be accelerated to 60% power. This adjustment can allow Group IV to finish just-in-time for the execution of Group V, which depends on the data fetched by instructions of Group IV.

For the next data set to be retrieved, memory instructions of Group III also do not need to run at 100% power. Accordingly, rate control instructions may be inserted into the pipeline again to slow down the processing rate of Group III to 40% power consumption. Compute instructions of Group V can be accelerated to 60% power. The total combination of power for each pair of group instructions executing in parallel (e.g., Group IV and Group II, Group III and Group V) does not exceed 100%, so the clock signal can be increased to double the frequency shown in FIG. 8A. Thus, performance can increase so that the pipeline is completed in a shorter amount of time and the temperature conditions can be balanced so that execution of parallel instructions does not exceed a maximum temperature.

Turning to FIGS. 9A-9E, example flowcharts illustrate possible flows 900A-900E of operations that may be associated with embodiments described herein. In at least one embodiment, one or more sets of operations correspond 4 to activities of FIGS. 9A-9E. In at least one embodiment, an integrated circuit (e.g., 100) with TPC compute engines (e.g., 112(1)-112(M), 210, 400) and HBM memory (e.g., 132(1)-132(N), 250), or a portion thereof, may utilize the one or more set of operations. In particular, a command decoder (e.g., 230, 430), a rate controller/scheduler (e.g., 240, 442), a command decoder and rate controller/scheduler (e.g., 542), and/or a system management controller (e.g., 120, 264, 464) may utilize and/or perform the one or more sets of operations. In at least one embodiment, flows 900A-900E illustrate one example of implementing software assisted power management in an integrated circuit with TPC compute engines and HBM memory.

Figure 9A:
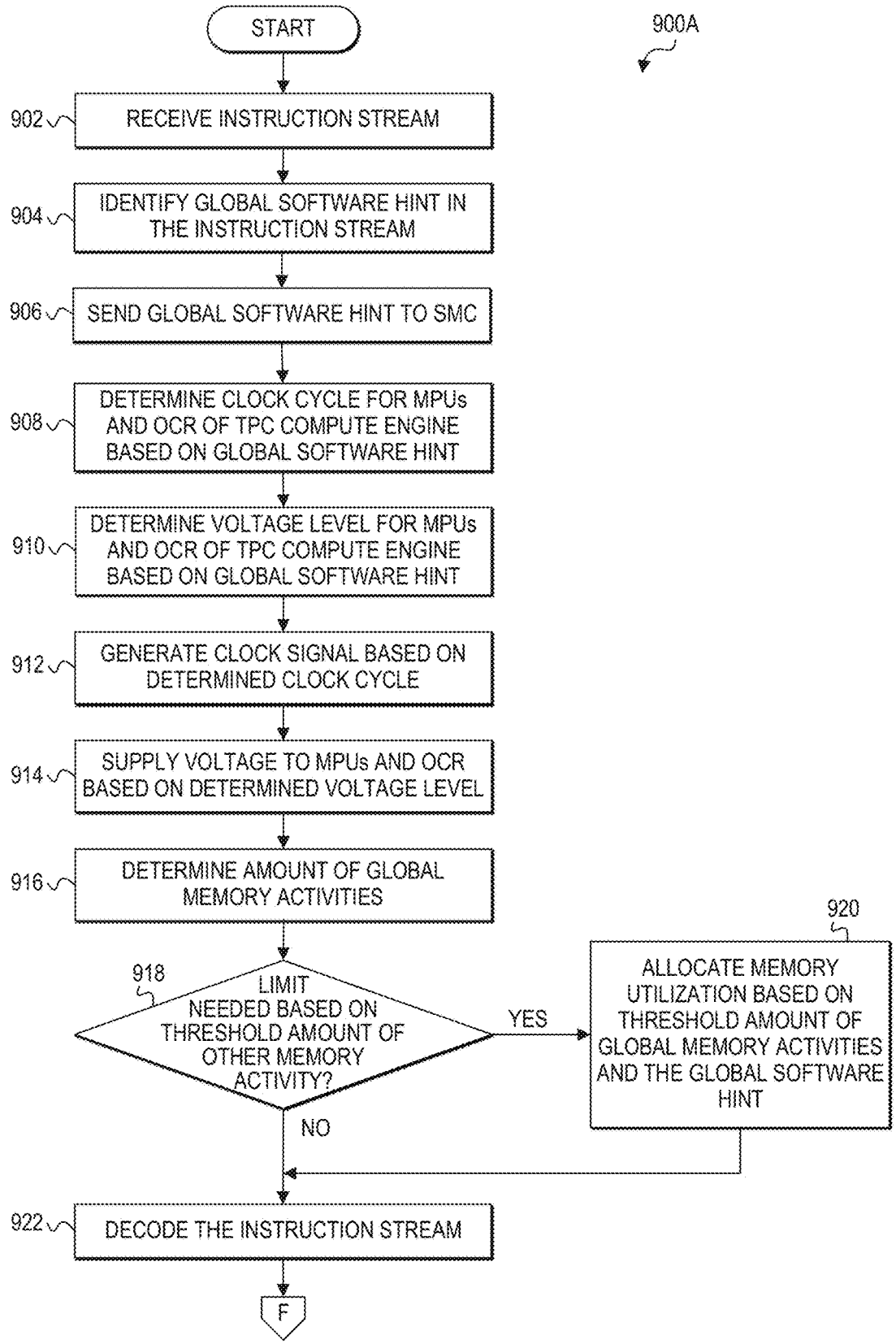
FIGS. 9A-9E are simplified flow charts illustrating possible operations of a computing system implemented with a software assisted power management capability according to at least one embodiment.
Figure 9B:
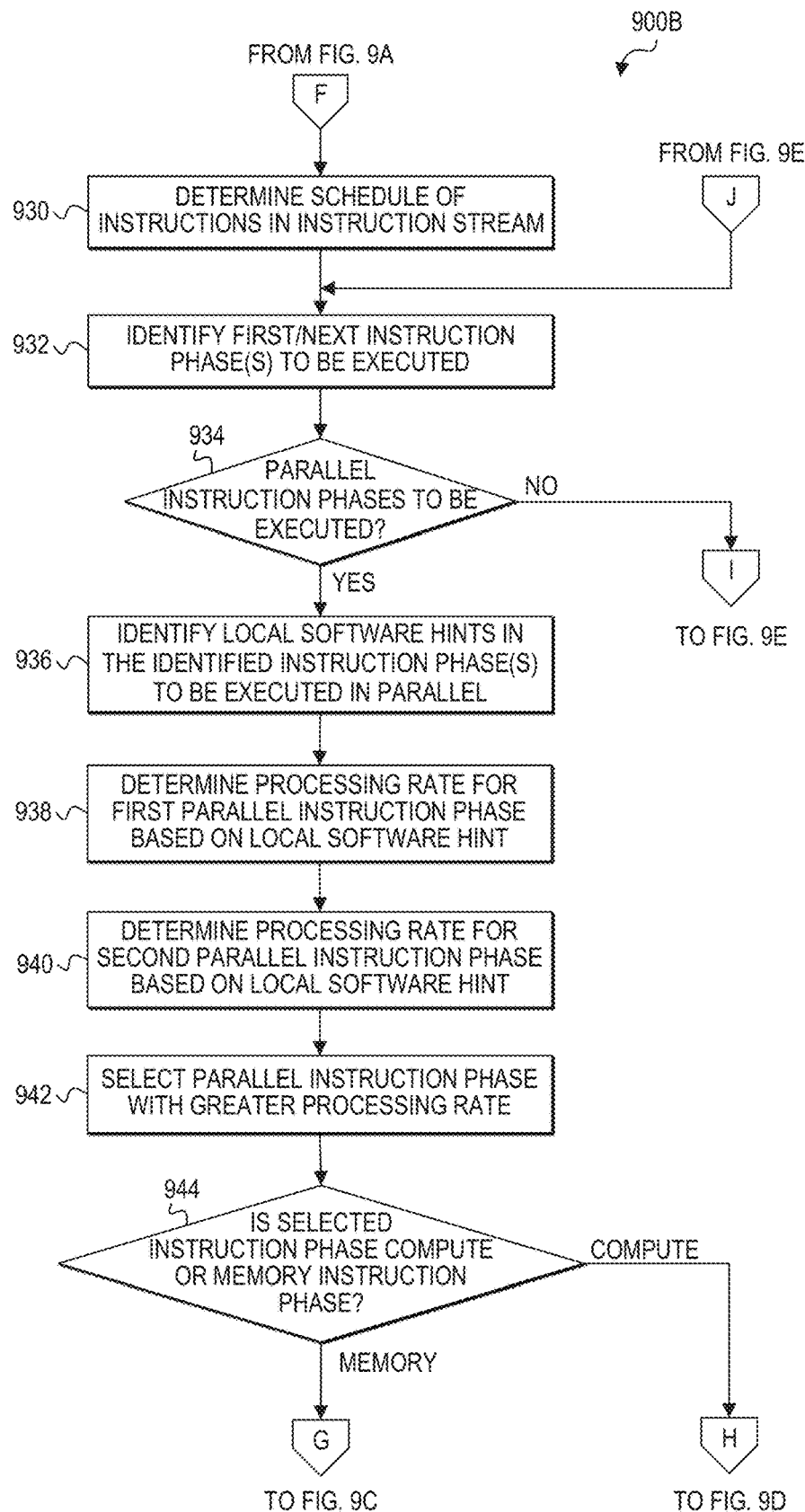
Figure 9C:
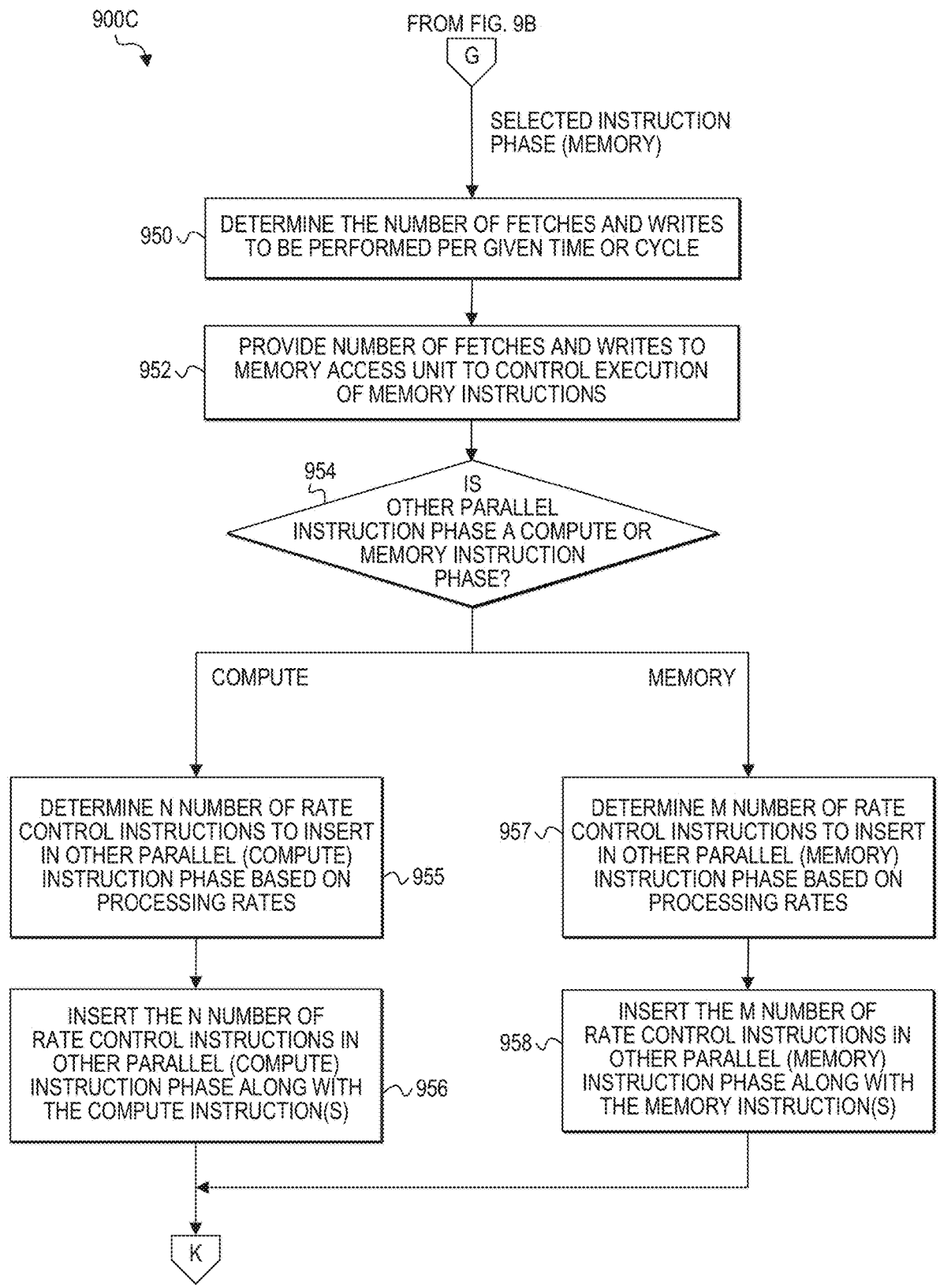

Generally, flow 900A of FIG. 9A shows the analysis and application of a global software hint in software code. At 902, an instruction stream is received by a TPC compute engine. In one example, the instruction stream is associated with a deep learning application and is downloaded into a buffer. At 904, a global software hint is identified in the instruction stream. The global software hint may include a value parameter of a power management operation (PMOP) code embedded in the instruction stream. In at least one embodiment, the value parameter can indicate the type of workload for the instruction stream, such as a particular type of deep learning (e.g., image recognition, language translation, etc.).

At 906, the global software hint is sent to a system management controller (SMC). At 908, a clock cycle is determined for execution units (e.g., MPUs) and an on-chip router (OCR) of the TPC compute engine based on global software hint. At 910, a voltage level is determined for the execution units (e.g., MPUs) and the OCR of the TPC compute engine based on the global software hint. At 912, a clock signal is generated for the MPUs and OCR based on the determined clock cycle for the MPUs and OCR in the TPC compute engine. At 914, voltage is supplied to the MPUs and the OCR of the TPC compute engine based on the determined voltage level. The voltage levels and the clock signals are selected to adjust power consumption by the execution unit based on the global hint. For example, if the global hint indicates a compute-heavy workload, then the voltage levels and clock signals may be selected to increase the speed at which the execution unit runs and the voltage level supplied to the execution unit. If the global hint indicates a memory-heavy workload, then the voltage levels and clock signals may be selected to decrease the speed at which the execution unit runs and the voltage level supplied to the execution unit. This can allow the bandwidth of the OCR and memory accesses to be increased. It should also be noted that the clock cycles may be the same or different for the MPUs and OCR. Similarly, the voltage levels for the MPUs and OCR may be the same or different. Different adjustments can be made depending on the particular workload and desired optimization.

At 916, a determination is made as to the amount of global activity associated with memory (e.g., HBM). Global activity is related to accesses to the memory by other TPC compute engines in the integrated circuit. For example, high levels of memory accesses by other TPC compute engines may require limits on the memory to ensure that the current TPC compute engine can adequately access memory for its purposes in executing the instruction stream.

At 918, a determination is made as to whether a limit is needed based on the determined amount of global memory activity and a threshold amount of global memory activity. If a determination is made that a limit is needed (e.g., global memory activity meets or exceeds the threshold), then at 920, memory utilization is allocated for the current TPC compute engine to access the memory. The memory utilization can be allocated based on the threshold amount of global memory activities occurring and the global software hint. For example, the global software hint indicating the type of workload of the instruction stream can be used to infer the amount of memory utilization that will be needed by the instruction stream.

At 922, the instruction stream can be decoded. Decoding the instruction stream includes interpreting the instruction, which is encoded. Flow 900A can continue in flow 900B of FIG. 9B at 930.

At 930, a schedule of instructions for the instruction stream can be determined. Certain instruction phases may depend on other instruction phases to complete their executions first. In addition, parallel execution of instruction phases may be a preference that is considered when scheduling the instruction phases for execution. Accordingly, dependencies can be determined and instruction phases can be appropriately ordered and scheduled (in parallel when possible) based at least in part on the dependencies.

At 932, a single instruction phase or parallel phases to be executed are identified. For example, a single instruction phase that contains either compute or memory instructions may be scheduled for execution and identified at 932. In another example, two instruction phases (e.g., a first instruction phase and a second instruction phase) may be scheduled to execute in parallel and identified at 932. The first instruction phase may contain memory or compute instructions, and the second instruction phase may contain memory or compute instructions. FIGS. 9B-9E are described with reference to identifying a single instruction phase scheduled for execution and two instruction phases scheduled for parallel execution. In other scenarios, more than two instruction phases may be scheduled for parallel execution and the concepts described herein may be applied in those scenarios as well.

At 934, a determination is made as to whether instruction phases are to be executed in parallel. If an identified instruction phase to be executed is not executing in parallel (i.e., single instruction phase is scheduled) the flow continues in flow 900E of FIG. 9E at 970.

At 970, a local software hint is identified in the identified instruction phase. In at least one embodiment, a rate controller can identify the local software hint, which can include a rate parameter that indicates a type of workload associated with the instruction phase. In one example, the rate parameter may be included in a power management operation code (PMOP) embedded in the instruction stream. The type of workload indicated by the rate parameter can be used to obtain a preprogrammed processing rate to be used for the instruction phase. In other embodiments, the rate parameter may be programmed in the instruction stream (e.g., in the PMOP) as the processing rate itself.

At 972, a determination is made as to the type of the instruction phase (e.g., memory or compute) to be executed. If the instruction phase contains memory instructions, then at 974, a processing rate for memory is determined based on the local software hint. The processing rate for memory indicates the amount of time to allow for the memory instruction phase to execute. In one or more embodiments, the processing rate for memory instructions is provided as a percentage of time that the memory instruction phase is to run within the instruction stream. In other embodiments, other values could be used such as number of clock cycles, or any other measure indicating the amount of time that the memory instruction phase is to run. In some embodiments, the local software hint contains an indication of the type of workload associated with the instruction phase, and a processing rate store (e.g., HBM-BW-RATE store 445) can be searched to identify the correct preprogrammed processing rate based on the local software hint. In other embodiments, the processing rate is programmed in the local software hint itself and can be read and used as the processing rate for memory.

At 976, a determination can be made as to the number of fetches and writes to be performed per a given time or clock cycle. This number of fetches and writes can be determined based on the instruction's operand parameter sizes. The operand can specify how many bytes to fetch and how many bytes to write to and from which memory locations. The given time or clock cycle during which the fetches and writes are to be performed can be determined based on the processing rate. At 978, the determined number of fetches and writes to be performed per the given time or clock cycle can be provided to a memory access unit (MAU) to control execution of the instructions in the memory instruction phase by increasing HBM bandwidth via more frequent memory access requests.

With reference again to 972, if a determination is made that the instruction phase contains compute instructions, then at 980, a processing rate for execution engines (e.g., MPUs) is determined based on the local software hint. The processing rate for compute instructions indicates the amount of time expected for the compute instruction phase to execute. In one or more embodiments, the processing rate for compute instructions is provided as a percentage of time that the compute instruction phase is to run within the instruction stream. In other embodiments, other values could be used such as number of clock cycles, or any other measure indicating the amount of time that the compute instruction phase is to run. In some embodiments, the local software hint contains an indication of the type of workload associated with the instruction phase, and a processing rate store (e.g., MPU-IPC-RATE store 443) can be searched to identify the correct preprogrammed processing rate based on the local software hint. In other embodiments, the processing rate is programmed in the local software hint itself and can be read and used as the processing rate for the MPUs.

At 982, the processing rate for the compute instruction phase may be provided to the execution units (e.g., MPUs) to control execution of the compute instruction phase by increasing the compute pipeline rate (e.g., instructions per cycle (IPC)).

Once the local software hint has been processed for either a memory instruction phase or compute instruction phase to be executed, at 986, the scheduled single compute or memory instruction phase can be executed. The global software hint and local software hint enable the instruction phase to use all available power for the single task since no other parallel tasks are executing.

At 988, a determination is made as to whether another instruction phase in the instruction stream is to be executed. If no more instruction phases are to be executed, then the flow ends. If another instruction phase is waiting for execution, then operations can continue in flow 900B at 932. At 932, a next instruction phase or parallel phases are identified for execution.

Figure 9D:
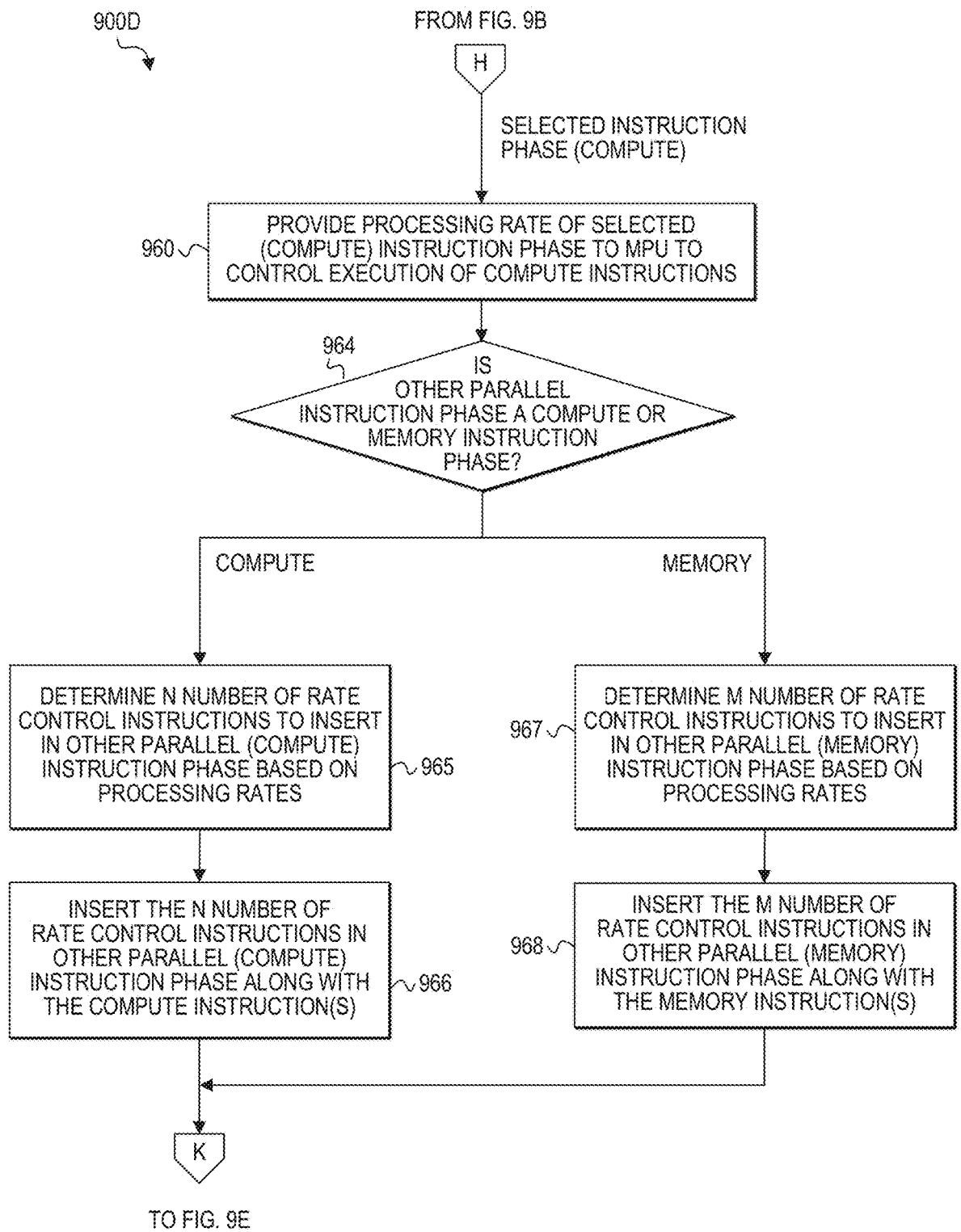
Figure 9E:
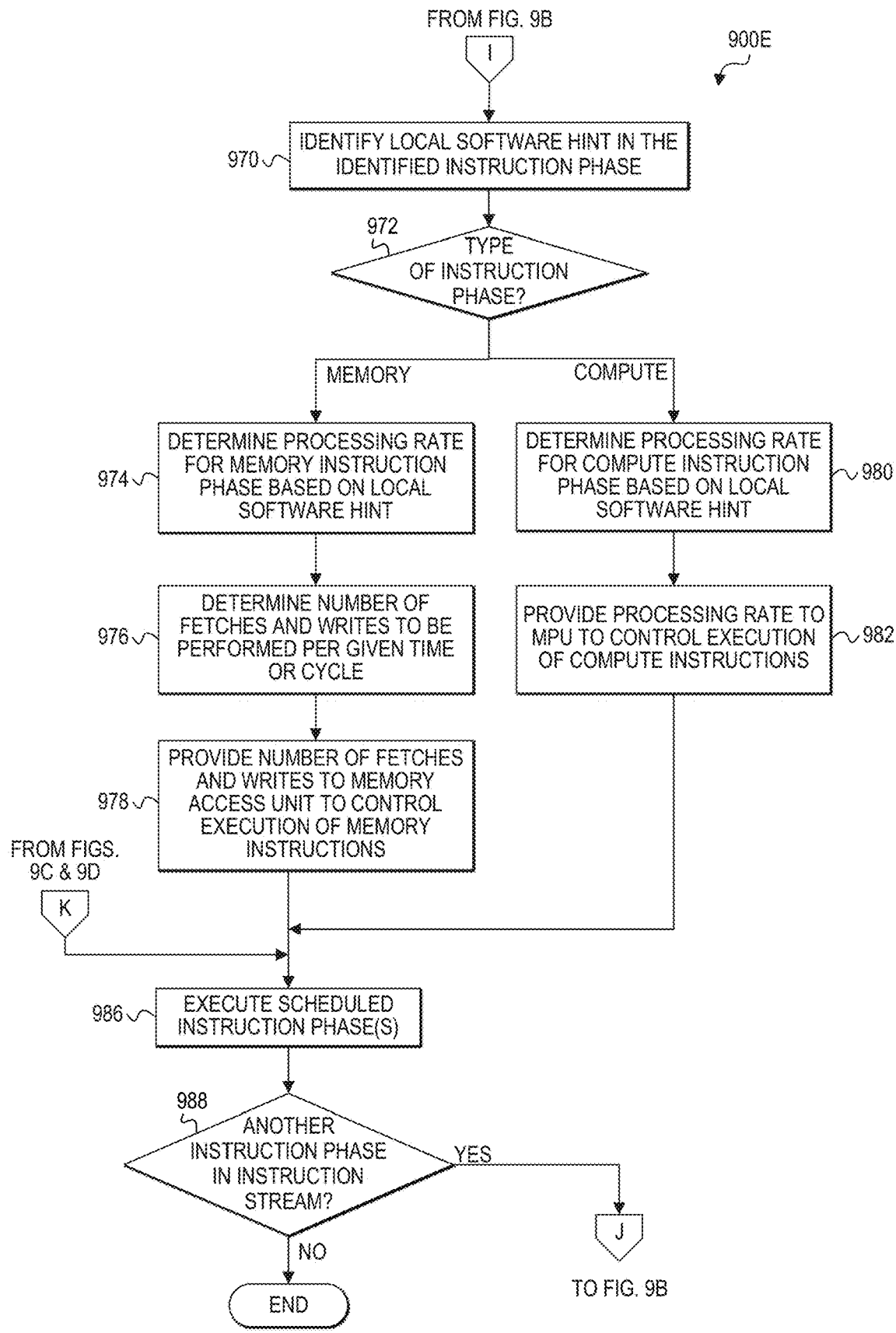

At 934, if a determination is made that an identified instruction phase to be executed is not executing in parallel (i.e., single instruction phase is scheduled), then the flow continues in flow 900E of FIG. 9E, as previously described herein. However, if a determination is made that identified instruction phases (e.g., a first instruction phase and a second instruction phase) are to be executed in parallel, then at 936, the local software hints in the identified instruction phases are identified. At 938, the processing rate (e.g., percentage of time to execute) for the identified first instruction phase is determined based on its local software hint. At 940, the processing rate (e.g., percentage of time to execute) for the identified second instruction phase is determined based on its local software hint.

At 942, one of the identified parallel instruction phases is selected based on which one has a greater processing rate. For example, the processing rates of the first instruction phase and the second instruction phase may be compared, and a determination may be made as to whether the first instruction phase or the second instruction phase has a greater processing rate. The instruction phase with the greater processing rate is selected at 942. At 944, a determination is made as to whether the selected instruction phase with the greater processing rate is a compute instruction phase or a memory instruction phase. If a determination is made that the selected instruction phase with the greater processing rate is a memory instruction phase, then operations continue in flow 900C of FIG. 9C at 950.

At 950, a determination can be made as to the number of fetches and writes to be performed per a given time or clock cycle. This number of fetches and writes can be determined based on the instruction's operand parameter sizes. The operand can specify how many bytes to fetch and how many bytes to write to and from which memory locations. The given time or clock cycle during which the fetches and writes are to be performed can be determined based on the processing rate. At 952, the determined number of fetches and writes to be performed per the given time or cycle can be provided to a memory access unit (MAU) to control execution of the instructions in the memory instruction phase. For example, bandwidth of the HBM accesses and on-chip router (OCR) can be increased by allowing more frequent memory access requests via an HBM Interface router (HIR).

At 954, a determination can be made as to whether the other parallel instruction phase is a compute or memory instruction phase. The other parallel instruction phase was determined to have a processing rate that is less than the processing rate of the selected memory instruction phase. If the other parallel instruction phase contains compute instructions, then at 955, a determination is made as to the number (N) of rate control instructions to be inserted in the instruction stream with compute instructions of the other parallel instruction phase (referred to as 'parallel compute instruction phase). In at least one embodiment, the N number is selected to slow down the compute instructions in the parallel compute instruction phase to finish executing when the selected memory instruction phase finishes. This results in the parallel compute instruction phase finishing just-in-time for a subsequent dependent memory or compute instruction phase to begin execution. The processing rates of the selected memory instruction phase and the parallel compute instruction phase can be used to select the N number. At 956, the N number of rate control instructions, such as no operation instructions (NOPs), are inserted in the instruction stream with the compute instructions of the parallel compute instruction phase. In at least one embodiment, the rate control instructions are inserted in a compute execution pipeline of the parallel compute instruction phase.

At 954, if a determination is made that the other parallel instruction phase contains memory instructions, then at 957, a determination is made as to the number (M) of rate control instructions to be inserted in the instruction stream with memory instructions of the parallel memory instruction phase. In at least one embodiment, the M number is selected to slow down the memory instructions in the parallel memory instruction phase to finish executing when the selected memory instruction phase finishes. This results in the parallel memory instruction phase finishing just-in-time for a subsequent dependent memory or compute instruction phase to begin execution. The processing rates of the selected memory instruction phase and the parallel memory instruction phase can be used to select the M number. At 958, the M number of rate control instructions, such as no operation instructions (NOPs), are inserted in the instruction stream with the memory instructions of the parallel memory instruction phase. In at least one embodiment, the M rate control instructions are inserted in a memory execution pipeline of the memory instruction phase.

Operations can continue in flow 900E at 986. At 986, the scheduled parallel instruction phases (e.g., selected memory instruction phase and parallel memory or compute instruction phase) can be executed, using the global and local software hints to balance the power consumption of the execution pipelines for the parallel instruction phases.

At 988, a determination is made as to whether another instruction phase in the instruction stream is to be executed. If no more instruction phases are to be executed, then the flow ends. If another instruction phase is waiting for execution, then operations can continue in flow 900B at 932. At 932, a next instruction phase or parallel phases are identified for execution and the flow continues as described herein.

With reference again to 944, if a determination is made that the selected instruction phase with a greater processing rate is a compute instruction phase, then operations continue in flow 900D of FIG. 9D at 960. At 960, the processing rate for the compute instruction phase may be provided to the execution units (e.g., MPUs) to control execution of the compute instruction phase by increasing the compute pipeline rate (or IPC).

At 964, a determination can be made as to whether the other parallel instruction phase is a compute or memory instruction phase. The other parallel instruction phase was determined to have a processing rate that is less than the processing rate of the selected compute instruction phase. If the other parallel instruction phase contains compute instructions, then at 965, a determination is made as to the number (N) of rate control instructions to be inserted in the instruction stream with compute instructions of the other parallel instruction phase (referred to as 'parallel compute instruction phase). In at least one embodiment, the N number is selected to slow down the compute instructions in the parallel compute instruction phase to finish executing when the selected compute instruction phase finishes. This results in the parallel compute instruction phase finishing just-in-time for a subsequent dependent memory or compute instruction phase to begin execution. The processing rates of the selected compute instruction phase and the parallel compute instruction phase can be used to select the N number. At 966, the N number of rate control instructions, such as no operation instructions (NOPs), can be inserted in the instruction stream with the compute instructions of the parallel compute instruction phase. In at least one embodiment, the rate control instructions are inserted in a compute execution pipeline of the parallel compute instruction phase.

At 964, if a determination is made that the other parallel instruction phase contains memory instructions, then at 967, a determination is made as to the number (M) of rate control instructions to be inserted in the instruction stream with memory instructions of the other parallel instruction phase (referred to herein as 'parallel memory instruction phase'). In at least one embodiment, the M number is selected to slow down the memory instructions in the parallel memory instruction phase to finish executing when the selected compute instruction phase finishes. This results in the parallel memory instruction phase finishing just-in-time for a subsequent dependent memory or compute instruction phase to begin execution. The processing rates of the selected compute instruction phase and the parallel memory instruction phase can be used to select the M number. At 968, the M number of rate control instructions, such as no operation instructions (NOPs), are inserted in the instruction stream with the memory instructions of the parallel memory instruction phase. In at least one embodiment, the M rate control instructions are inserted in a memory execution pipeline for the memory instruction phase.

Operations can continue in flow 900E at 986. At 986, the scheduled parallel instruction phases (e.g., selected compute instruction phase and parallel memory or compute instruction phase) can be executed, using the global and local software hints to balance the power consumption of the execution pipelines for the parallel instruction phases.

At 988, a determination is made as to whether another instruction phase in the instruction stream is to be executed. If no more instruction phases are to be executed, then the flow ends. If another instruction phase is waiting for execution, then operations can continue in flow 900B at 932. At 932, a next instruction phase or parallel phases are identified for execution and the flow continues as described herein.

Figure 10:
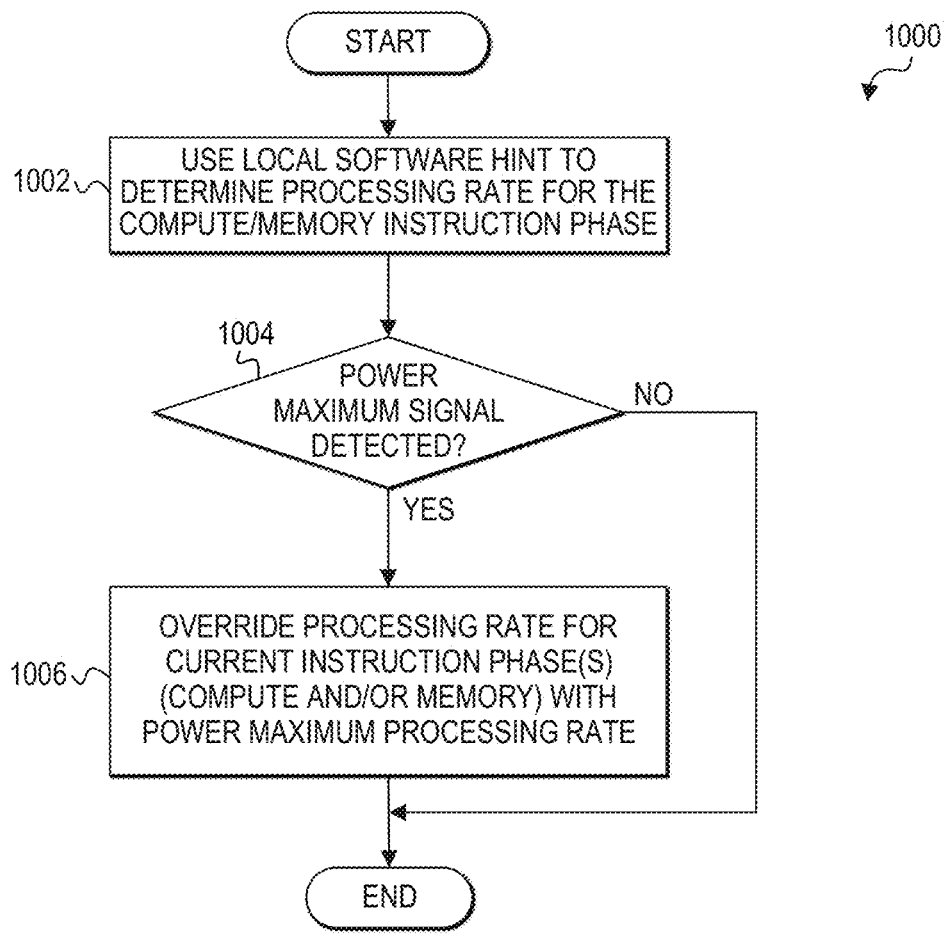
FIG. 10 is a simplified flow chart illustrating further possible operations of a computing system implemented with a software assisted power management capability according to at least one embodiment.

FIG. 10 is a flowchart illustrating a simplified flow 1000 of operations that may be associated with embodiments described herein. In at least one embodiment, one or more sets of operations correspond to activities of FIG. 10. In at least one embodiment, an integrated circuit (e.g., 100) with TPC compute engines (e.g., 112(1)-112(M), 210, 400) and HBM memory (e.g., 132(1)-132(N), 250, 590), or a portion thereof, may utilize the one or more sets of operations. In particular, a rate controller/scheduler (e.g., 240, 442), a command decoder and rate controller/scheduler (e.g., 542), and/or control hardware (e.g., 450) may utilize and/or perform the one or more sets of operations. In at least one embodiment, flow 1000 illustrates one example of determining a processing rate for an instruction phase, which may be a compute instruction phase or a memory instruction phase, as shown at 938, 940, 974, and 980, for example.

At 1002, a local software hint is used to determine a processing rate for a compute or memory instruction phase. In one embodiment, the local software hint indicates a type of workload (e.g., TOPS, GEMM, CONV, ELEM) of the particular instruction phase. Processing rates may be preprogrammed (e.g., in registers or other suitable memory components) for each type of workload and may be selected based on the local software hint.

At 1004, a determination is made as to whether a maximum power signal (e.g., Pmax flag) has been detected. In at least one embodiment, a maximum power signal may be generated when power consumption reaches a certain threshold that represents the maximum power the device is designed to consume for a short duration of time. If the maximum power signal has not been detected, then flow 1000 ends and the processing rate for each current instruction phase is determined based on the local software hint for that current instruction phase.

If the maximum power signal is detected, then at 1006, the maximum power signal overrides the processing rate that was selected by the rate controller based on a local software hint. Instead, a preprogrammed maximum power processing rate is selected. The preprogrammed maximum power processing rate may be different for compute instruction phases and for memory instruction phases in at least some embodiments. In one example, in compute instruction phases, the value of the Pmax preprogrammed processing rate indicates a number of cycles to idle before each compute instruction cycles. Thus, NOP instructions may be added to the compute instruction phase based on the Pmax value. Similarly, NOP instructions may be added to the memory instruction phase based on the Pmax value for memory instructions. A Pmax signal can enable hard braking of power to prevent system failure.

FIGS. 11-19 detail exemplary architectures and systems to implement embodiments of the above (such as integrated circuit 100, TPC compute engines 112(1)-112(M), 210, 400, microcode controller 220, 500, command decoder 230, 430, rate controller/scheduler 240, command decoder and rate controller/scheduler 542, etc.). In some embodiments, one or more hardware components and/or instructions described above are emulated as detailed below or implemented as software modules. Other computer architecture designs known in the art for processors, mobile devices, computing systems, and components thereof may also (or alternatively) be used. Generally, suitable computer architectures for embodiments disclosed herein can include, but are not limited to, configurations illustrated in FIGS. 11-19.

Embodiments of the instruction(s) detailed above may be embodied in a "generic vector friendly instruction format." In other embodiments, such a format is not utilized and another instruction format is used, however, the description below of the writemask registers, various data transformations (swizzle, broadcast, etc.), addressing, etc. is generally applicable to the description of the embodiments of the instruction(s) above. Additionally, example systems, architectures, and pipelines are detailed below. Embodiments of the instruction(s) above may be executed on such systems, architectures, and pipelines, but are not limited to those detailed.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, May 2019; and see Intel® Advanced Vector Extensions Programming Reference, October 2014).

FIG. 11 is a block diagram of a register architecture 1100 according to at least one embodiment of the present disclosure. In the embodiment illustrated, there are 32 vector registers 1110 that are 512 bits wide; these registers are referenced as zmm0 through zmm31. The lower order 256 bits of the lower 16 zmm registers are overlaid on registers ymm0-15. The lower order 128 bits of the lower 16 zmm registers (the lower order 128 bits of the ymm registers) are overlaid on registers xmm0-15.

In other words, a vector length field selects between a maximum length and one or more other shorter lengths, where each such shorter length is half the length of the preceding length; and instructions templates without the vector length field operate on the maximum vector length. Further, in one embodiment, class B instruction templates of a specific vector friendly instruction format operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1115—in the embodiment illustrated, there are 8 write mask registers (k0 through k7), each 64 bits in size. In an alternate embodiment, the write mask registers 1115 are 16 bits in size. As previously described, in one embodiment, the vector mask register k0 cannot be used as a write mask; when the encoding that would normally indicate k0 is used for a write mask, it selects a hardwired write mask of 0xFFFF, effectively disabling write masking for that instruction.

General-purpose registers 1125—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1145, on which is aliased the MMX packed integer flat register file 1150—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the present disclosure may use wider or narrower registers. Additionally, alternative embodiments of the present disclosure may use more, less, or different register files and registers.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

FIG. 12A is a block diagram illustrating both an exemplary in-order pipeline and an exemplary register renaming, out-of-order issue/execution pipeline according to one or more embodiments of this disclosure. FIG. 12B is a block diagram illustrating both an exemplary embodiment of an in-order architecture core and an exemplary register renaming, out-of-order issue/execution architecture core to be included in a processor according to one or more embodiments of this disclosure. The solid lined boxes in FIGS. 12A-12B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

FIG. 12A illustrates an example processor pipeline 1200. Generally, pipelines are created by dividing the processing of a CPU instruction into a series of micro-operations, using storage at the end of each micro-operation. Each micro-operation is linked to another micro-operation. In FIG. 12A, processor pipeline 1200 includes a fetch stage 1202, a length decode stage 1204, a decode stage 1206, an allocation stage 1208, a renaming stage 1210, a scheduling (also known as a dispatch or issue) stage 1212, a register read/memory read stage 1214, an execute stage 1216, a write back/memory write stage 1218, an exception handling stage 1222, and a commit stage 1224.

FIG. 12B shows processor core 1290 including a front end unit 1230 coupled to an execution engine unit 1250, and both are coupled to a memory unit 1270. The core 1290 may be a reduced instruction set computing (RISC) core, a complex instruction set computing (CISC) core, a very long instruction word (VLIW) core, or a hybrid or alternative core type. As yet another option, the core 1290 may be a special-purpose core, such as, for example, a tensor processing core (TPC), a network or communication core, compression engine, coprocessor core, general purpose computing graphics processing unit (GPGPU) core, graphics core, or the like.

The front end unit 1230 includes a branch prediction unit 1232 coupled to an instruction cache unit 1234, which is coupled to an instruction translation lookaside buffer (TLB) 1236, which is coupled to an instruction fetch unit 1238, which is coupled to a decode unit 1240. The decode unit 1240 (or decoder) may decode instructions, and generate as an output one or more micro-operations, micro-code entry points, microinstructions, other instructions, or other control signals, which are decoded from, or which otherwise reflect, or are derived from, the original instructions. In at least one embodiment, decode unit 1240 includes functionality of command decoder 230, 430, 542 as previously described herein. Accordingly, decode unit 1240 may be configured to decode an instruction stream that includes memory instruction phases and/or compute instruction phases and also to identify global software hints and local software hints in the instruction stream.

The decode unit 1240 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1290 includes a microcode ROM or other medium that stores microcode for certain macroinstructions (e.g., in decode unit 1240 or otherwise within the front end unit 1230). The decode unit 1240 is coupled to a rename/allocator unit 1252 in the execution engine unit 1250.

The execution engine unit 1250 includes the rename/allocator unit 1252 coupled to a retirement unit 1254 and a set of one or more scheduler unit(s) 1256. The scheduler unit(s) 1256 represents any number of different schedulers, including reservations stations, central instruction window, etc. The scheduler unit(s) 1256 is coupled to the physical register file(s) unit(s) 1258. Each of the physical register file(s) unit(s) 1258 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit(s) 1258 comprises a vector registers unit, a write mask registers unit, and a scalar registers unit. These register units may provide architectural vector registers, vector mask registers, and general purpose registers. The physical register file(s) unit(s) 1258 is overlapped by the retirement unit 1254 to illustrate various ways in which register renaming and out-of-order execution may be implemented (e.g., using a reorder buffer(s) and a retirement register file(s); using a future file(s), a history buffer(s), and a retirement register file(s); using register maps and a pool of registers; etc.). The retirement unit 1254 and the physical register file(s) unit(s) 1258 are coupled to the execution cluster(s) 1260.

The execution cluster(s) 1260 includes a set of one or more execution units 1262 and a set of one or more memory access units 1264. The execution units 1262 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. In at least one example, execution unit 1262 may include an execution unit (e.g., 212), such as a matrix processing unit (e.g., 412A, 412B, 560), as described herein with reference to one or more embodiments.

The scheduler unit(s) 1256, physical register file(s) unit(s) 1258, and execution cluster(s) 1260 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1264). It should also be understood that where separate pipelines are used, one or more of these pipelines may be out-of-order issue/execution and the rest in-order. In at least one embodiment, scheduler unit 1256 may include a rate controller/scheduler (e.g., 240, 442, 542) as described herein with reference to one or more embodiments. Scheduler unit 1256 can determine the processing rate for compute instruction phases and memory instruction phases of an instruction stream. These processing rates can be used to control instructions per cycle for compute resources and to control memory access bandwidth for memory resources.

The set of memory access units 1264 is coupled to the memory unit 1270, which includes a data TLB unit 1272 coupled to a data cache unit 1274 coupled to a level 2 (L2) cache unit 1276. In one exemplary embodiment, the memory access units 1264 may include a load unit, a store address unit, and a store data unit, each of which is coupled to the data TLB unit 1272 in the memory unit 1270. The instruction cache unit 1234 is further coupled to a level 2 (L2) cache unit 1276 in the memory unit 1270. The L2 cache unit 1276 is coupled to one or more other levels of cache and eventually to a main memory. In at least one embodiment, memory access units 1264 may be a memory access unit (e.g., 214, 414, 570), which may include an on-chip router (e.g., 216, 416, 510) as described herein with reference to one or more embodiments. The memory access unit 1264 limits the bandwidth of accesses to HBM memory based on rate control information received from the scheduler unit 1256.

By way of example, the exemplary register renaming, out-of-order issue/execution core architecture may implement the pipeline 1200 as follows: 1) the instruction fetch unit 1238 performs the fetch and length decode stages 1202 and 1204; 2) the decode unit 1240 performs the decode stage 1206; 3) the rename/allocator unit 1252 performs the allocation stage 1208 and renaming stage 1210; 4) the scheduler unit(s) 1256 performs the scheduling stage 1212; 5) the physical register file(s) unit(s) 1258 and the memory unit 1270 perform the register read/memory read stage 1214; the execution cluster 1260 perform the execute stage 1216; 6) the memory unit 1270 and the physical register file(s) unit(s) 1258 perform the write back/memory write stage 1218; 7) various units may be involved in the exception handling stage 1222; and 8) the retirement unit 1254 and the physical register file(s) unit(s) 1258 perform the commit stage 1224.

The core 1290 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.); the RISC-V open-source instruction set, which began at the University of California, Berkeley in 2010; GPU instruction set for the CUDA computing platform of Nvidia Corporation, including the instruction(s) described herein. In one embodiment, the core 1290 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1234/1474 and a shared L2 cache unit 1276, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 13B:
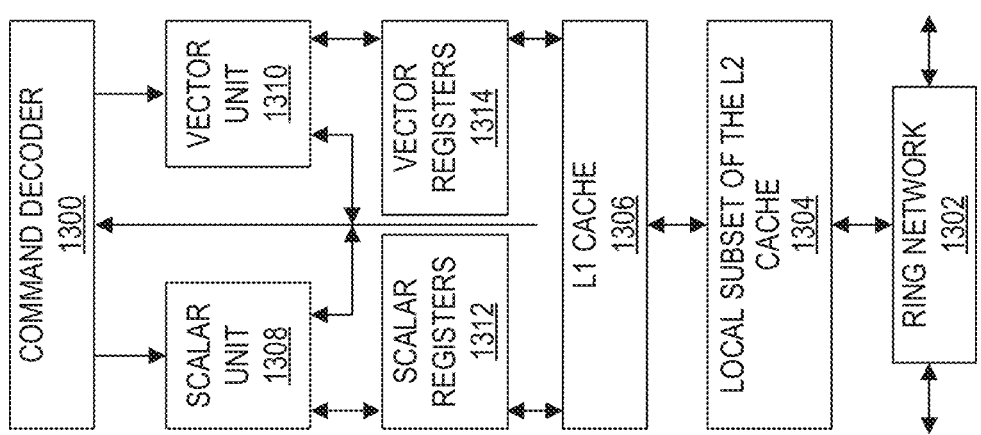
FIGS. 13A-13B illustrate a block diagram of a more specific exemplary in-order core architecture, which core would be one of several logic blocks (including other cores of the same type and/or different types) in a chip.
Figure 13A:
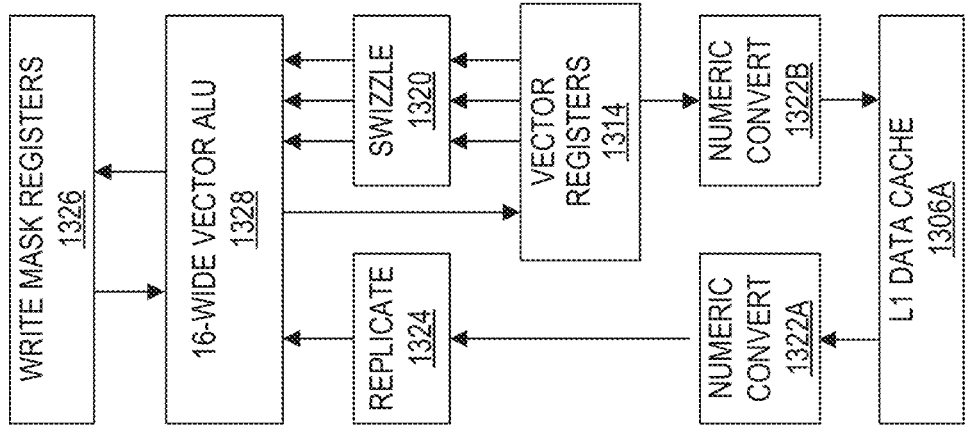

FIGS. 13A-13B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 13A is a block diagram of a single processor core, along with its connection to the on-die interconnect network 1302 and with its local subset of the Level 2 (L2) cache 1304, according to one or more embodiments of this disclosure. In one embodiment, a command decoder 1300 supports the x86 instruction set with a packed data instruction set extension. An L1 cache 1306 allows low-latency accesses to cache memory into the scalar and vector units. While in one embodiment (to simplify the design), a scalar unit 1308 and a vector unit 1310 use separate register sets (respectively, scalar registers 1312 and vector registers 1314) and data transferred between them is written to memory and then read back in from a level 1 (L1) cache 1306, alternative embodiments of the present disclosure may use a different approach (e.g., use a single register set or include a communication path that allows data to be transferred between the two register files without being written and read back).

The local subset of the L2 cache 1304 is part of a global L2 cache that is divided into separate local subsets, one per processor core. Each processor core has a direct access path to its own local subset of the L2 cache 1304. Data read by a processor core is stored in its L2 cache subset 1304 and can be accessed quickly, in parallel with other processor cores accessing their own local L2 cache subsets. Data written by a processor core is stored in its own L2 cache subset 1304 and is flushed from other subsets, if necessary. The ring network 1302 ensures coherency for shared data. The ring network is bi-directional to allow agents such as processor cores, L2 caches and other logic blocks to communicate with each other within the chip. Each ring data-path is 1012-bits wide per direction.

FIG. 13B is an expanded view of part of the processor core in FIG. 13A according to one or more embodiments this disclosure. FIG. 13B includes an L1 data cache 1306A, part of the L2 cache 1304, as well as more detail regarding the vector unit 1310 and the vector registers 1314. Specifically, the vector unit 1310 is a 16-wide vector processing unit (VPU) (see the 16-wide ALU 1328), which executes one or more of integer, single-precision float, and double-precision float instructions. The VPU supports swizzling the register inputs with swizzle unit 1320, numeric conversion with numeric convert units 1322A-B, and replication with replication unit 1324 on the memory input. Write mask registers 1326 allow predicating resulting vector writes.

Figure 14:
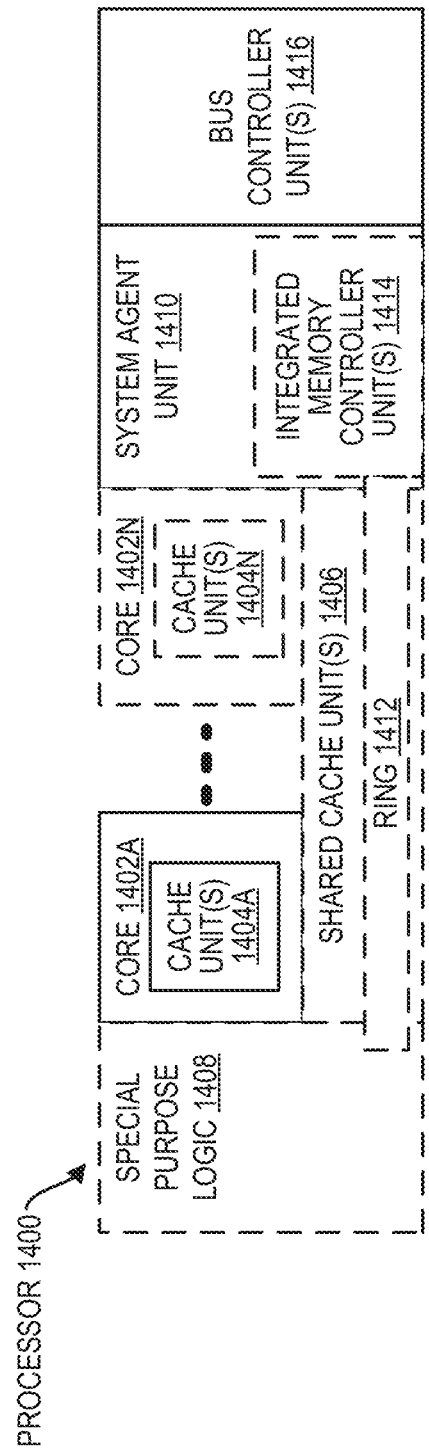
FIG. 14 is a block diagram of a processor that may have more than one core, may have an integrated memory controller, and may have integrated graphics according to embodiments of the present disclosure.

FIG. 14 is a block diagram of a processor 1400 that may have more than one core, may have an integrated memory controller, and may have integrated graphics according to one or more embodiment of this disclosure. The solid lined boxes in FIG. 14 illustrate a processor 1400 with a single core 1402A, a system agent unit 1410, a set of one or more bus controller units 1416, while the optional addition of the dashed lined boxes illustrates an alternative processor 1400 with multiple cores 1402A-N, a set of one or more integrated memory controller unit(s) 1414 in the system agent unit 1410, and special purpose logic 1408.

Thus, different implementations of the processor 1400 may include: 1) a CPU with the special purpose logic 1408 being integrated graphics and/or scientific (throughput) logic (which may include one or more cores), and the cores 1402A-N being one or more general purpose cores (e.g., general purpose in-order cores, general purpose out-of-order cores, a combination of the two); 2) a coprocessor with the cores 1402A-N being a large number of special purpose cores intended primarily for graphics and/or scientific (throughput); and 3) a coprocessor with the cores 1402A-N being a large number of general purpose in-order cores. Thus, the processor 1400 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1400 may be a part of and/or may be implemented on one or more substrates using any of a number of process technologies, such as, for example, BiCMOS, CMOS, or NMOS.

The memory hierarchy includes one or more levels of cache within the cores, such as cache units 1404A-N, a set or one or more shared cache units 1406, and external memory (not shown) coupled to the set of integrated memory controller units 1414. The set of shared cache units 1406 may include one or more mid-level caches, such as level 2 (L2), level 3 (L3), level 4 (L4), or other levels of cache, a last level cache (LLC), and/or combinations thereof. While in one embodiment a ring based interconnect unit 1412 interconnects the special purpose logic 1408 (e.g., integrated graphics logic), the set of shared cache units 1406, and the system agent unit 1410/integrated memory controller unit(s) 1414, alternative embodiments may use any number of well-known techniques for interconnecting such units. In one embodiment, coherency is maintained between one or more cache units 1404A-N and cores 1402A-N.

In some embodiments, one or more of the cores 1402A-N are capable of multi-threading. The system agent 1410 includes those components coordinating and operating cores 1402A-N. The system agent unit 1410 may include for example a power control unit (PCU) and a display unit. The PCU may be or include logic and components needed for regulating the power state of the cores 1402A-N and the integrated graphics logic 1408. The display unit is for driving one or more externally connected displays.

The cores 1402A-N may be homogenous or heterogeneous in terms of architecture instruction set; that is, two or more of the cores 1402A-N may be capable of executing the same instruction set, while others may be capable of executing only a subset of that instruction set or a different instruction set.

FIGS. 15-18 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 15:
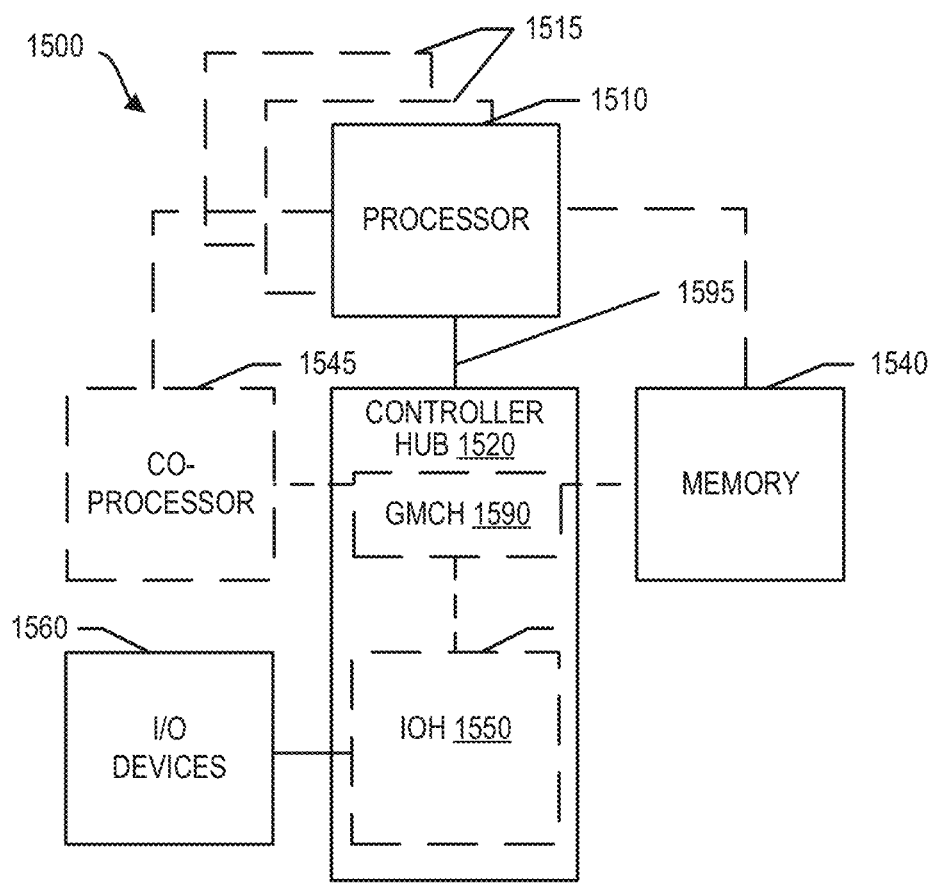
FIGS. 15-18 are block diagrams of exemplary computer architectures.

Referring now to FIG. 15, shown is a block diagram of a system 1500 in accordance with at least one embodiment of the present disclosure. The system 1500 may include one or more processors 1510, 1515, which are coupled to a controller hub 1520. In one embodiment the controller hub 1520 includes a graphics memory controller hub (GMCH) 1590 and an Input/Output Hub (IOH) 1550 (which may be on separate chips); the GMCH 1590 includes memory and graphics controllers to which are coupled memory 1540 and a coprocessor 1545; the IOH 1550 couples input/output (I/O) devices 1560 to the GMCH 1590. Alternatively, one or both of the memory and graphics controllers are integrated within the processor (as described herein), the memory 1540 and the coprocessor 1545 are coupled directly to the processor 1510, and the controller hub 1520 in a single chip with the IOH 1550.

The optional nature of additional processors 1515 is denoted in FIG. 15 with broken lines. Each processor 1510, 1515 may include one or more of the processing cores described herein and may be some version of the processor 1400.

The memory 1540 may be, for example, dynamic random access memory (DRAM), phase change memory (PCM), multi-state memory (e.g., quantum storage cells, etc.), or any suitable combination of the storage devices. For at least one embodiment, the controller hub 1520 communicates with the processor(s) 1510, 1515 via a multi-drop bus, such as a frontside bus (FSB), point-to-point interface such as QuickPath Interconnect (QPI), or similar connection 1595.

In one embodiment, the coprocessor 1545 is a special-purpose processor, such as, for example, a high-throughput MIC processor, a network or communication processor, compression engine, graphics processor, GPGPU, embedded processor, or the like. In one embodiment, controller hub 1520 may include an integrated graphics accelerator.

There can be a variety of differences between the physical resources 1510, 1515 in terms of a spectrum of metrics of merit including architectural, microarchitectural, thermal, power consumption characteristics, product reliabilities, system stabilities, power-performance efficiencies, and the like.

In one embodiment, the processor 1510 executes instructions that control data processing operations of a general type. Embedded within the instructions may be coprocessor instructions. The processor 1510 recognizes these coprocessor instructions as being of a type that should be executed by the attached coprocessor 1545. Accordingly, the processor 1510 issues these coprocessor instructions (or control signals representing coprocessor instructions) on a coprocessor bus or other interconnect, to coprocessor 1545. Coprocessor(s) 1545 accept and execute the received coprocessor instructions.

Figure 16:
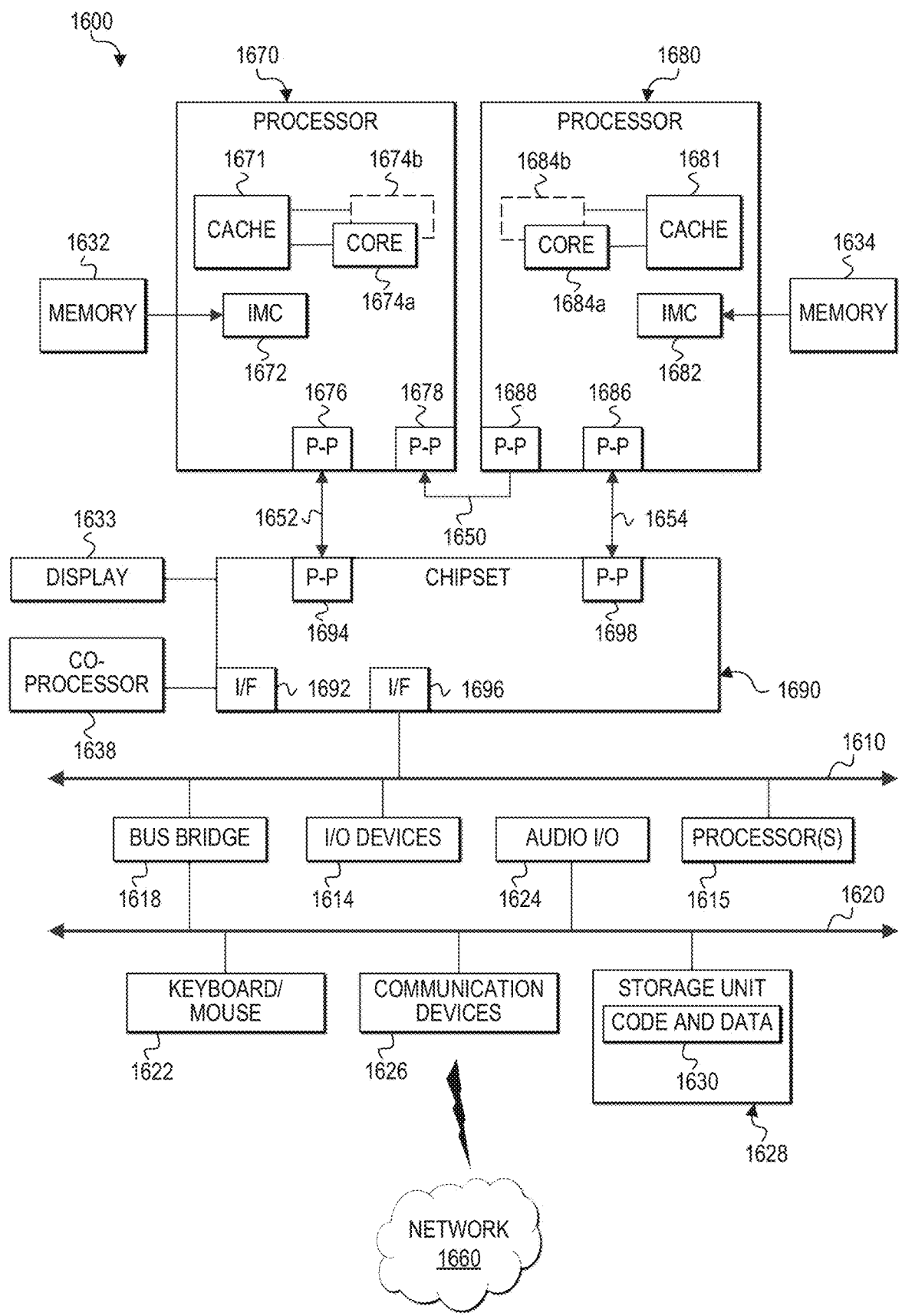

Referring now to FIG. 16, shown is a block diagram of a first more specific exemplary system 1600 in accordance with one or more embodiments of the present disclosure. As shown in FIG. 16, multiprocessor system 1600 is a point-to-point interconnect system, and includes a first processor 1670 and a second processor 1680 coupled via a point-to-point interface 1650. Processors 1670 and 1680 may be any type of processor, such as those shown or discussed in connection with the other figures. For example, each of processors 1670 and 1680 may be some version of the processor 1400. In another example, processors 1670 and 1680 are respectively processors 1510 and 1515, while coprocessor 1638 is coprocessor 1545. In yet another example, processors 1670 and 1680 are respectively processor 1510 coprocessor 1545.

Processors 1670 and 1680 may be implemented as single core processors 1674a and 1684a or multi-core processors 1674a-1674b and 1684a-1684b. Each of cores 1674a-1674b and 1684a-1684b may be some version of the core 1290. Processors 1670 and 1680 may each include a cache 1671 and 1681 used by their respective core or cores. A shared cache (not shown) may be included in either processors or outside of both processors yet connected with the processors via P-P interconnect, such that either or both processors' local cache information may be stored in the shared cache if a processor is placed into a low power mode.

Processors 1670 and 1680 are shown including integrated memory controller (IMC) units 1672 and 1682, respectively, to communicate with memory elements 1632 and 1634, which may be portions of main memory locally attached to the respective processors or may be high bandwidth memory (HBM) in some embodiments. In some embodiments, memory controller logic 1672 and 1682 may be discrete logic separate from processors 1670 and 1680. Memory elements 1632 and/or 1634 may store various data to be used by processors 1670 and 1680 in achieving operations and functionality outlined herein.

Processor 1670 also includes as part of its bus controller units point-to-point (P-P) interfaces 1676 and 1678; similarly, second processor 1680 includes P-P interfaces 1686 and 1688. Processors 1670, 1680 may exchange information via a point-to-point (P-P) interface 1650 using P-P interface circuits 1678, 1688.

Processors 1670, 1680 may each exchange information with a chipset 1690 via individual P-P interfaces 1652, 1654 using point to point interface circuits 1676, 1694, 1686, 1698. Chipset 1690 may optionally exchange information with the coprocessor 1638 via a high-performance interface 1692. In one embodiment, the coprocessor 1638 is a special-purpose processor, such as, for example, a high-throughput MIC processor, a network or communication processor, compression engine, graphics processor, GPGPU, embedded processor, or the like. Optionally, chipset 1690 may also communicate with a display 1633 for displaying data that is viewable by a human user.

A shared cache (e.g., 1671 and/or 1681) may be included in either processor or outside of both processors, yet connected with the processors via P-P interconnect, such that either or both processors' local cache information may be stored in the shared cache if a processor is placed into a low power mode.

Chipset 1690 may be coupled to a first bus 1610 via an interface 1696. In one embodiment, first bus 1610 may be a Peripheral Component Interconnect (PCI) bus, or a bus such as a PCI Express bus or another third generation I/O interconnect bus, although the scope of the present disclosure is not so limited.

As shown in FIG. 16, various I/O devices 1614 may be coupled to first bus 1610, along with a bus bridge 1618 which couples first bus 1610 to a second bus 1620. In one embodiment, one or more additional processor(s) 1615, such as coprocessors, high-throughput MIC processors, GPGPU's, accelerators (such as, e.g., graphics accelerators or digital signal processing (DSP) units), field programmable gate arrays, or any other processor, are coupled to first bus 1610. In one embodiment, second bus 1620 may be a low pin count (LPC) bus. Various devices may be coupled to a second bus 1620 including, for example, a keyboard and/or mouse 1622, or other input devices (e.g., a touch screen, trackball, joystick, etc.), communication devices 1626 (e.g., modems, network interface devices, or other types of communication devices that may communicate through a network 1660), audio I/O devices 1614, and/or a storage unit 1628 (e.g., a disk drive or other mass storage device, which may include instructions/code and data 1630). Further, an audio I/O 1624 may be coupled to the second bus 1620. Note that other architectures are possible. For example, instead of the point-to-point architecture of FIG. 16, a system may implement a multi-drop bus or other such architecture.

Figure 17:
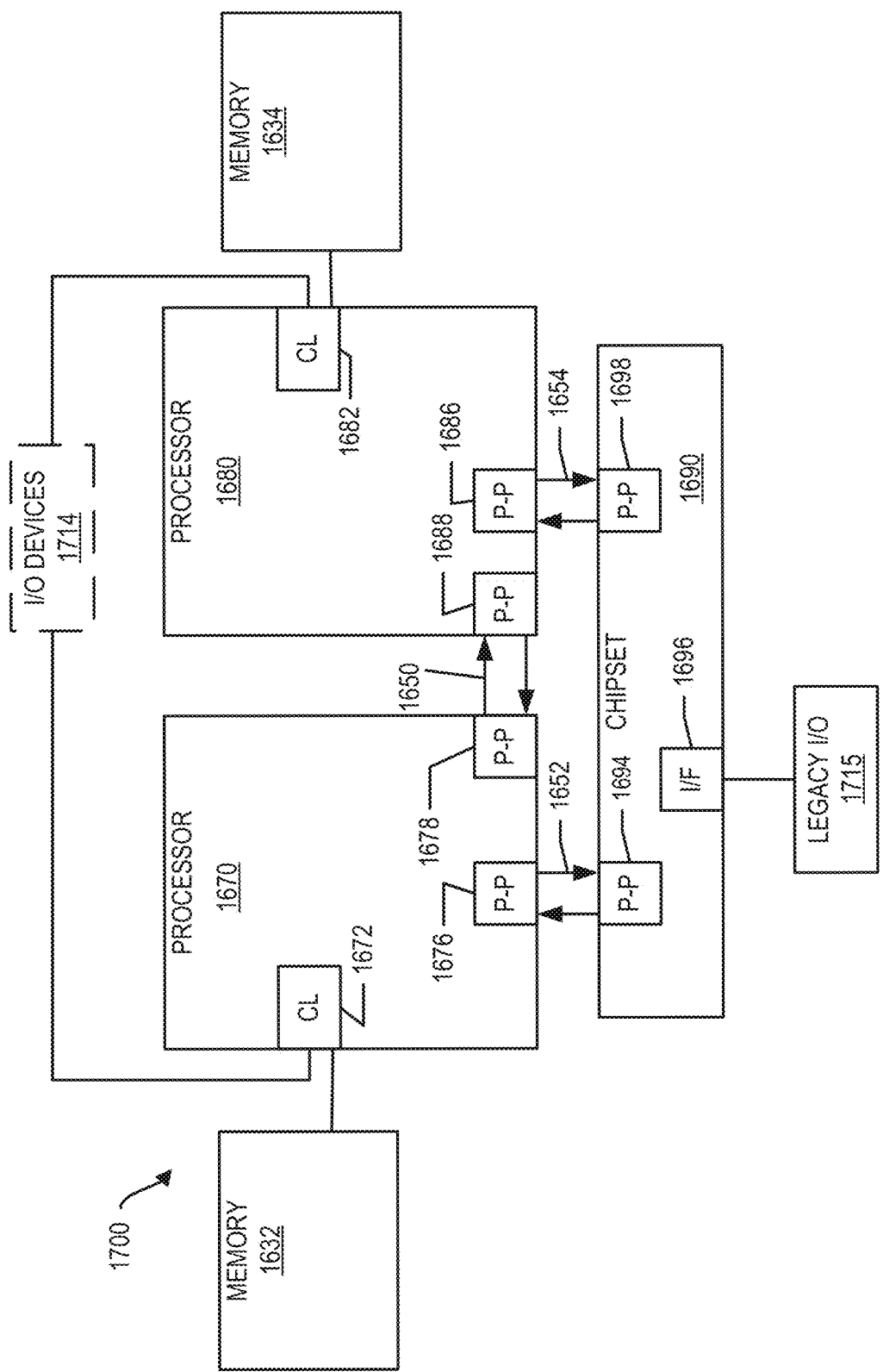

Referring now to FIG. 17, shown is a block diagram of a second more specific exemplary system 1700 in accordance with at least one embodiment of the present disclosure. Like elements in FIGS. 16 and 17 bear like reference numerals, and certain aspects of FIG. 16 have been omitted from FIG. 17 in order to avoid obscuring other aspects of FIG. 17.

FIG. 17 illustrates that the processors 1670, 1680 may include integrated memory and I/O control logic ("CL") 1672 and 1682, respectively. Thus, the CL 1672, 1682 include integrated memory controller units and include I/O control logic. FIG. 17 illustrates that not only are the memories 1632, 1634 coupled to the CL 1672, 1682, but also that I/O devices 1714 are also coupled to the control logic 1672, 1682. Legacy I/O devices 1715 are coupled to the chipset 1690.

Figure 18:
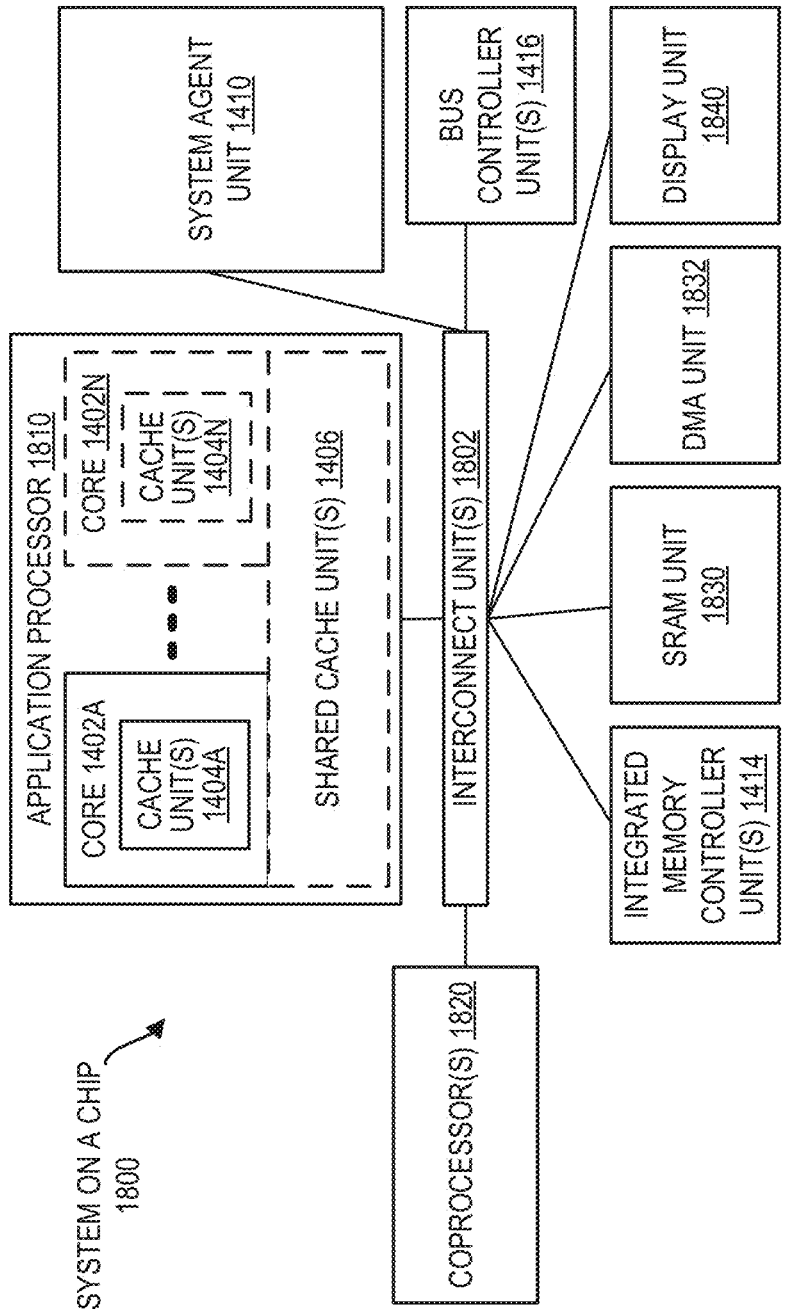

Referring now to FIG. 18, shown is a block diagram of a SoC 1800 in accordance with at least one embodiment of the present disclosure. Similar elements in FIG. 14 bear like reference numerals. Also, dashed lined boxes are optional features on more advanced SoCs. In FIG. 18, an interconnect unit(s) 1802 is coupled to: an application processor 1810 which includes a set of one or more cores 1402A-N and shared cache unit(s) 1406; a system agent unit 1410; a bus controller unit(s) 1416; an integrated memory controller unit(s) 1414; a set or one or more coprocessors 1820 which may include integrated graphics logic, an image processor, an audio processor, and a video processor; an static random access memory (SRAM) unit 1830; a direct memory access (DMA) unit 1832; and a display unit 1840 for coupling to one or more external displays. In one embodiment, the coprocessor(s) 1820 includes a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of this disclosure may be implemented as computer programs or program code executing on programmable systems comprising at least one processor, a storage system (including volatile and non-volatile memory and/or storage elements), at least one input device, and at least one output device.

Program code, such as code 1830 illustrated in FIG. 18, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor, among other examples.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable (e.g., computer-readable) medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of this disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 19:
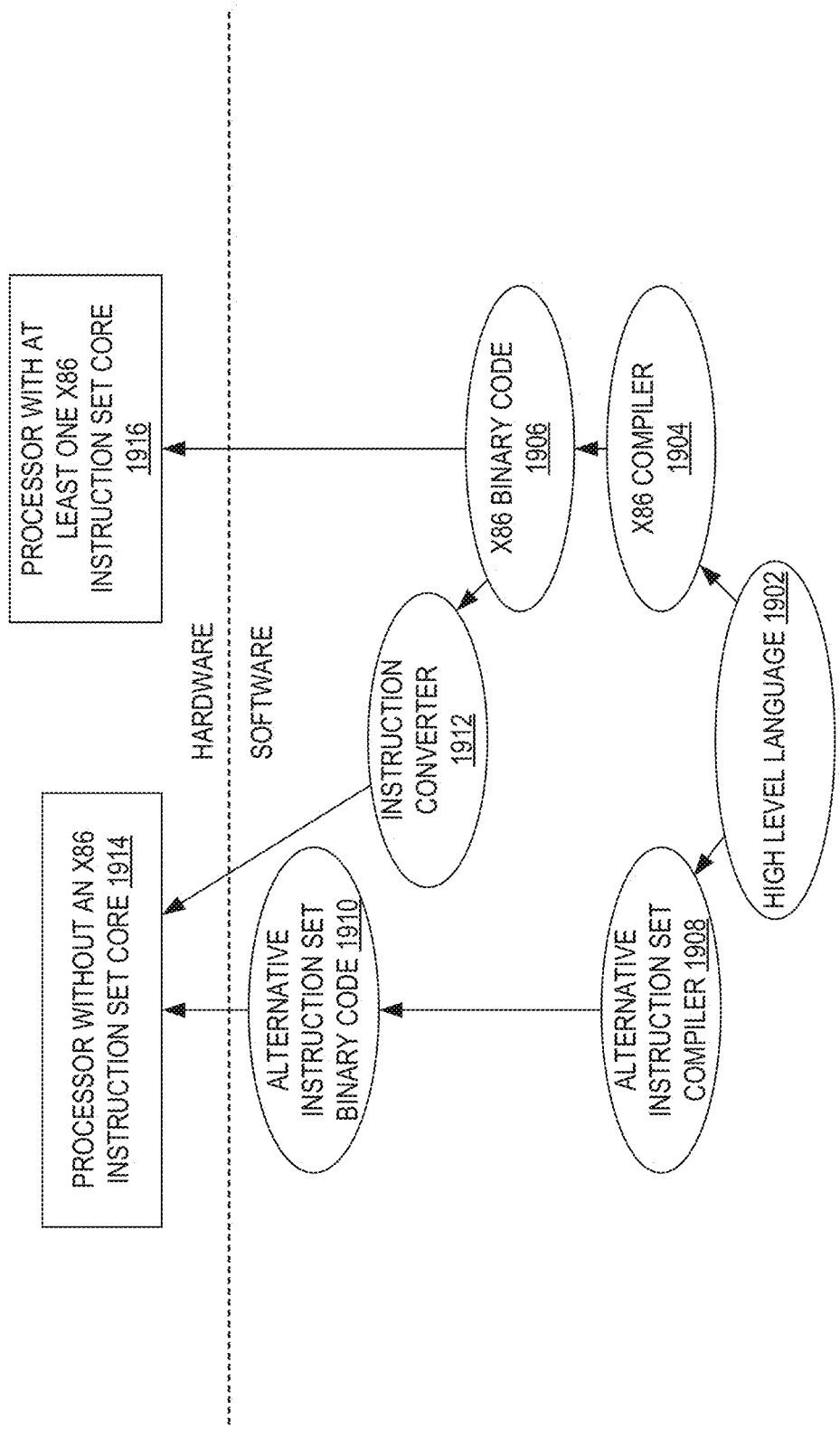
FIG. 19 is a block diagram contrasting the use of a software instruction converter to convert binary instructions in a source instruction set to binary instructions in a target instruction set according to embodiments of the present disclosure.

FIG. 19 is a block diagram contrasting the use of a software instruction converter to convert binary instructions in a source instruction set to binary instructions in a target instruction set according to embodiments of this disclosure. In the illustrated embodiment, the instruction converter is a software instruction converter, although alternatively the instruction converter may be implemented in software, firmware, hardware, or various combinations thereof. FIG. 19 shows a program in a high level language 1902 may be compiled using an x86 compiler 1904 to generate x86 binary code 1906 that may be natively executed by a processor with at least one x86 instruction set core 1916. The processor with at least one x86 instruction set core 1916 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1904 represents a compiler that is operable to generate x86 binary code 1906 (e.g., object code) that can, with or without additional linkage processing, be executed on the processor with at least one x86 instruction set core 1916. Similarly, FIG. 19 shows the program in the high level language 1902 may be compiled using an alternative instruction set compiler 1908 to generate alternative instruction set binary code 1910 that may be natively executed by a processor without at least one x86 instruction set core 1914 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1912 is used to convert the x86 binary code 1906 into code that may be natively executed by the processor without an x86 instruction set core 1914. This converted code is not likely to be the same as the alternative instruction set binary code 1910 because an instruction converter capable of this is difficult to make; however, the converted code will accomplish the general operation and be made up of instructions from the alternative instruction set. Thus, the instruction converter 1912 represents software, firmware, hardware, or a combination thereof that, through emulation, simulation or any other process, allows a processor or other electronic device that does not have an x86 instruction set processor or core to execute the x86 binary code 1906.

Note that with the numerous examples provided herein, interaction may be described in terms of two, three, four, or more network elements, hosts, devices, computing systems, modules, and/or other components. However, this has been done for purposes of clarity and example only. It should be appreciated that the system can be consolidated or divided (e.g., segmented, partitioned, separated, etc.) in any suitable manner. Along similar design alternatives, any of the illustrated controllers, limiters, decoders, modules, nodes, elements, hosts, devices, systems, and other components of the FIGURES may be combined in various possible configurations, all of which are clearly within the broad scope of this Specification. It should be appreciated that the shown and described with reference to the FIGURES (and their teachings) are readily scalable and can accommodate a large number of components, as well as more complicated/sophisticated arrangements and configurations. Accordingly, the examples provided should not limit the scope or inhibit the broad teachings of the systems as potentially applied to a myriad of other architectures.

It is also important to note that the operations described with reference to the preceding FIGURES illustrate only some of the possible scenarios that may be executed by, or within, the systems (e.g., 100). Some of these operations may be deleted or removed where appropriate, or these operations may be modified or changed considerably without departing from the scope of the discussed concepts. In addition, the timing of these operations may be altered considerably and still achieve the results taught in this disclosure. As one example, the processes depicted in the accompanying figures do not necessarily require the particular order shown, or sequential order, to achieve the desired results. In certain implementations, multitasking and parallel processing may be advantageous. The preceding operational flows have been offered for purposes of example and discussion. Substantial flexibility is provided by the system in that any suitable arrangements, chronologies, configurations, and timing mechanisms may be provided without departing from the teachings of the discussed concepts.

As used herein, unless expressly stated to the contrary, use of the phrase 'at least one of' refers to any combination of the named items, elements, conditions, or activities. For example, 'at least one of X, Y, and Z' is intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z. Additionally, unless expressly stated to the contrary, the numbering adjectives 'first', 'second', 'third', etc., are intended to distinguish the particular terms (e.g., element, condition, module, activity, operation, claim element, etc.) they precede, but are not intended to indicate any type of order, rank, importance, temporal sequence, or hierarchy of the modified term. For example, 'first X' and 'second X' are intended to designate two separate X elements that are not necessarily limited by any order, rank, importance, temporal sequence, or hierarchy of the two elements. Also, references in the specification to "one embodiment," "an embodiment," "some embodiments," etc., indicate that the embodiment(s) described may include a particular feature, structure, or characteristic, but every embodiment may or may not necessarily include that particular feature, structure, or characteristic. Moreover, such phrases are not necessarily referring to the same embodiment. Additionally, the words "optimize," "optimization," "optimum," "optimal," and related terms are terms of art that refer to improvements in speed and/or efficiency of a specified outcome and do not purport to indicate that a process for achieving the specified outcome has achieved, or is capable of achieving, a perfectly speedy/perfectly efficient state.

While this specification contains many specific implementation details, these should not be construed as limitations on the scope of any embodiments or of what may be claimed, but rather as descriptions of features specific to particular embodiments of the subject matter disclosed herein. Certain features that are described in this specification in the context of separate embodiments can also be implemented in combination in a single embodiment. Conversely, various features that are described in the context of a single embodiment may also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

OTHER NOTES AND EXAMPLES

The following examples pertain to embodiments in accordance with this specification. The system, apparatus, method, and machine readable storage medium embodiments can include one or a combination of the following examples:

Example A1 provides an apparatus comprising an execution unit coupled to a memory; a microcode controller, and a hardware controller coupled to the microcode controller. The microcode controller is to: identify a global hint in an instruction stream, the instruction stream including a first instruction phase and a second instruction phase to be executed in parallel; identify a first local hint in the first instruction phase in the instruction stream; and balance power consumption between the execution unit and the memory during parallel executions of the first instruction phase and the second instruction phase based, at least in part, on the first local hint. The hardware controller is to, based on the global hint, determine a voltage level of a compute voltage and a frequency of a compute clock signal to be used by the execution unit during the parallel executions of the first instruction phase and the second instruction phase.

In Example A2, the subject matter of Example A1 can optionally include where, based on the global hint indicating that the instruction stream is to use more compute resources than memory resources, the hardware controller is to determine that at least one of the frequency of the compute clock signal and the voltage level of the compute voltage for the execution unit is to be increased, where the first instruction phase includes a compute instruction.

In Example A3, the subject matter of any one of Examples A1-A2 can optionally include where the power consumption by the execution unit is to be increased during the parallel executions of the first instruction phase and the second instruction phase by increasing a compute pipeline rate for the first instruction phase based, in part, on the first local hint.

In Example A4, the subject matter of any one of Examples A1-A3 can optionally include where the second instruction phase includes a memory instruction, and where the power consumption by the memory is to be decreased during the parallel executions of the first instruction phase and the second instruction phase by decreasing memory access bandwidth of the memory based, in part, on the first local hint.

In Example A5, the subject matter of Example A4 can optionally include where the memory access bandwidth is to be decreased by inserting a number of rate control instructions into the second instruction phase.

In Example A6, the subject matter of Example A5 can optionally include where the number of rate control instructions is selected to synchronize an execution completion of the second instruction phase with an execution completion of the first instruction phase.

In Example A7, the subject matter of Example A1 can optionally include where, based on the global hint indicating that the instruction stream is to use more memory resources than compute resources, the hardware controller is to determine that at least one of the frequency of the compute clock signal and the voltage level of the compute voltage for the execution unit is to be decreased, where the first instruction phase includes a memory instruction.

In Example A8, the subject matter of any one of Examples A1 and A7 can optionally include where the power consumption of the memory is to be increased during the parallel executions of the first instruction phase and the second instruction phase by increasing a memory access bandwidth of the memory based, in part, on the first local hint.

In Example A9, the subject matter of any one of Examples A1 and A7-A8 can optionally include where the second instruction phase includes a compute instruction, and where the power consumption of the execution unit is to be decreased during the parallel executions of the first instruction phase and the second instruction phase by decreasing a compute pipeline rate based, in part, on the first local hint.

In Example A10, the subject matter of Example A9 can optionally include where the compute pipeline rate is to be decreased by inserting a number of rate control instructions into the second instruction phase.

In Example A11, the subject matter of Example A10 can optionally include where the number of rate control instructions is selected to synchronize an execution completion of the second instruction phase with an execution completion of the first instruction phase.

In Example A12, the subject matter of any one of Examples A1-A11 can optionally include where the first local hint includes a first processing rate for the first instruction phase or an indication of the first processing rate for the first instruction phase.

In Example A13, the subject matter of Example A12 can optionally include where the first processing rate for the first instruction phase is one of a number of clock cycles to execute the first instruction phase, a percentage of a total time to execute the instruction stream, or an amount of time to execute the first instruction phase.

In Example A14, the subject matter of any one of Examples A12-A13 can optionally include where the indication of the first processing rate includes a type of workload of the first instruction phase, and where the microcode controller is further to determine the first processing rate for the first instruction phase based on the type of workload of the first instruction phase indicated by the first local hint.

In Example A15, the subject matter of Example A14 can optionally include where the first processing rate for the first instruction phase is preprogrammed in a rate store.

In Example A16, the subject matter of any one of Examples A1-A11 can optionally include where the microcode controller is further to: identify a second local hint in the second instruction phase of the instruction stream; determine a first processing rate for the first instruction phase based on the first local hint; determine a second processing rate for the second instruction phase based on the second local hint; and balance the power consumption between the execution unit and the memory based, in part, on a comparison of the first processing rate and the second processing rate.

In Example A17, the subject matter of any one of Examples A1-A6 and A12-A16 can optionally include where the first instruction phase includes a matrix multiply compute instruction, and where the second instruction phase includes a memory copy instruction.

In Example A18, the subject matter of any one of Examples A1-A15 can optionally include where the second instruction phase includes a memory instruction or a compute instruction.

Example S1 provides a system comprising a memory; an execution unit coupled to the memory; and a microcode controller to: decode a first instruction phase and a second instruction phase in an instruction stream, the first and second instruction phases to be executed in parallel; identify a first local hint in the first instruction phase; identify a second local hint in the second instruction phase; determine a first processing rate for the first instruction phase based on the first local hint; determine a second processing rate for the second instruction phase based on the second local hint; and based on determining that the first processing rate for the first instruction phase is greater than the second processing rate for the second instruction phase, insert a number of rate control instructions into the second instruction phase to synchronize execution completion of the second instruction phase with the first instruction phase.

In Example S2, the subject matter of Example S1 can optionally include where the microcode controller is further to identify a global hint in the instruction stream, and where the system further comprises a hardware controller to determine that at least one of a voltage level of a compute voltage and a frequency of a compute clock signal for the execution unit is to be adjusted based, at least in part, on the global hint.

In Example S3, the subject matter of any one of Examples S1-52 can optionally include where the first local hint includes the first processing rate for the first instruction phase or an indication of the first processing rate for the first instruction phase, and where the second local hint includes the second processing rate for the second instruction phase or an indication of the second processing rate for the second instruction phase.

Example M1 provides a method comprising: identifying a global hint in an instruction stream, the instruction stream including a compute instruction phase to be executed by an execution unit of a processor core; decoding the compute instruction phase in the instruction stream; identifying a first local hint in the compute instruction phase; determining a processing rate for the compute instruction phase based on the first local hint; sending the processing rate to the execution unit to increase power consumption by the execution unit by increasing a compute pipeline rate for the compute instruction phase; and based on the global hint, increasing a voltage level of a compute voltage and increasing a frequency of a compute clock signal for the execution unit during an execution of the compute instruction phase.

In Example M2, the subject matter of Example M1 can optionally include decoding a memory instruction phase in the instruction stream; identifying a second local hint in the memory instruction phase in the instruction stream; identifying a third local hint in a third instruction phase in the instruction stream, the memory instruction phase and the third instruction phase to be executed in parallel; and balancing power consumption between the execution unit and a memory during parallel executions of the memory instruction phase and the third instruction phase based, at least in part, on the first local hint and the second local hint.

Example C1 provides one or more computer-readable media with code stored thereon, where the code is executable to cause a machine to: identify a global hint in an instruction stream, the instruction stream including a first instruction phase and a second instruction phase to be executed in parallel; identify a first local hint in the first instruction phase in the instruction stream; balance power consumption by an execution unit and by a memory during parallel executions of the first instruction phase and the second instruction phase based, at least in part, on the first local hint; and based on the global hint, determine a voltage level of a compute voltage and a frequency of a compute clock signal to be used for the execution unit during the parallel executions of the first instruction phase and the second instruction phase.

In Example C2, the subject matter of Example C1 can optionally include where the first local hint includes a first processing rate for the first instruction phase or an indication of the first processing rate for the first instruction phase, and where the first processing rate for the first instruction phase includes one of a number of clock cycles to execute the first instruction phase, a percentage of a total time to execute the instruction stream, or an amount of time to execute the first instruction phase.

An Example Y1 provides an apparatus, the apparatus comprising means for performing the method of any one of the Examples M1-M2.

In Example Y2, the subject matter of Example Y1 can optionally include that the means for performing the method comprises at least one processor and at least one memory element.

In Example Y3, the subject matter of Example Y2 can optionally where the at least one memory element comprises machine readable instructions that when executed, cause the apparatus to perform the method of any one of Examples M1-M2.

In Example Y4, the subject matter of any one of Examples Y1-Y3 can optionally include that the apparatus is one of a computing system or a system-on-a-chip.

An Example X1 provides at least one machine readable storage medium comprising instructions, where the instructions when executed realize an apparatus, realize a system, or implement a method in any one of the preceding Examples A1-A18, S1-S3, M1-M2, and Y1-Y4.

What is claimed is:

1. An apparatus comprising:
   an execution unit coupled to a memory;
   a microcode controller to:
      identify a global hint in an instruction stream, the instruction stream including a first instruction phase and a second instruction phase to be executed in parallel;
      identify a first local hint in the first instruction phase in the instruction stream; and
      balance power consumption between the execution unit and the memory during parallel executions of the first instruction phase and the second instruction phase based, at least in part, on the first local hint; and
   a hardware controller coupled to the microcode controller, the hardware controller to:
      based on the global hint, determine a voltage level of a compute voltage and a frequency of a compute clock signal to be used by the execution unit during the parallel executions of the first instruction phase and the second instruction phase, wherein the first instruction phase includes a matrix multiply compute instruction, and wherein the second instruction phase includes a memory copy instruction.

2. The apparatus of claim 1, wherein, based on the global hint indicating that the instruction stream is to use more compute resources than memory resources, the hardware controller is to determine that at least one of the frequency of the compute clock signal and the voltage level of the compute voltage for the execution unit is to be increased.

3. The apparatus of claim 2, wherein the power consumption by the execution unit is to be increased during the parallel executions of the first instruction phase and the second instruction phase by increasing a compute pipeline rate for the first instruction phase based, in part, on the first local hint.

4. The apparatus of claim 2, wherein the power consumption by the memory is to be decreased during the parallel executions of the first instruction phase and the second instruction phase by decreasing memory access bandwidth of the memory based, in part, on the first local hint.

5. The apparatus of claim 4, wherein the memory access bandwidth is to be decreased by inserting a number of rate control instructions into the second instruction phase.

6. The apparatus of claim 5, wherein the number of rate control instructions is selected to synchronize an execution completion of the second instruction phase with an execution completion of the first instruction phase.

7. The apparatus of claim 1, wherein, based on the global hint indicating that the instruction stream is to use more memory resources than compute resources, the hardware controller is to determine that at least one of the frequency of the compute clock signal and the voltage level of the compute voltage for the execution unit is to be decreased.

8. The apparatus of claim 7, wherein the power consumption of the memory is to be increased during the parallel executions of the first instruction phase and the second instruction phase by increasing a memory access bandwidth of the memory based, in part, on the first local hint.

9. The apparatus of claim 7, wherein the power consumption of the execution unit is to be decreased during the parallel executions of the first instruction phase and the second instruction phase by decreasing a compute pipeline rate based, in part, on the first local hint.

10. The apparatus of claim 9, wherein the compute pipeline rate is to be decreased by inserting a number of rate control instructions into the first instruction phase.

11. The apparatus of claim 10, wherein the number of rate control instructions is selected to synchronize an execution completion of the second instruction phase with an execution completion of the first instruction phase.

12. The apparatus of claim 1, wherein the first local hint includes a first processing rate for the first instruction phase or an indication of the first processing rate for the first instruction phase.

13. The apparatus of claim 12, wherein the first processing rate for the first instruction phase is one of a number of clock cycles to execute the first instruction phase, a percentage of a total time to execute the instruction stream, or an amount of time to execute the first instruction phase.

14. The apparatus of claim 12, wherein the indication of the first processing rate includes a type of workload of the first instruction phase, and wherein the microcode controller is further to determine the first processing rate for the first instruction phase based on the type of workload of the first instruction phase indicated by the first local hint.

15. The apparatus of claim 14, wherein the first processing rate for the first instruction phase is preprogrammed in a rate store.

16. The apparatus of claim 1, wherein the microcode controller is further to:
   identify a second local hint in the second instruction phase of the instruction stream;
   determine a first processing rate for the first instruction phase based on the first local hint;
   determine a second processing rate for the second instruction phase based on the second local hint; and
   balance the power consumption between the execution unit and the memory based, in part, on a comparison of the first processing rate and the second processing rate.

17. A system comprising:
   a memory;
   an execution unit coupled to the memory;
   a microcode controller to:
      decode a first instruction phase and a second instruction phase in an instruction stream, the first and second instruction phases to be executed in parallel;
      identify a first local hint in the first instruction phase;
      identify a second local hint in the second instruction phase;
      determine a first processing rate for the first instruction phase based on the first local hint;
      determine a second processing rate for the second instruction phase based on the second local hint; and
      based on determining that the first processing rate for the first instruction phase is greater than the second processing rate for the second instruction phase, insert a number of rate control instructions into the second instruction phase to synchronize execution completion of the second instruction phase with the first instruction phase.

18. The system of claim 17, wherein the microcode controller is further to identify a global hint in the instruction stream, and wherein the system further comprises a hardware controller to:
determine that at least one of a voltage level of a compute voltage and a frequency of a compute clock signal for the execution unit is to be adjusted based, at least in part, on the global hint.

19. The system of claim 17, wherein the first local hint includes the first processing rate for the first instruction phase or an indication of the first processing rate for the first instruction phase, and wherein the second local hint includes the second processing rate for the second instruction phase or an indication of the second processing rate for the second instruction phase.

20. A method, the method comprising:
identifying a global hint in an instruction stream, the instruction stream including a compute instruction phase to be executed by an execution unit of a processor core;
decoding the compute instruction phase in the instruction stream;
identifying a first local hint in the compute instruction phase;
determining a processing rate for the compute instruction phase based on the first local hint;
sending the processing rate to the execution unit to increase power consumption by the execution unit by increasing a compute pipeline rate for the compute instruction phase;
based on the global hint, increasing a voltage level of a compute voltage and increasing a frequency of a compute clock signal for the execution unit during an execution of the compute instruction phase;
decoding a memory instruction phase in the instruction stream;
identifying a second local hint in the memory instruction phase in the instruction stream;
identifying a third local hint in a third instruction phase in the instruction stream, the memory instruction phase and the third instruction phase to be executed in parallel; and
balancing power consumption between the execution unit and a memory during parallel executions of the memory instruction phase and the third instruction phase based, at least in part, on the second local hint and the third local hint.

21. An apparatus comprising:
an execution unit coupled to a memory;
a microcode controller to:
identify a global hint in an instruction stream, the instruction stream including a first instruction phase and a second instruction phase to be executed in parallel;
identify a first local hint in the first instruction phase in the instruction stream; and
balance power consumption between the execution unit and the memory during parallel executions of the first instruction phase and the second instruction phase based, at least in part, on the first local hint; and
a hardware controller coupled to the microcode controller, the hardware controller to:
based on the global hint, determine a voltage level of a compute voltage and a frequency of a compute clock signal to be used by the execution unit during the parallel executions of the first instruction phase and the second instruction phase, wherein the first instruction phase includes a memory copy instruction, and wherein the second instruction phase includes a matrix multiply compute instruction.

22. The apparatus of claim 21, wherein the first local hint includes an indication of a first processing rate for the first instruction phase, and wherein the indication of the first processing rate includes a type of workload of the first instruction phase.

* * * * *